US012564527B2

(12) United States Patent
Monson et al.

(10) Patent No.: US 12,564,527 B2
(45) Date of Patent: Mar. 3, 2026

(54) PATIENT SUPPORT APPARATUS HAVING MOTORIZED WHEELS

(71) Applicant: Hill-Rom Services, Inc., Batesville, IN (US)

(72) Inventors: Gavin M. Monson, Batesville, IN (US); Nolan D. Wanner, Milan, IN (US); Jeffrey S. Jelinek, Batesville, IN (US); Jonathan D. Turner, Dillsboro, IN (US); Jonathan K. Moenter, Batesville, IN (US); David C. Newkirk, Lawrenceburg, IN (US); John D. Christie, Batesville, IN (US); Matthew R. Knue, Sunman, IN (US); Nishita Vanita Shashikant, Batesville, IN (US); Jack B. Sing, Batesville, IN (US)

(73) Assignee: Hill-Rom Services, Inc., Batesville, IN (US)

( * ) Notice: Subject to any disclaimer, the term of this patent is extended or adjusted under 35 U.S.C. 154(b) by 550 days.

(21) Appl. No.: 18/177,837

(22) Filed: Mar. 3, 2023

(65) Prior Publication Data

US 2023/0277397 A1 Sep. 7, 2023

Related U.S. Application Data

(60) Provisional application No. 63/392,893, filed on Jul. 28, 2022, provisional application No. 63/344,079, (Continued)

(51) Int. Cl.
*A61G 7/08* (2006.01)
*A61G 7/05* (2006.01)

(52) U.S. Cl.
CPC ............ *A61G 7/08* (2013.01); *A61G 7/0528* (2016.11); *A61G 2203/14* (2013.01); *A61G 2203/36* (2013.01); *A61G 2203/726* (2013.01)

(58) Field of Classification Search
CPC .... A61G 7/08; A61G 7/0528; A61G 2203/14; A61G 2203/36; A61G 2203/726;
(Continued)

(56) References Cited

U.S. PATENT DOCUMENTS 3,792,328 A 2/1974 Woloszyk
4,511,825 A 4/1985 Klimo
(Continued)

FOREIGN PATENT DOCUMENTS

CN 101653396 B 7/2011
CN 202908843 U 5/2013
(Continued)

OTHER PUBLICATIONS

A Theory of Magnetic Angle Sensors with Hall Plates and Without Fluxguides.
https://www.youtube.com/watch?v=CjcyHicm3NA.

*Primary Examiner* — Valentin Neacsu
*Assistant Examiner* — Marlon A Arce
(74) *Attorney, Agent, or Firm* — Barnes & Thornburg LLP

(57) ABSTRACT

A dual-wheel steerable motorized caster has internal motors that are operated at different speeds to swivel a pair of wheels about a caster swivel axis. The motors are operated at the same speed to propel an apparatus to which the dual-wheel steerable motorized caster is coupled along an underlying surface such as a floor in a drive direction without swiveling the pair of wheels about the caster swivel axis. A patient support apparatus has one or more of such dual-wheel steerable motorized casters.

22 Claims, 26 Drawing Sheets

Related U.S. Application Data filed on May 20, 2022, provisional application No. 63/317,203, filed on Mar. 7, 2022.

(58) Field of Classification Search
CPC ...... A61G 7/012; A61G 7/05; A61G 7/05769; A61G 2203/22; A61G 2203/72; A61B 5/1115
USPC .......................................................... 180/6.2
See application file for complete search history.

(56) References Cited

U.S. PATENT DOCUMENTS

| | | | |
|---|---|---|---|
| 4,624,028 | A | 11/1986 | Wilkes |
| 4,752,986 | A | 6/1988 | Rivkin et al. |
| 4,906,906 | A | 3/1990 | Lautzenhiser et al. |
| 5,033,000 | A | 7/1991 | Littlejohn et al. |
| 5,575,664 | A | 11/1996 | Sobhani |
| 5,583,406 | A | 12/1996 | Mutoh et al. |
| 5,851,120 | A | 12/1998 | Sobhani |
| 5,859,390 | A | 1/1999 | Stafford et al. |
| 6,035,465 | A | 3/2000 | Rogozinski |
| 6,132,219 | A | 10/2000 | Sobhani et al. |
| 6,299,454 | B1 | 10/2001 | Henderson et al. |
| 6,354,390 | B1 | 3/2002 | Uchiyama et al. |
| 6,390,213 | B1 | 5/2002 | Bleicher |
| 6,429,647 | B1 | 8/2002 | Nicholson |
| 6,680,443 | B2 | 1/2004 | Dixon |
| 6,684,969 | B1 * | 2/2004 | Flowers ................. A61G 5/042 180/316 |
| 6,924,441 | B1 | 8/2005 | Mobley et al. |
| 7,176,391 | B2 | 2/2007 | Metz et al. |
| 7,245,123 | B2 | 7/2007 | Inoue et al. |
| 7,253,366 | B2 | 8/2007 | Bhai |
| 7,481,583 | B2 | 1/2009 | Aoki et al. |
| 7,610,637 | B2 | 11/2009 | Vanderpohl, III et al. |
| 7,708,094 | B2 | 5/2010 | Kamen et al. |
| 7,789,175 | B2 | 9/2010 | Tobey et al. |
| 8,040,129 | B2 | 10/2011 | Takahashi |
| 8,260,517 | B2 | 9/2012 | Bhai |
| 8,359,683 | B2 | 1/2013 | Patterson et al. |
| 8,397,846 | B2 | 3/2013 | Heimbrock et al. |
| 8,442,738 | B2 | 5/2013 | Patmore |
| 8,720,616 | B2 | 5/2014 | Kofoed et al. |
| 8,760,088 | B2 | 6/2014 | Ding et al. |
| 8,834,311 | B1 | 9/2014 | Kurowsky et al. |
| 8,924,068 | B2 | 12/2014 | Shitamoto et al. |
| 8,925,661 | B2 | 1/2015 | Minoshima et al. |
| 8,958,911 | B2 | 2/2015 | Taka et al. |
| 9,018,943 | B2 | 4/2015 | Schrubbe |
| 9,227,823 | B2 | 1/2016 | Niarfeix et al. |
| 9,266,392 | B2 | 2/2016 | Brøndum |
| 9,267,960 | B2 | 2/2016 | Duppe |
| 9,463,127 | B2 | 10/2016 | Hochman et al. |
| 9,554,953 | B2 | 1/2017 | Dirauf et al. |
| 9,724,255 | B2 | 8/2017 | Hollyoak et al. |
| 10,004,651 | B2 | 6/2018 | Deluca et al. |
| 10,206,835 | B2 | 2/2019 | Jurka |
| 10,257,646 | B2 | 4/2019 | Buchmann et al. |
| 10,426,685 | B2 | 10/2019 | Christensen et al. |
| 10,473,487 | B2 | 11/2019 | Kegeler |
| 10,603,234 | B2 | 3/2020 | Puvogel et al. |
| 10,682,269 | B2 | 6/2020 | Childs et al. |
| 10,703,567 | B2 | 7/2020 | Grinnell et al. |
| 10,758,161 | B2 | 9/2020 | Schmutzer et al. |
| 10,786,406 | B2 | 9/2020 | Deluca et al. |
| 10,797,524 | B2 | 10/2020 | Titov et al. |
| 10,898,398 | B2 | 1/2021 | Hayes et al. |
| 10,905,612 | B2 | 2/2021 | Derenne et al. |
| 10,912,685 | B2 | 2/2021 | Childs et al. |
| 11,051,999 | B2 | 7/2021 | Hayes et al. |
| 11,058,325 | B2 | 7/2021 | Kostic et al. |
| 11,096,851 | B2 | 8/2021 | Souke et al. |
| 11,123,247 | B2 | 9/2021 | Nahavandi |
| 11,183,070 | B2 | 11/2021 | Carter et al. |
| 2006/0046895 | A1 | 3/2006 | Thacher et al. |
| 2007/0080000 | A1 * | 4/2007 | Tobey ................. B60B 27/0047 180/21 |
| 2008/0120803 | A1 | 5/2008 | Bryant |
| 2010/0180380 | A1 | 7/2010 | Van Scheppingen et al. |
| 2010/0283314 | A1 | 11/2010 | Lubbers et al. |
| 2016/0136018 | A1 * | 5/2016 | DeLuca ................. A61G 7/012 5/611 |
| 2018/0263599 | A1 | 9/2018 | Oura |
| 2018/0329422 | A1 | 11/2018 | Biber |
| 2019/0029901 | A1 * | 1/2019 | Nahavandi .............. B60B 33/00 |
| 2019/0123587 | A1 * | 4/2019 | Titov ....................... A61G 7/05 |
| 2019/0183707 | A1 | 6/2019 | Fontana et al. |
| 2019/0298590 | A1 | 10/2019 | Patmore et al. |
| 2019/0328594 | A1 | 10/2019 | Meng et al. |
| 2019/0381662 | A1 | 12/2019 | Taira et al. |
| 2020/0025574 | A1 | 1/2020 | Kasperski, III |
| 2020/0056348 | A1 | 2/2020 | Veasy et al. |
| 2020/0129351 | A1 | 4/2020 | Wiggermann |
| 2021/0065885 | A1 | 3/2021 | Myers et al. |
| 2021/0086744 | A1 | 3/2021 | Fay, II |
| 2021/0089043 | A1 | 3/2021 | Deinlein |
| 2021/0101288 | A1 | 4/2021 | Lee |
| 2021/0128384 | A1 | 5/2021 | Lee |
| 2021/0145669 | A1 | 5/2021 | Harrison |
| 2021/0347204 | A1 | 11/2021 | Cmich |
| 2021/0347265 | A1 | 11/2021 | Park |
| 2021/0401366 | A1 | 12/2021 | Weiss et al. |

FOREIGN PATENT DOCUMENTS

| | | | |
|---|---|---|---|
| CN | 103754216 | A | 4/2014 |
| CN | 106236458 | A | 12/2016 |
| CN | 107736975 | A | 9/2017 |
| CN | 108056880 | A | 5/2018 |
| CN | 106420194 | B | 10/2018 |
| CN | 106420227 | B | 11/2018 |
| CN | 110200759 | A | 9/2019 |
| CN | 110742739 | A | 2/2020 |
| CN | 110758591 | A | 2/2020 |
| CN | 210554184 | U | 5/2020 |
| CN | 114099190 | A | 3/2022 |
| DE | 3929407 | A1 | 3/1991 |
| DE | 102017011325 | A1 | 6/2018 |
| DE | 102019205609 | A1 | 10/2020 |
| EP | 1121919 | B1 | 6/2005 |
| EP | 1298041 | B1 | 10/2011 |
| EP | 2616254 | B1 | 6/2015 |
| EP | 2740455 | B1 | 9/2015 |
| EP | 2928028 | A2 | 10/2015 |
| EP | 2965738 | A1 | 1/2016 |
| EP | 3050549 | B1 | 4/2019 |
| EP | 3842021 | A1 | 6/2021 |
| IN | 202111025558 | A | 6/2021 |
| JP | 2008054441 | A | 3/2008 |
| JP | 2008076063 | A | 4/2008 |
| JP | 2009173068 | A | 8/2009 |
| JP | 4471744 | B2 | 6/2010 |
| JP | 4535818 | B2 | 9/2010 |
| JP | 2010259238 | A | 11/2010 |
| JP | 2019209740 | A | 12/2019 |
| KR | 102207806 | B1 | 1/2021 |
| WO | 2006102300 | A2 | 9/2006 |
| WO | 2012026170 | A1 | 3/2012 |
| WO | 2012055407 | A1 | 5/2012 |
| WO | 2013054660 | A1 | 4/2013 |
| WO | 2019016027 | A2 | 1/2019 |
| WO | 2019018235 | A1 | 1/2019 |
| WO | 2021001583 | A1 | 1/2021 |
| WO | 2021072758 | A1 | 4/2021 |
| WO | 2021191357 | A1 | 9/2021 |

* cited by examiner

PATIENT SUPPORT APPARATUS HAVING MOTORIZED WHEELS

The present application claims the benefit, under 35 U.S.C. § 119(e), of U.S. Provisional Patent Application No. 63/317,203, filed Mar. 7, 2022; U.S. Provisional Patent Application No. 63/344,079, filed May 20, 2022; and U.S. Provisional Patent Application No. 63/392,893, filed Jul. 28, 2022; each of which is hereby incorporated by reference herein in its entirety.

BACKGROUND

The present disclosure relates to motorized wheels and particularly, to motorized wheels that operate to propel patient support apparatuses, such as stretchers and hospital beds, along an underlying floor. More particularly, the present disclosure relates to electromechanical features of steerable and fixed motorized wheels used on patient support apparatuses.

Traditional patient support apparatus, such as beds and stretchers, are either manually propelled or if a motorized propulsion system is included, it is typically a single drive wheel in the vicinity of the center of the patient support apparatus, which presents issues for both maneuverability in tight spaces and for an empty bed or a very light patient such as a pediatric patient. More particularly, some patient support apparatuses, such as stretchers and hospital beds, have one or more non-castered motorized wheels to propel the respective patient support apparatus along a floor. These non-castered motorized wheels are not able to swivel about a caster swivel axis like a traditional caster is able. As a result, some sort of mechanical system, or electromechanical system, is provided for raising and lowering the motorized wheels relative to the floor. For example, when it is desired to push the patient support apparatus sideways, the motorized wheel is lifted off the floor in these types of patient support apparatuses having one or more non-castered motorized wheels. The structure required to raise and lower the motorized wheels adds cost, weight, and complexity to the respective patient support apparatuses.

One aspect of the prior art patient support apparatuses having raisable and lowerable motorized wheels that is sometimes of concern is the amount of down force with which the motorized wheel is biased against the floor. Compression springs, torsion springs, leaf springs, gas springs, dashpots, and the like are sometimes used to bias motorized wheels of patient support apparatuses against the underlying floor. If the down force provided by these elements is too small, then the motorized wheel may slip while the respective patient support apparatus is being propelled, especially up a ramp in a healthcare facility. If the down force is too great, then other wheels of the patient support apparatus, such as those of freely swivelable non-motorized casters, may be lifted up off of the floor in an unwanted manner. For example, if the raisable and lowerable motorized wheel is located in a central region of the respective patient support apparatus, then a teetering situation may arise in which either the head end or foot end casters are lifted off the floor.

The fact that very light patients, such as small children, and very heavy patients, such as obese patients, may be supported on any given patient support apparatus further exacerbates the problem of designing the mechanisms that support raisable and lowerable motorized wheels with the appropriate amount of down force for all possible use conditions of the patient support apparatus. Mechanisms having an adjustable amount of down force have been developed in the prior art but these mechanisms require extra components (e.g., motorized actuators, linkages, cam devices, etc.) to achieve the adjustable down force capability. Such mechanisms add further cost, weight, and complexity to the respective patient support apparatuses. Accordingly, there is an ongoing need to develop motorized propulsion systems for patient support apparatuses that are inexpensive, allow for a high degree of maneuverability of the respective patient support apparatus, and that operate acceptably under all operating conditions (e.g., up and down ramps) while supporting patients of various weights.

SUMMARY

An apparatus, system, or method may comprise one or more of the features recited in the appended claims and/or the following features which, alone or in any combination, may comprise patentable subject matter:

According to a first aspect of the present disclosure, a differential drive caster may include a caster shaft that may define a caster swivel axis, an axle support that may be coupled to the caster shaft for swiveling movement therewith about the caster swivel axis, an axle that may be coupled to the axle support and that may have a first axle portion on a first side of the axle support and a second axle portion on a second side of the axle support, a first tire that may be rotatable relative to the first axle portion, a second tire that may be rotatable relative to the second axle portion, a first pancake motor that may couple the first tire to the first axle portion, and a second pancake motor that may couple the second tire to the second axle portion. The first pancake motor may include a first integrated planetary gear set and the second pancake motor may include a second integrated planetary gear set. The first and second pancake motors may be operable to rotate the first and second tires in opposite directions to cause the caster shaft, the axle support, the axle, the first pancake motor, the second pancake motor, the first tire, and the second tire to all swivel about the caster swivel axis, In some embodiments, the first and second pancake motors may be operable to rotate the first and second tires in common directions to propel the differential caster in a drive direction along an underlying surface. The present disclosure contemplates that the caster swivel axis may be substantially perpendicular to a tire rotation axis defined by the axle. Optionally, the caster swivel axis may be offset from the axle. Alternatively, the caster swivel axis may intersect the axle. Further alternatively, the caster swivel axis may intersect the tire rotation axis.

If desired, the differential drive caster of the first aspect further may include an angle sensor that may have a first sensor portion that may be coupled to the caster shaft to swivel therewith about the caster swivel axis and a second sensor portion. The second sensor portion may be decoupled from the caster shaft so as not to swivel therewith. The angle sensor may be configured to produce a signal from which the drive direction may be determinable. The angle sensor may include a slip ring, for example. Optionally, the first sensor portion may include a magnet and the second sensor portion may include a magnetic field sensor. Alternatively, the first sensor portion may include a magnetic field sensor and the second sensor portion may include a magnet.

In some embodiments of the differential drive caster of the first aspect, the drive direction may be substantially perpendicular to a tire rotation axis defined by the axle. Alternatively or additionally, the drive direction also may be substantially perpendicular to the caster swivel axis. If desired, the axle support may extend from the caster shaft in a cantilevered manner. It is contemplated that the axle may be fixed to the axle support.

It is contemplated that the differential drive caster of the first aspect further may include a first hub that may be mounted to the first axle portion and a second hub that may be mounted to the second axle portion. The first tire may be mounted to a first outer periphery of the first hub and the second tire may be mounted to a second outer periphery of the second hub. Optionally, the first pancake motor may be embedded at least partially within the first hub and the second pancake motor may be embedded at least partially within the second hub.

In some embodiments of the first aspect, the first pancake motor may be situated between the first hub and the axle support and the second pancake motor may be situated between the second hub and the axle support. The first tire may have a first sidewall that may face away from the axle support and the second tire may have a second sidewall that faces away from the axle support. If desired, no portion of the first pancake motor may extend beyond the first sidewall and no portion of the second pancake motor may extend beyond the second sidewall.

Optionally, the first tire may have a first width that may be defined between first and second sidewalls of the first tire and the first pancake motor, in its entirety, may have a second width that may be no greater than the first width. Further optionally, no portion of the first pancake motor may extend beyond the first and second sidewalls of the first tire. Alternatively or additionally, the second tire may have a third width that may be defined between third and fourth sidewalls of the second tire and the second pancake motor, in its entirety, may have a fourth width that may be no greater than the third width. Further alternatively or additionally, no portion of the second pancake motor may extend beyond the third and fourth sidewalls of the second tire.

In some embodiments of the first aspect, each of the first and second pancake motors may include a pulse modulated direct current (DC) motor. If desired, each of the first and second pancake motors may have Hall Effect sensors that may be configured to sense rotor position. Optionally, each of the first and second pancake motors may be operable as an electric brake by applying a short across motor windings of the respective first and second pancake motors. Alternatively, each of the first and second pancake motors may be operable as an electric brake by being electrically signaled to drive in synchronization in a reverse rotary direction which may be opposite to a present rotary direction of the first and second pancake motors.

According to a second aspect of the present disclosure, a patient support apparatus for propelling a patient along a floor may include a frame that may be configured to support a patient. The frame may include a base frame and an upper frame that may be supported above the base frame to raise, lower, and tilt relative to the base frame. The patient support apparatus of the second aspect may also have first and second single-wheel casters that may be coupled to the base frame and that may engage the floor and first and second dual-wheel motorized casters that may be coupled to the base frame and that may engage the floor. Regions of the base frame to which the first and second single-wheel casters and the first and second dual-wheel motorized casters may be coupled may form an imaginary rectangle when the base frame is viewed from above. The first and second single-wheel casters may be coupled to the base frame at first and second coupling regions that may be disposed along a first diagonal of the imaginary rectangle and the first and second dual-wheel motorized casters may be coupled to the base frame at third and fourth coupling regions that may be disposed along a second diagonal of the imaginary rectangle. Power drive circuitry of the second aspect may be coupled to motors of the first and second dual-wheel motorized casters to selectively drive the first and second dual-wheel motorized casters to propel the patient support apparatus along the floor and to selectively swivel the first and second dual-wheel motorized caster about respective first and second swivel axes. The power drive circuitry may include a battery and regenerative braking circuitry that may provide current generated by the motors of the first and second dual-wheel motorized casters during deceleration of the patient support apparatus to the battery to recharge the battery.

In some embodiments of the patient support apparatus of the second aspect, the power drive circuitry may include electronic brake circuitry that may be operable to cause deceleration of the patient support apparatus. For example, the electronic brake circuitry may include switches that each may be closed to apply a short across motor windings of the respective motors of the respective first and second dual-wheel motorized casters.

It is contemplated that the first and second dual-wheel motorized casters of the second aspect each may include first and second tires and first and second pancake motors that may be operable to rotate the respective first and second tires of each of the first and second dual-wheel motorized casters. Optionally, each of the first and second pancake motors may include an integrated planetary gear set. Further optionally, the first and second pancake motors may be embedded at least partially within respective hubs that may be coupled to the first and second tires of each of the first and second dual-wheel motorized casters.

In some embodiments of the second aspect, the first tire of each of the first and second dual-wheel motorized casters may include a first sidewall that faces away from the respective second tire and the second tire of each of the first and second dual-wheel motorized casters may include a second sidewall that faces away from the respective first tire. Optionally, no portion of either of the first pancake motors may extend beyond the respective first sidewall and no portion of either of the second pancake motors may extend beyond the respective second sidewall.

With regard to the second aspect, each of the first tires may have a first width that may be defined between first and second sidewalls of the respective first tire and each of the first pancake motors, in its entirety, may have a second width that may be no greater than the first width. If desired, no portion of each of the first pancake motors may extend beyond the respective first and second sidewalls of the corresponding first tire. Similarly, each of the second tires may have a third width that may be defined between third and fourth sidewalls of the respective second tire and each of the second pancake motors, in its entirety, may have a fourth width that may be no greater than the third width. If desired, no portion of each of the second pancake motors may extend beyond the respective third and fourth sidewalls of the corresponding second tire.

In some embodiments of the second aspect, each of the first and second pancake motors may include a pulse modulated direct current (DC) motor. Optionally, each of the first and second pancake motors of the second aspect may have Hall Effect sensors that may be configured to sense rotor position. Further optionally, each of the first and second pancake motors of the second aspect may be operable as an electric brake by applying a short across motor windings of the respective first and second pancake motors. Alternatively, each of the first and second pancake motors of the second aspect may be operable as an electric brake by being electrically signaled to drive in synchronization in a reverse rotary direction which may be opposite to a present rotary direction of the first and second pancake motors.

Optionally, the patient support apparatus of the second aspect further may include angle sensors coupled to the first and second dual-wheel motorized casters. The angle sensors may be configured to produce signals that may be used to determine a drive direction at which the patient support apparatus may be propelled. If desired, each of the angle sensors may include a slip ring. The present disclosure contemplates that each of the angle sensors of the second aspect may include a magnet that may be fixed relative to the base frame and a magnetic field sensor that may swivel with the respective first and second dual-wheel motorized caster about the corresponding swivel axis. Alternatively, each of the angle sensors of the second aspect may comprise a magnet field sensor that may be fixed relative to the base frame and a magnet that may swivel with the respective first and second dual-wheel motorized caster about the corresponding swivel axis.

In some embodiments, each of the first and second dual-wheel motorized casters of the second aspect further may include a respective caster shaft that may define the corresponding first and second caster swivel axis. An axle support may be coupled to the respective caster shaft for swiveling movement therewith about the corresponding first and second caster swivel axis. Furthermore, an axle may be coupled to the respective axle support. The axle may define a respective wheel rotation axis about which corresponding first and second wheels of each of the first and second dual-wheel motorized casters rotate. The first and second wheels of each of the first and second dual-wheel motorized casters of the second aspect may be coupled to the respective axle to swivel therewith about the corresponding first and second caster swivel axis.

If desired, the wheel rotation axes each may be substantially perpendicular to the respective first and second caster swivel axis. Optionally, each of the first and second caster swivel axes may be offset from the respective axle. Further optionally, each of the first and second caster swivel axes may intersect the respective axle. Still further optionally, each of the first and second caster swivel axes may intersect the respective wheel rotation axis. It is contemplated that each of the axle supports of the second aspect may extend from the respective caster shaft in a cantilevered manner. Alternatively or additionally, the first wheel and a first motor of each of the first and second dual-wheel motorized casters of the second aspect may be situated on a first side of the respective axle support and the second wheel and a second motor of each of the first and second dual-wheel motorized casters of the second aspect may be situated on a second side of the respective axle support.

In some embodiments, each of the first and second dual-wheel motorized casters of the second aspect may be drivable in a respective trailing orientation having the corresponding wheel rotation axis trailing the corresponding first and second caster swivel axis as the patient support apparatus is propelled along the floor. Furthermore, each of the first and second dual-wheel motorized casters of the second aspect may be drivable in a non-trailing orientation having the corresponding wheel rotation axis leading the corresponding first and second caster swivel axis as the patient support apparatus is propelled along the floor.

According to a third aspect of the present disclosure, a differential drive caster may include a caster shaft that may define a caster swivel axis, an axle support that may be coupled to the caster shaft for swiveling movement therewith about the caster swivel axis, an axle that may be coupled to the axle support and that may define a wheel rotation axis, a first wheel that may be rotatable relative to the axle about the wheel rotation axis, a second wheel that may be rotatable relative to the axle about the wheel rotation axis, a first motor that may be operable to rotate the first wheel about the wheel rotation axis, and a second motor that may be operable to rotate the second wheel about the wheel rotation axis. The first and second motors may be operable to rotate the first and second wheels in opposite directions to cause the caster shaft, the axle support, the axle, the first motor, the second motor, the first wheel, and the second wheel to all swivel about the caster swivel axis. The first and second motors may be operable to rotate the first and second wheels in common directions to propel the differential drive caster in a drive direction along an underlying surface. The differential drive caster of the third aspect may also include an angle sensor that, in turn, may include a first sensor portion that may be coupled to the caster shaft to swivel therewith about the caster swivel axis and a second sensor portion that may be decoupled from the caster shaft so as not to swivel therewith. The angle sensor of the third aspect may be configured to produce a signal from which the drive direction may be determinable.

In some embodiments, the angle sensor of the third aspect may include a slip ring. Optionally, the first sensor portion may include a magnet and the second sensor portion may include a magnetic field sensor. Alternatively, the first sensor portion may include a magnetic field sensor and the second sensor portion may include a magnet. The differential drive caster of the third aspect further may include a mounting tube within which the caster shaft may rotate about the caster swivel axis and the second sensor portion may be coupled to the mounting tube.

If desired, one of the first and second sensor portions of the third aspect may include a magnet and the other of the first and second sensor portions may include a magnetic field sensor. The angle sensor of the third aspect further may include sensor circuitry that may be operable to resolve a magnetic field that may be produced by the magnet and sensed by the magnetic field sensor into X and Y components. For example, the magnet may have a north pole and a south pole that may be aligned along a Y-axis. In such embodiments, the Y component of the magnetic field may be oriented along the Y-axis and the X component of the magnetic field may be oriented along an X-axis that may be perpendicular to the Y-axis. Optionally, the sensor circuitry of the third aspect also may be operable to resolve the magnetic field produced by the magnet and sensed by the magnetic field sensor into a Z component. For example, the Z component of the magnetic field may be oriented along a Z-axis that may be perpendicular to both the X-axis and the Y-axis.

In some embodiments of the differential drive caster of the third aspect, the sensor circuitry may be configured to be calibrated to account for residual magnetic fields that may be produced by the first and second motors and by an apparatus to which the differential drive caster may be coupled. If desired, the sensor circuitry may be configured to be calibrated by measuring static magnetic fields when the first sensor portion is moved to positions at about 0 degrees, +90 degrees, −90 degrees, and 180 degrees relative to the second sensor portion. Optionally, the sensor circuitry of the third aspect may be configured to perform an averaging operation to average magnetic field readings to account for time varying magnetic fields that may be produced by the first and second motors and produced in an ambient environment.

With regard to the differential drive caster of the third aspect, the caster swivel axis may be substantially perpendicular to the wheel rotation axis. Optionally, the caster swivel axis may be offset from the axle. Alternatively, the caster swivel axis may intersect the axle. Further optionally, the caster swivel axis may intersect the wheel rotation axis. The present disclosure contemplates that the drive direction may be substantially perpendicular to the wheel rotation axis. Furthermore, the drive direction also may be substantially perpendicular to the caster swivel axis.

In some embodiments of the differential drive caster of the third aspect, the axle support may extend from the caster shaft in a cantilevered manner. If desired, the first wheel and the first motor of the third aspect may be situated on a first side of the axle support and the second wheel and the second motor of the third aspect may be situated on a second side of the axle support.

If desired, the first wheel may include a first hub that may be mounted to the axle and a first tire that may be mounted to a first outer periphery of the first hub. Similarly, the second wheel may include a second hub that may be mounted to the axle and a second tire that may be mounted to a second outer periphery of the second hub. Optionally, the first motor may be embedded at least partially within the first hub and the second motor may be embedded at least partially within the second hub. Further optionally, the first tire of the third aspect may have a first sidewall that may face away from the axle support and the second tire of the third aspect may have a second sidewall that may face away from the axle support. Still further optionally, no portion of the first motor of the third aspect may extend beyond the first sidewall and no portion of the second motor of the third aspect may extend beyond the second sidewall.

In some embodiments of the differential drive caster of the third aspect, the first wheel may include a first tire that may have a first width defined between first and second sidewalls of the first tire and the first motor, in its entirety, may have a second width that may be no greater than the first width. Optionally, no portion of the first motor may extend beyond the first and second sidewalls of the first tire. In some embodiments of the third aspect, the second wheel may include a second tire that may have a third width that may be defined between third and fourth sidewalls of the second tire and the second motor, in its entirety, may have a fourth width that may be no greater than the third width. Optionally, no portion of the second motor may extend beyond the third and fourth sidewalls of the second tire. With regard to the differential drive caster of any of the third aspect, the first and second motors each may include a pancake motor with an integrated planetary gear set.

According to a fourth aspect of the present disclosure, a caster may include a caster shaft that may define a caster swivel axis, an axle support that may be coupled to the caster shaft for swiveling movement therewith about the caster swivel axis, an axle that may be coupled to the axle support and that may define a wheel rotation axis, a first wheel that may be rotatable relative to the axle about the wheel rotation axis, a first motor that may be situated at least partially within a first bore of the first wheel and that may be operable to rotate the first wheel about the wheel rotation axis, and a slip ring through which electrical current may flow to operate the first motor. The slip ring may include (i) a first printed circuit board that may have a first plurality of concentric, circular conductive traces that may be centered on the caster swivel axis, (ii) a second printed circuit board that may have a second plurality of concentric, circular conductive traces that may be centered on the caster swivel axis, and (iii) a plurality of conductive balls that may be sandwiched between the first and second printed circuit boards and that may be electrically contacting the first and second plurality of concentric, circular conductive traces for passage of electrical current therebetween. The first printed circuit board may be coupled to the caster shaft to swivel therewith about the caster swivel axis and the second printed circuit board may be decoupled from the caster shaft so as not to swivel therewith. The conductive balls of the plurality of conductive balls may be made of a nonmagnetic material.

In some embodiments of the fourth aspect, the plurality of conductive balls may include balls made of stainless steel. Alternatively or additionally, the plurality of conductive balls may include balls made of aluminum. Further alternatively or additionally, the plurality of conductive balls may include balls made of titanium. Still further alternatively or additionally, the plurality of conductive balls may include balls made of any of the following: brass, copper, bronze, or zinc.

Optionally, the slip ring of the fourth aspect further may include a first plastic race in which the first printed circuit board may be at least partially embedded and a second plastic race in which the second printed circuit board may be at least partially embedded. Further optionally, the slip ring of the fourth aspect further may include an angle sensor that may have a first sensor portion coupled to the first plastic race to swivel therewith about the caster swivel axis and a second sensor portion that may be coupled to the second plastic race. The angle sensor may be configured to produce a signal from which a drive direction of the caster may be determinable.

In some embodiments of the caster of the fourth aspect, the first sensor portion may include a magnet and the second sensor portion may include at least one magnetic field sensor. For example, the at least one magnetic field sensor may include four magnetic field sensors that may be spaced apart from each other by 90 degrees about the caster swivel axis. Optionally, the at least one magnetic field sensor may be mounted to the second printed circuit board. Further optionally, the at least one magnetic field sensor may be located radially outboard of a largest concentric, circular conductive trace of the second plurality of concentric, circular conductive traces. If desired, the magnet may be located radially outboard of a largest concentric, circular conductive trace of the first plurality of concentric, circular conductive traces. The present disclosure further contemplates that the angle sensor further may include a supplementary magnet that, if present, may be coupled to the first plastic race at a position that may be spaced 180 degrees from the magnet relative to the caster swivel axis.

In some embodiments of the caster of the fourth aspect, the first sensor portion may include at least one magnetic field sensor and the second sensor portion may include a magnet. In such embodiments, for example, the at least one magnetic field sensor may include four magnetic field sensors that may be spaced apart from each other by 90 degrees about the caster swivel axis. Optionally, the at least one magnetic field sensor may be mounted to the first printed circuit board. Further optionally, the at least one magnetic field sensor may be located radially outboard of a largest concentric, circular conductive trace of the first plurality of concentric, circular conductive traces. If desired, the magnet may be located radially outboard of a largest concentric, circular conductive trace of the second plurality of concentric, circular conductive traces. The present disclosure further contemplates that the angle sensor further may include a supplementary magnet that, if present, may be coupled to the second plastic race at a position spaced 180 degrees from the magnet relative to the caster swivel axis.

With regard to the caster of the fourth aspect, the slip ring may include an angle sensor that may have a first sensor portion that may swivel with the first printed circuit board about the caster swivel axis and a second sensor portion that may remain stationary relative to the second printed circuit board. In such embodiments, the angle sensor may be configured to produce a signal from which a drive direction of the caster may be determinable. For example, the drive direction may be substantially perpendicular to the wheel rotation axis. Alternatively or additionally, the drive direction also may be substantially perpendicular to the caster swivel axis.

Optionally, the angle sensor of the fourth aspect further may include sensor circuitry that may be configured to be calibrated to account for residual magnetic fields that may be produced by the first motor and by an apparatus to which the caster may be coupled. Further optionally, the sensor circuitry is configured to be calibrated by measuring static magnetic fields when the first sensor portion is moved to positions at about 0 degrees, +90 degrees, −90 degrees, and 180 degrees relative to the second sensor portion.

In some embodiments of the caster of the fourth aspect, the caster swivel axis may be substantially perpendicular to the wheel rotation axis. If desired, the caster swivel axis of the fourth aspect may be offset from the axle. Alternatively, the caster swivel axis of the fourth aspect may intersect the axle. Further alternatively, the caster swivel axis of the fourth aspect may intersect the wheel rotation axis.

Optionally, the axle of the fourth aspect may include a first axle portion that may be situated on a first side of the axle support and a second axle portion that may be situated on a second side of the axle support. The first motor of the fourth aspect may be coupled to the first axle portion. Further optionally, the caster of the fourth aspect may further include a second wheel that may be rotatable relative to the axle about the wheel rotation axis and a second motor that may be situated at least partially within a second bore of the second wheel. In such embodiments, the second motor may be operable to rotate the second wheel about the wheel rotation axis. If desired, the second motor may be coupled to second axle portion and electrical current to operate the second motor also may flow through the slip ring.

In some embodiments of the caster of the fourth aspect, the first wheel may include a first hub that may be mounted to the first axle portion and a first tire that may be mounted to a first outer periphery of the first hub. Similarly, the second wheel may include a second hub that may be mounted to the second axle portion and a second tire that may be mounted to a second outer periphery of the second hub. If desired, the first motor may be embedded at least partially within the first hub and the second motor may be embedded at least partially within the second hub.

Optionally, the first tire of the fourth aspect may have a first sidewall that may face away from the axle support and the second tire may have a second sidewall that faces away from the axle support. Further optionally, no portion of the first motor may extend beyond the first sidewall and no portion of the second motor may extend beyond the second sidewall. If desired, the first tire of the fourth aspect may have a first width that may be defined between first and second sidewalls of the first tire and the first motor, in its entirety, may have a second width that may be no greater than the first width. In some embodiments of the fourth aspect, no portion of the first motor may extend beyond the first and second sidewalls of the first tire. Similarly, the second tire of the fourth aspect may have a third width that may be defined between third and fourth sidewalls of the second tire and the second motor, in its entirety, may have a fourth width that may be no greater than the third width. Optionally, no portion of the second motor may extend beyond the third and fourth sidewalls of the second tire.

In some embodiments of the caster of the fourth aspect, the first and second motors each may include a pancake motor with an integrated planetary gear set. In embodiments of the caster of the fourth aspect in which the second motor is not present, then the first motor of the fourth aspect may include a pancake motor with an integrated planetary gear set. If desired, the caster of the fourth aspect further may include a mounting tube within which the caster shaft may rotate about the caster swivel axis and the second printed circuit board may be coupled to the mounting tube. Optionally, the caster of the fourth aspect further may include a magnetometer array that may be coupled to the slip ring and that may be configured to produce signals that may be used by processing circuitry to determine a drive direction of the caster.

According to a fifth aspect of the present disclosure, a patient support apparatus for propelling a patient along a floor may include a frame that may be configured to support a patient. The frame may include a base frame and an upper frame that may be supported above the base frame to raise, lower, and tilt relative to the base frame. The patient support apparatus of the fifth aspect may further include first, second, third, and fourth single-wheel casters that may be coupled to the base frame and that may engage the floor. Regions of the base frame to which the first, second, third, and fourth single-wheel casters may be coupled may form an imaginary rectangle when the base frame is viewed from above. Each of the first, second, third, and fourth single-wheel casters may include a respective first, second, third, and fourth motor that may be operable to drive a respective first, second, third, and fourth wheel of the corresponding first, second, third, and fourth caster to propel the patient support apparatus along the floor. The patient support apparatus of the fifth aspect also may include power drive circuitry that may be coupled to the first, second, third, and fourth motors. The power drive circuitry may be configured to command at least one of the first, second, third, and fourth motors to operate at a speed faster than a speed at which others of the first, second, third, and fourth motors may be operated so that the first, second, third, and fourth single-wheel casters may swivel about respective first, second, third, and fourth caster swivel axes thereby to cause the patient support apparatus to turn while being propelled along the floor.

In some embodiments of the patient support apparatus of the fifth aspect, the power drive circuitry may include a battery and regenerative braking circuitry to provide current generated by the first, second, third, and fourth motors of the corresponding first, second, third, and fourth single-wheel casters during deceleration of the patient support apparatus to the battery to recharge the battery. If desired, the power drive circuitry of the fifth aspect may include electronic brake circuitry that may be operable to cause deceleration of the patient support apparatus. Optionally, the electronic brake circuitry of the fifth aspect may include switches that each may be closed to apply a short across motor windings of the respective first, second, third, and fourth motors of the corresponding first, second, third, and fourth single-wheel casters.

With regard to the patient support apparatus of the fifth aspect, each of the first, second, third, and fourth motors may include a pancake motor. Optionally, the pancake motor of each of the first, second, third, and fourth motors of the fifth aspect may include an integrated planetary gear set. Alternatively or additionally, each of the pancake motors of the fifth aspect may be embedded at least partially within a respective hub of the corresponding first, second, third, and fourth single-wheel casters. Further alternatively or additionally, each of the first, second, third, and fourth single-wheel casters of the fifth aspect may include a tire that may include a first sidewall and a second sidewall that may face away from the respective first sidewall. If desired, no portion of the pancake motors of the first, second, third, and fourth single-wheel casters may extend beyond the first and second sidewalls of the respective tire.

In some embodiments, the pancake motors of each of the first, second, third, and fourth single-wheel casters may include a pulse modulated direct current (DC) motor. Optionally, the pancake motors of the each of the first, second, third, and fourth single-wheel casters of the fifth aspect may have a Hall Effect sensor that may be configured to sense rotor position. Further optionally, the pancake motors of each of the first, second, third, and fourth single-wheel casters may be operable as an electric brake in response to the power drive circuitry electrically signaling the pancake motors to drive in a reverse rotary direction which may be opposite to a present rotary direction of the pancake motors.

If desired, the patient support apparatus of the fifth aspect further may include first, second, third, and fourth angle sensors that may be coupled to the respective first, second, third, and fourth single-wheel casters. If present, each angle sensor may be configured to produce a signal that may be used by the power drive circuitry to determine a drive direction at which the respective first, second, third, and fourth single-wheel caster may be driven. Optionally, each of the first, second, third, and fourth angle sensors may be included in a slip ring of the respective first, second, third, and fourth single-wheel caster. Further optionally, each of the first, second, third, and fourth angle sensors may include a magnet that may be fixed relative to the base frame and a magnetic field sensor that may swivel with the respective first, second, third, and fourth single-wheel caster about the corresponding caster swivel axis. Alternatively, each of the first, second, third, and fourth angle sensors may include a magnet field sensor that may be fixed relative to the base frame and a magnet that may swivel with the respective first, second, third, and fourth single-wheel caster about the corresponding caster swivel axis.

In some embodiments of the patient support apparatus of the fifth aspect, the power drive circuitry may be configured to command at least at least one of the first, second, third, and fourth motors to operate at a speed faster than a speed at which others of the first, second, third, and fourth motors are operated so that the first, second, third, and fourth single-wheel casters swivel about the respective first, second, third, and fourth caster swivel axes thereby to cause the patient support apparatus to turn while being propelled along the floor. For example, two of the first, second, third, and fourth motors may be operated at a speed faster than a speed at which the other two of the first, second, third, and fourth motors may be operated.

With regard to the fifth aspect, it is contemplated that each of the first, second, third, and fourth single-wheel casters further may include a respective caster shaft that may define the corresponding first, second, third, and fourth caster swivel axis; an axle support that may be coupled to the respective caster shaft for swiveling movement therewith about the corresponding first, second, third, and fourth caster swivel axis; and an axle that may be coupled to the respective axle support. Each axle of the fifth aspect may define a respective wheel rotation axis about which the corresponding first, second, third, and fourth wheel of each of the first, second, third, and fourth single-wheel casters may rotate. The first, second, third, and fourth wheels and each of the first, second, third, and fourth motors of the respective first, second, third, and fourth single-wheel casters of the fifth aspect may be coupled to the respective axle to swivel therewith about the corresponding first, second, third, and fourth caster swivel axis.

In some embodiments of the patient support apparatus of the fifth aspect, the wheel rotation axes each may be substantially perpendicular to the respective first, second, third, and fourth caster swivel axis. Optionally, each of the first, second, third, and fourth caster swivel axes of the fifth aspect may be offset from the respective axle. Further optionally, each of the first, second, third, and fourth single-wheel casters of the fifth aspect may be drivable in a respective trailing orientation that may have the corresponding wheel rotation axis trailing the corresponding first, second, third, and fourth caster swivel axis as the patient support apparatus is propelled along the floor, and each of the first, second, third, and fourth single-wheel casters of the fifth aspect may be drivable in a non-trailing orientation that may have the corresponding wheel rotation axis leading the corresponding first, second, third, and fourth caster swivel axis as the patient support apparatus is propelled along the floor.

According to a sixth aspect of the present disclosure, a patient support apparatus for propelling a patient along a floor may include a frame that may be configured to support a patient. The frame may include, for example, a base frame and an upper frame that may be supported above the base frame to raise, lower, and tilt relative to the base frame. The patient support apparatus of the sixth aspect may include first and second single-wheel casters that may be coupled to the base frame and that may engage the floor and may also include first and second dual-wheel motorized casters that may be coupled to the base frame and that may engage the floor. Regions of the base frame of the sixth aspect to which the first and second single-wheel casters and the first and second dual-wheel motorized casters may be coupled may form an imaginary rectangle when the base frame is viewed from above. The first and second single-wheel casters of the sixth aspect may be coupled to the base frame at first and second coupling regions that may be disposed along a first diagonal of the imaginary rectangle and the first and second dual-wheel motorized casters may be coupled to the base frame at third and fourth coupling regions that may be disposed along a second diagonal of the imaginary rectangle. The patient support apparatus of the sixth aspect further may include power drive circuitry that may be coupled to first and second motors of the first dual-wheel motorized caster and may be coupled to third and fourth motors of the second dual-wheel motorized caster to selectively drive the first, second, third, and fourth motors of the first and second dual-wheel motorized casters to propel the patient support apparatus along the floor and to selectively swivel the first and second dual-wheel motorized caster about respective first and second caster swivel axes. The patient support apparatus of the sixth aspect further may have a user input to provide an input command to the power drive circuitry to indicate an input direction and an input speed at which the patient support apparatus may be propelled. The power drive circuitry may receive nine sensor inputs and may generate motor commands for the first, second, third, and fourth motors of the first and second dual-wheel motorized casters based on the nine inputs. The nine sensor inputs may include, for example, (1) a first angle at which the first dual-wheel motorized caster may be oriented relative to a longitudinal dimension of the frame, (2) a first angular velocity at which a first wheel of the first dual-wheel motorized caster may be rotated by the first motor, (3) a second angular velocity at which a second wheel of the first dual-wheel motorized caster may be rotated by the second motor, (4) a second angle at which the second dual-wheel motorized caster may be oriented relative to the longitudinal dimension of the frame, (5) a third angular velocity at which a third wheel of the second dual-wheel motorized caster may be rotated by the third motor, (6) a fourth angular velocity at which a fourth wheel of the second dual-wheel motorized caster may be rotated by the fourth motor, (7) a yaw rate at which a longitudinal axis of the frame may be rotating in a plane parallel to the floor, (8) a first acceleration at which the frame may be accelerating in the longitudinal dimension of the frame, and (9) a second acceleration at which the frame may be accelerating in a transverse direction that may be perpendicular to the longitudinal dimension of the frame.

In some embodiments of the sixth aspect, the yaw rate, the first acceleration, and the second acceleration may be sensed by a micro-electromechanical system (MEMS) integrated circuit chip. If desired, the MEMS integrated circuit chip may be coupled to the base frame at a position that may be substantially at a center of the imaginary rectangle. Optionally, the first dual-wheel motorized caster may include first and second tires and the second dual-wheel motorized caster may include third and fourth tires. The first and second motors of the sixth aspect may be coupled to the respective first and second tires and may include respective first and second pancake motors that may be operable to rotate the respective first and second tires. Similarly, the third and fourth motors of the sixth aspect may be coupled to the respective third and fourth tires and may include respective third and fourth pancake motors that may be operable to rotate the respective third and fourth tires.

Optionally, each of the first, second, third, and fourth pancake motors may include an integrated planetary gear set. Further optionally, the first, second, third, and fourth pancake motors may be embedded at least partially within respective hubs that may be coupled to the corresponding first, second, third, and fourth tires. With regard to the sixth aspect, the first tire of the first dual-wheel motorized caster may include a first sidewall that faces away from the second tire and the second tire of the first dual-wheel motorized caster may include a second sidewall that faces away from the first tire. In such embodiments of the third aspect, no portion of the first pancake motor may extend beyond the first sidewall and no portion of the second pancake motor may extend beyond the second sidewall. Similarly with regard to the sixth aspect, the third tire of the second dual-wheel motorized caster may include a third sidewall that faces away from the fourth tire and the fourth tire of the second dual-wheel motorized caster may include a fourth sidewall that faces away from the third tire. Optionally, no portion of the third pancake motor may extend beyond the third sidewall and no portion of the fourth pancake motor may extend beyond the fourth sidewall.

In some embodiments of the patient support apparatus of the sixth aspect, each of the first, second, third, and fourth tires may have a first width that may be defined between sidewalls of the respective first, second, third, and fourth tires. If desired, each of the first, second, third, and fourth pancake motors, in its entirety, may have a second width that is no greater than the first width. Optionally, therefore, no portion of each of the first, second, third, and fourth pancake motors may extend beyond the respective sidewalls of the corresponding first, second, third, and fourth tires.

It is contemplated by the present disclosure that each of the first, second, third, and fourth pancake motors of the sixth aspect may include a pulse modulated direct current (DC) motor. If desired, each of the first, second, third, and fourth pancake motors may have a rotor and each of the first, second, third, and fourth pancake motors also may have Hall Effect sensors that may be operable to sense rotor position. In such embodiments, signals from the Hall Effect sensors of the first, second, third, and fourth pancake motors may be used by the power drive circuitry to determine the respective first, second, third, and fourth angular velocities.

In some embodiments of the patient support apparatus of the sixth aspect, each of the first, second, third, and fourth pancake motors may be operable as an electric brake by applying a short across motor windings of the respective first, second, third, and fourth pancake motors. Alternatively or additionally, each of the first, second, third, and fourth pancake motors may be operable as an electric brake by being electrically signaled to drive in synchronization in a reverse rotary direction which may be opposite to a present rotary direction of the respective first, second, third, and fourth pancake motors.

Optionally, the patient support apparatus of the sixth aspect further may include angle sensors coupled to the first and second dual-wheel motorized casters. If present, the angle sensors of the sixth aspect may be configured to produce signals that may be used to determine the respective first and second directions. Further optionally, each of the angle sensors may be coupled to a slip ring through which current may be passed to operate the respective first, second, third, and fourth motors. If desired, each of the angle sensors may include a magnet that may be fixed relative to the base frame and a magnetic field sensor that may swivel with the respective first and second dual-wheel motorized caster about the corresponding first and second caster swivel axis. Alternatively, each of the angle sensors may include a magnet field sensor that may be fixed relative to the base frame and a magnet that may swivel with the respective first and second dual-wheel motorized caster about the corresponding first and second caster swivel axis.

In some embodiments, the patient support apparatus of the sixth aspect further may include a battery and regenerative braking circuitry to provide current generated by the first, second, third, and fourth motors of the first and second dual-wheel motorized casters during deceleration of the patient support apparatus to the battery to recharge the battery. Optionally, the power drive circuitry includes electronic brake circuitry that is operable to cause deceleration of the patient support apparatus.

Further with regard to the patient support apparatus of the sixth aspect, the power drive circuitry may be configured to calculate a first overall velocity of the patient support apparatus in the longitudinal dimension of the frame by mathematically integrating the first acceleration and the power drive circuitry may be configured to calculate a second overall velocity of the patient support in the transverse direction by mathematically integrating the second acceleration. Optionally, the power drive circuitry of the sixth aspect may be configured to determine first, second, third, and fourth wheel accelerations of the respective first, second, third, and fourth wheels by mathematically taking a derivative of the corresponding first, second, third, and fourth angular velocities. Further optionally, the power drive circuitry of the sixth aspect may implement traction control by limiting the first, second, third, and fourth accelerations to within acceleration thresholds to prevent slippage of the respective first, second, third, and fourth wheels. Still further optionally, the power drive circuitry of the sixth aspect may be configured to determine a distance traveled by the patient support apparatus based on a mathematical integration of at least one of the first, second, third, and fourth angular velocities and based on a diameter of the corresponding first, second, third, and fourth wheel of the respective first and second dual-wheel motorized caster.

In some embodiments, the patient support apparatus of the sixth embodiment further may include a weigh scale that may be coupled to the frame and that may be operable to determine a patient weight of a patient that may be supported by the frame. In such embodiments, the patient weight may be an additional input to the power drive circuitry which, in turn, may adjust an electronic braking feature of the first and second dual-wheel motorized casters based on the patient weight. Alternatively or additionally, the power drive circuitry may be configured to calculate kinetic energy of the patient support apparatus during movement along the floor based on overall weight of the patient support apparatus, including the patient weight, and based on overall velocity of the patient support apparatus.

With regard to the sixth aspect, the present disclosure contemplates that if the patient weight is above a weight threshold, then the power drive circuitry may implement a yaw rate restriction to limit the first, second, third, and fourth angular velocities of the respective first, second, third, and fourth wheels thereby to inhibit toppling of the patient support apparatus during turning of the patient support apparatus. Alternatively or additionally, if the patient weight is above a weight threshold, then the power drive circuitry of the sixth aspect may implement a forward speed restriction to limit the first, second, third, and fourth angular velocities of the respective first, second, third, and fourth wheels thereby to achieve a maximum stopping distance requirement during electronic braking of the first and second dual-wheel motorized casters. If desired, the user input of the sixth aspect may include a joystick.

In some embodiments of the patient support apparatus of the sixth aspect, each of the first and second dual-wheel motorized casters further may include a respective caster shaft that may define the corresponding first and second caster swivel axis, an axle support that may be coupled to the respective caster shaft for swiveling movement therewith about the corresponding first and second caster swivel axis, and an axle that may be coupled to the respective axle support. The axle may define a respective wheel rotation axis about which corresponding first, second, third, and fourth wheels of each of the first and second dual-wheel motorized casters rotate. Accordingly, the first, second, third, and fourth wheels of the respective first and second dual-wheel motorized casters of the sixth aspect may be coupled to the corresponding axle to swivel therewith about the corresponding first and second caster swivel axis.

Optionally, the wheel rotation axes of the sixth aspect each may be substantially perpendicular to the respective first and second caster swivel axis. Further optionally, each of the first and second caster swivel axes of the sixth aspect may be offset from the respective axle. Alternatively, each of the first and second caster swivel axes of the sixth aspect may intersect the respective axle. If desired, each of the first and second caster swivel axes of the sixth aspect may intersect the respective wheel rotation axis.

In some embodiments of the sixth aspect, each of the axle supports may extend from the respective caster shaft in a cantilevered manner. With regard to the sixth aspect, it is contemplated that the first wheel and the first motor of the first dual-wheel motorized caster may be situated on a first side of the respective axle support and the second wheel and the second motor of the first dual-wheel motorized caster may be situated on a second sided of the respective axle support. Similarly, the third wheel and the third motor of the second dual-wheel motorized caster of the sixth aspect may be situated on a third side of the respective axle support and the fourth wheel and the fourth motor of the second dual-wheel motorized caster may be situated on a fourth side of the respective axle support. If desired, each of the first and second dual-wheel motorized casters of the sixth aspect may be drivable in a respective trailing orientation having the corresponding wheel rotation axis trailing the corresponding first and second caster swivel axis as the patient support apparatus is propelled along the floor and each of the first and second dual-wheel motorized casters of the sixth aspect may be drivable in a non-trailing orientation having the corresponding wheel rotation axis leading the corresponding first and second caster swivel axis as the patient support apparatus is propelled along the floor.

According to a seventh aspect of the present disclosure, a patient support apparatus for propelling a patient along a floor may include a frame that may be configured to support a patient. The frame may include a base frame and an upper frame supported above the base frame to raise, lower, and tilt relative to the base frame. The patient support apparatus of the seventh aspect further may have first, second, third, and fourth single-wheel casters that may be coupled to the base frame and that may engage the floor. Regions of the base frame of the seventh aspect to which the first, second, third, and fourth single-wheel casters may be coupled may form an imaginary rectangle when the base frame is viewed from above. Each of the first, second, third, and fourth single-wheel casters of the seventh aspect may be freely swivelable relative to the base frame about a respective first, second, third, and fourth caster swivel axis. The patient support apparatus of the seventh aspect further may include a dual-wheel motorized caster that may be coupled to the base frame at a location that may correspond to a central region of the imaginary rectangle. The dual-wheel motorized caster of the seventh aspect may include a first wheel, a second wheel, and first and second pancake motors that may be operable to drive the respective first and second wheels to propel the patient support apparatus along the floor. The patient support apparatus of the seventh aspect also may include power drive circuitry that may be coupled to the first and second pancake motors. The power drive circuitry of the seventh aspect may be configured to command one of the first and second pancake motors to operate at a speed faster than a speed at which other of the first and second pancake motors may be operated so that the dual-wheel motorized caster may swivel about a fifth caster swivel axis thereby to cause the patient support apparatus to turn while being propelled along the floor.

In some embodiments, the power drive circuitry of the seventh aspect may include a battery and regenerative braking circuitry that may provide current generated by the first and second pancake motors during deceleration of the patient support apparatus to the battery to recharge the battery. Optionally, the power drive circuitry of the seventh aspect may include electronic brake circuitry that may be operable to cause deceleration of the patient support apparatus. Further optionally, the electronic brake circuitry of the seventh aspect may include switches that each may be closed to apply a short across motor windings of the respective first and second pancake motors.

If desired, the first and second pancake motors of the seventh aspect each may include an integrated planetary gear set. Optionally, each of the first and second pancake motors may be embedded at least partially within a respective hub of the corresponding first and second wheel. Further optionally, each of the first and second wheels may include a tire that includes a first sidewall and a second sidewall that may face away from the first sidewall and no portion of the first and second pancake motors may extend beyond the first and second sidewalls of the respective first and second tire.

In some embodiments of the patient support apparatus of the seventh aspect, the first and second pancake motors each may include a pulse modulated direct current (DC) motor. Alternatively or additionally, the first and second pancake motors of the seventh aspect each may have a Hall Effect sensor configured to sense rotor position. Further alternatively or additionally, the first and second pancake motors of the seventh aspect each may be operable as an electric brake in response to the power drive circuitry electrically signaling the pancake motors to drive in a reverse rotary direction which may be opposite to a present rotary direction of the respective first and second pancake motor.

Optionally, the patient support apparatus of the seventh aspect further may include an angle sensor coupled to the dual-wheel motorized caster. The angle sensor of the seventh aspect may be configured to produce a signal that may be used by the power drive circuitry to determine a drive direction at which the dual-wheel motorized caster is being driven. The angle sensor of the seventh aspect may be included in a slip ring of the dual-wheel motorized caster, for example. If desired, the angle sensor of the seventh aspect may include a magnet that may be fixed relative to the base frame and a magnetic field sensor that may swivel with the dual-wheel motorized caster about the fifth caster swivel axis. Alternatively, the angle sensor may include a magnet field sensor that may be fixed relative to the base frame and a magnet that may swivel with the dual-wheel motorized caster about the fifth caster swivel axis.

In some embodiments of the patient support apparatus of the seventh aspect, the dual-wheel motorized caster further may include a caster shaft that may define the fifth caster swivel axis, an axle support that may be coupled to the caster shaft for swiveling movement therewith about the fifth caster swivel axis, and an axle that may be coupled to the axle support. The axle of the seventh aspect may define a wheel rotation axis about which the first and second wheels may rotate. With regard to the seventh aspect, the first and second wheels and the first and second pancake motors may be coupled to the axle to swivel therewith about the fifth caster swivel axis.

Optionally, the fifth caster swivel axis of the seventh aspect may be substantially perpendicular to the wheel rotation axis. If desired, the fifth caster swivel axis of the seventh aspect may be offset from the axle. Alternatively, the fifth caster swivel axis of the seventh aspect may intersect the axle. Further alternatively, the fifth caster swivel axis of the seventh aspect may intersect the wheel rotation axis. In some embodiments of the seventh aspect, the axle support may extend from the caster shaft in a cantilevered manner. With regard to the seventh aspect, the first wheel and the first motor may be situated on a first side of the axle support and the second wheel and the second motor may be situated on a second side of the axle support. If desired, the dual-wheel motorized caster of the seventh aspect may be drivable in a trailing orientation having the wheel rotation axis trailing the fifth caster swivel axis as the patient support apparatus is propelled along the floor and the dual-wheel motorized caster of the seventh aspect may be drivable in a non-trailing orientation having the wheel rotation axis leading the fifth caster swivel axis as the patient support apparatus is propelled along the floor.

With regard to each of the first through seventh aspects of the present disclosure, it is contemplated that, other than the motors used to rotate the wheels, tires, and hubs, as the case may be, of the dual-wheel or single-wheel motorized casters, there is no additional motor or powered element that is dedicated to swiveling the respective caster about its respective swivel axis. Thus, the present disclosure contemplates that differential drive control of motorized wheels of casters is what results in swiveling motion of the respective dual-wheel or single-wheel motorized casters, as well as the swiveling movement of any non-motorized casters included in a patient support apparatus, or similar wheeled apparatus, with the motorized casters.

According to an eighth aspect of the present disclosure, a slip ring through which electrical current may flow may include a first printed circuit board that may have a first plurality of concentric, circular conductive traces that may be centered on a swivel axis and a second printed circuit board that may have a second plurality of concentric, circular conductive traces that may be centered on the swivel axis. The slip ring further may have a plurality of conductive balls that may be sandwiched between the first and second printed circuit boards and that may be electrically contacting the first and second plurality of concentric, circular conductive traces for passage of electrical current therebetween. The slip ring also may have a spacer that may hold the plurality of conductive balls in place between the first and second printed circuit boards while allowing rotation of at least one of the first and second printed circuit boards relative to the other of the first and second printed circuit boards about the swivel axis. The spacer may include a set of spokes that may extend radially between an inner spacer ring and an outer spacer ring. The spacer may have arced slots extending between respective pairs of spokes. The plurality of balls may be situated within the arced slots.

In some embodiments of the eighth aspect, the arced slots between each respective pair of spokes may include six arced slots and each of the arced slots may have a radius of curvature that may be centered on the swivel axis. If desired, the set of spokes may include four spokes that may be spaced apart about the swivel axis by 90 degrees. Optionally, the plurality of conductive balls of the eighth aspect may include a first set of conductive balls that may have a first diameter and a second set of conductive balls that may have a second diameter that may be larger than the first diameter. For example, the second set of conductive balls may be situated radially outwardly from the first set of conductive balls.

If desired, the first printed circuit board of the eighth aspect may have a stepped configuration to accommodate a size difference between the first diameter and the second diameter of the conductive balls of the first and second sets, respectively. Alternatively, the first printed circuit board and the second printed circuit board of the eighth aspect each may have a stepped configuration to accommodate a size difference between the first diameter and the second diameter of the conductive balls of the first and second sets, respectively.

In some embodiments, the slip ring of the eighth aspect further may include a first race to which the first printed circuit board may be coupled and a second race to which the second printed circuit board may be coupled. In some such embodiments, the first printed circuit board and the first race together may have a stepped configuration to accommodate a size difference between the first diameter and the second diameter of the conductive balls of the first and second sets, respectively. Alternatively, the first printed circuit board and the second printed circuit board together with the respective first and second races, respectively, each may have a stepped configuration to accommodate a size difference between the first diameter and the second diameter of the conductive balls of the first and second sets, respectively.

Optionally, the spacer of the eighth aspect may have a stepped configuration to accommodate a size difference between the first diameter and the second diameter of the conductive balls of the first and second sets, respectively. Further optionally, the conductive balls of the plurality of conductive balls may be made of a nonmagnetic material. For example, the plurality of conductive balls of the eighth aspect may include balls made of any of the following: stainless steel, aluminum, titanium, brass, copper, bronze, or zinc.

The present disclosure further contemplates that the slip ring of the eighth aspect further may include a first plastic race in which the first printed circuit board may be at least partially embedded and a second plastic race in which the second printed circuit board may be at least partially embedded. If desired, the slip ring of the eighth aspect further may include an angle sensor that may have a first sensor portion that may be coupled to the first plastic race and a second sensor portion that may be coupled to the second plastic race. The angle sensor may be configured to produce a signal from which an angular orientation of one of the first and second plastic races may be determinable relative to the other of the first and second plastic races.

In some embodiments of the eighth aspect, the first sensor portion may include a magnet and the second sensor portion may include at least one magnetic field sensor. For example, the at least one magnetic field sensor may include four magnetic field sensors that may be spaced apart from each other by 90 degrees about the swivel axis. Optionally, the at least one magnetic field sensor may be mounted to the second printed circuit board. Further optionally, the at least one magnetic field sensor may be located radially outboard of a largest concentric, circular conductive trace of the second plurality of concentric, circular conductive traces. If desired, the magnet may be located radially outboard of a largest concentric, circular conductive trace of the first plurality of concentric, circular conductive traces. The angle sensor of the eighth aspect further may include a supplementary magnet that may be coupled to the first plastic race at a position that may be spaced 180 degrees from the magnet relative to the swivel axis.

In some embodiments of the slip ring of the eighth aspect, the first sensor portion may include at least one magnetic field sensor and the second sensor portion may include a magnet. In such embodiments, for example, the at least one magnetic field sensor may include four magnetic field sensors that may be spaced apart from each other by 90 degrees about the caster swivel axis. Optionally, the at least one magnetic field sensor may be mounted to the first printed circuit board. Further optionally, the at least one magnetic field sensor may be located radially outboard of a largest concentric, circular conductive trace of the first plurality of concentric, circular conductive traces. Alternatively or additionally, the magnet may be located radially outboard of a largest concentric, circular conductive trace of the second plurality of concentric, circular conductive traces. If desired, the angle sensor further may include a supplementary magnet that may be coupled to the second plastic race at a position that may be spaced 180 degrees from the magnet relative to the swivel axis.

The present disclosure, therefore, contemplates that the slip ring of the eighth aspect further may include an angle sensor that may have a first sensor portion that may be coupled to the first printed circuit board and a second sensor portion that may be coupled to the second printed circuit board. In such embodiments, the angle sensor may be configured to produce a signal from which an angular orientation of one of the first and second printed circuit boards relative to the other of the first and second printed circuit boards may be determinable. Optionally, the angle sensor of the eighth aspect further may include sensor circuitry that may be configured to be calibrated to account for residual magnetic fields to which the angle sensor may be exposed. For example, the sensor circuitry may be configured to be calibrated by measuring static magnetic fields when the first sensor portion may be moved to positions at about 0 degrees, +90 degrees, −90 degrees, and 180 degrees relative to the second sensor portion about the swivel axis.

The slip ring of the eighth aspect, in each of its various embodiments, may be included in the differential drive casters of the first and third aspects; or in the patient support apparatuses of the second, fifth, sixth, and seventh aspects; or in the caster of the fourth aspect.

According to a ninth aspect of the present disclosure, a patient support apparatus for propelling a patient along a floor may include a frame that may be configured to support the patient and at least one dual-wheel motorized caster that may be coupled to the frame and that may engage the floor. The at least one dual-wheel motorized caster may have first and second motors and first and second wheels that may be coupled to the first and second motors, respectively. The patient support apparatus of the ninth aspect may further have power drive circuitry that may be coupled to the first and second motors of the at least one dual-wheel motorized caster to selectively drive the first and second motors to propel the patient support apparatus along the floor via rotation of the first and second wheels and to selectively swivel the at least one dual-wheel motorized caster about a caster swivel axes. The patient support apparatus of the ninth aspect further may include a joystick that may be movable to provide an input command to the power drive circuitry regarding propulsion of the patient support apparatus. The joystick may have a handle that may be movable into a dead band zone to command the power drive circuitry to swivel the at least one dual-wheel motorized caster into a drive orientation that may correspond to a drive direction of the patient support apparatus without propelling the patient support apparatus in the drive direction. The handle also may be movable from the dead band zone into a drive zone to command the power drive circuitry to propel the patient support apparatus in the drive direction via rotation of the first and second wheels by the first and second motors, respectively.

In some embodiments of the ninth aspect, the joystick may include a first user input that may be coupled to the handle and that may be engageable by a user. In such embodiments, movement of the joystick into the dead band zone may not swivel the dual-wheel motorized caster unless the first user input is engaged by the user. Similarly, movement of the joystick into the drive zone may not result rotation of the first and second wheels by the first and second motors, respectively, unless the first user input is engaged by the user. Optionally, the first user input may include a movable trigger. Further optionally, an upper portion of the handle may overhang the movable trigger.

If desired, the joystick further may include a second user input that may be coupled to the handle and that may be engageable by a user to move from a first position to a second position. The present disclosure contemplates that, when the second user input is in the first position and the drive direction is initially angled with respect to a longitudinal dimension of the patient support apparatus, the patient support apparatus may be propelled in a manner that may turn the patient support apparatus from an initial orientation into an orientation having the longitudinal dimension of the patient support apparatus parallel with the drive direction. However, when the second user input is in the second position and the drive direction is angled with respect to a longitudinal dimension of the patient support apparatus, the patient support apparatus may be propelled in a manner that may maintain the initial orientation of the patient support apparatus while the patient support apparatus is being propelled in the drive direction.

In some embodiments of the ninth aspect, the patient support apparatus further may include an accelerometer that may provide an accelerometer signal to the power drive circuitry which may sense how quickly the handle of the joystick may be moved within the dead band zone to determine how quickly to swivel the dual-wheel motorized caster. Optionally, the accelerometer signal also may be used by the power drive circuitry to determine an acceleration profile to implement based on how quickly the handle of the joystick may be moved within the drive zone. Further optionally, a speed at which the patient support apparatus may be propelled may be determined by the power derive circuitry based on how far into the drive zone the handle may be moved.

If desired, the power drive circuitry of the ninth aspect may implement an exponential acceleration profile for propelling the patient support apparatus upon initial propulsion of the patient support apparatus in response to the handle of the joystick being moved into the drive zone. Alternatively or additionally, the power drive circuitry of the ninth aspect may implement a linear deceleration profile in response to the joystick being moved into a neutral position within the dead band zone.

In some embodiments of the patient support apparatus of claim the ninth aspect, after being propelled and coming to a stop, the dual-wheel motorized caster may be left in the drive orientation that existed while the patient support apparatus was being propelled. Alternatively, after being propelled and coming to a stop, the dual-wheel motorized caster may be controlled by the power drive circuitry to swivel into a rest orientation that may have the drive direction oriented parallel with a longitudinal dimension of the patient support apparatus.

Optionally, the patient support apparatus of the ninth aspect, further may include at least one collision avoidance sensor that may be coupled to the frame and that may be operable to provide an obstacle detect sensor signal to the power drive circuitry. If desired, the power drive circuitry may use the obstacle detect sensor signal to cease propulsion of the patient support apparatus or to swivel the dual-wheel motorized caster so as to steer the patient support apparatus in a manner that may avoid or that may minimize a collision with a detected obstacle.

In some embodiments, the at least one collision avoidance sensor of the ninth aspect may include a first collision avoidance sensor that may be associated with a front of the frame, a second collision avoidance sensor that may be associated with a rear of the frame, a third collision avoidance sensor that may be associated with a right side of the frame, and a fourth collision avoidance sensor that may be associated with a left side of the frame. Optionally, the at least one collision avoidance sensor of the ninth aspect may include a first pair of collision avoidance sensors that may be associated with a front of the frame, a second pair of collision avoidance sensors that may be associated with a rear of the frame, a third pair of collision avoidance sensors that may be associated with a right side of the frame, and a fourth pair of collision avoidance sensors that may be associated with a left side of the frame.

The present disclosure contemplates that the at least one collision avoidance sensor of the ninth aspect may include at least one of the following sensor technologies: RADAR, LiDAR, video, forward looking infrared RADAR (FLIR), and ultrasound. If desired, the at least one collision avoidance sensor may include a first collision avoidance sensor that may operate according to a first technology of the following sensor technologies: RADAR, LiDAR, video, forward looking infrared RADAR (FLIR), and ultrasound, and the at least one collision avoidance sensor may include a second collision avoidance sensor that operates according to a second technology of the following sensor technologies: RADAR, LiDAR, video, forward looking infrared RADAR (FLIR), and ultrasound, with the second technology being different than the first technology.

In some embodiments of the patient support apparatus of the ninth aspect, the power drive circuitry may be configured for communication with other patient support apparatus to implement cooperative behavior between the patient support apparatuses for purposes of collision avoidance. For example, the cooperative behavior may comprise swarm behavior among three or more patient support apparatuses. Optionally, the patient support apparatus of the ninth aspect further may include a beacon emitter that may be coupled to the frame and that may be operable to emit a beacon during emergency transport which may result in the patient support apparatus being given higher priority in the cooperative behavior over other patient support apparatuses.

The present disclosure contemplates that the patient support apparatus of the ninth aspect may include any of the features found in the patient support apparatuses of the second, sixth, and seventh aspects. Alternatively or additionally, the present disclosure contemplates that at least one dual-wheel motorized caster of the ninth aspect may include any of the features found in the differential drive caster of the first and third aspects. Further alternatively or additionally, the present disclosure contemplates that the at least one dual-wheel motorized caster of the ninth aspect may include any of the features found in the caster of the fourth aspect. Still further alternatively or additionally, the present disclosure contemplates that the at least one dual-wheel motorized caster of the ninth aspect may include a slip ring having any of the features of the eighth aspect.

According to a tenth aspect of the present disclosure, a patient support apparatus for propelling a patient along a floor may include a frame that may be configured to support the patient, propulsion means that may be coupled to the frame and that may be operable to propel the patient support apparatus along the floor, and collision avoidance means that may be coupled to the frame. The collision avoidance means of the tenth aspect may be operable to detect an obstacle and may be operable to provide at least one signal to the propulsion means. The propulsion means of the tenth aspect may be configured to cease operation to stop propulsion of the patient support apparatus or to steer the patient support apparatus in a manner that may avoid or that may minimize a collision with the detected obstacle based on the at least one signal.

In some embodiments, the collision avoidance means of the tenth aspect may include a first collision avoidance sensor that may be associated with a front of the frame, a second collision avoidance sensor that may associated with a rear of the frame, a third collision avoidance sensor that may be associated with a right side of the frame, and a fourth collision avoidance sensor that may be associated with a left side of the frame. Optionally, the collision avoidance means of the tenth aspect may include a first pair of collision avoidance sensors that may be associated with a front of the frame, a second pair of collision avoidance sensors that may be associated with a rear of the frame, a third pair of collision avoidance sensors that may be associated with a right side of the frame, and a fourth pair of collision avoidance sensors that may be associated with a left side of the frame.

The present disclosure contemplates that the collision avoidance means of the tenth aspect may include at least one of the following sensor technologies: RADAR, LiDAR, video, forward looking infrared RADAR (FLIR), and ultrasound. If desired, the collision avoidance means of the tenth aspect may include a first collision avoidance sensor that may operate according to a first technology of the following sensor technologies: RADAR, LiDAR, video, forward looking infrared RADAR (FLIR), and ultrasound, and the collision avoidance means of the tenth aspect may also include a second collision avoidance sensor that may operate according to a second technology of the following sensor technologies: RADAR, LiDAR, video, forward looking infrared RADAR (FLIR), and ultrasound, with the second technology being different than the first technology.

In some embodiments of the patient support apparatus of the tenth aspect, the propulsion means further may be operable to communicate with one or more other patient support apparatuses to implement cooperative behavior between the patient support apparatuses for purposes of collision avoidance. For example, the cooperative behavior of the tenth aspect may comprise swarm behavior among three or more patient support apparatuses. Optionally, the patient support apparatus of the tenth aspect further may include a beacon emitter that may be coupled to the frame and that may be operable to emit a beacon during emergency transport which may result in the patient support apparatus of the tenth aspect being given higher priority in the cooperative behavior over other patient support apparatuses.

The present disclosure further contemplates that the propulsion means of the patient support apparatus of the tenth aspect may be configured to implement cooperative behavior based on messages that may be received from a high accuracy real time locating system (RTLS). Is desired, a locating tag may carried by the frame of the tenth aspect and may be in communication with the high accuracy RTLS to provide locating signals to the RTLS which may be used by the RTLS to determine a location of the patient support apparatus relative to other patient support apparatuses and relative to other obstacles in a healthcare facility. Optionally, the locating tag and the RTLS of the tenth aspect may communicate using ultra wideband (UWB) technology.

In some embodiments of the patient support apparatus of the tenth aspect, the propulsion means may be configured to operate in an autonomous mode to propel the patient support apparatus in an autonomous manner without any user input from a human operator and the propulsion means also may be configured to operate in a manual mode to propel the patient support apparatus based on user input. In some such embodiments, the propulsion means may be configured to issue an alert if an emergency condition is detected while operating in the autonomous mode. Optionally, the alert may be received by a remote computer and may be forwarded to a wireless communication device of an authorized caregiver that, when the emergency condition occurs, may be closest to the patient support apparatus as determined by a locating system that may be configured to determine caregiver locations. Further optionally, when the propulsion system of the tenth aspect operates in the autonomous mode, the propulsion means may be controlled by a remote server that may operate as an adaptive rules of the road (RotR) device to monitor traffic conditions and emergency conditions of multiple patient support apparatuses that each may be operating in a respective autonomous mode or manual mode, thereby to achieve avoidance of collisions between the multiple patient support apparatuses.

The present disclosure contemplates that the patient support apparatus of the tenth aspect may include any of features found in the patient support apparatuses of the second, sixth, seventh, eighth, and ninth aspects. Alternatively or additionally, the present disclosure contemplates that the propulsion means of the tenth aspect may include any of the features of the differential drive caster of the first and third aspects. Further alternatively or additionally, the present disclosure contemplates that the propulsion means of the tenth aspect may include any of the features of the caster of the fourth aspect. Still further alternatively or additionally, the present disclosure contemplates that the propulsion means of the tenth aspect may include a caster including a slip ring having any of the features of the eighth aspect.

According to an eleventh aspect of the present disclosure, a patient support apparatus for propelling a patient along a floor may include a frame that may be configured to support a patient. The frame may include a base frame and an upper frame that may be supported above the base frame to raise and lower relative to the base frame. The patient support apparatus of the eleventh aspect may also have first, second, third, and fourth mecanum wheels that may be coupled to the base frame and that may engage the floor. Each mecanum wheel may include a hub that may be rotatable about a hub axis which may be fixed with respect to the base frame. Each mecanum wheel may also include a motor that may be configured to rotate the hub about the hub axis and a plurality of diagonal rollers that may be rotatably coupled to the hub and that may be spaced from the hub axis so that the diagonal rollers may orbit about the hub axis when the hub is rotated about hub axis by the motor.

In some embodiments of the patient support apparatus of the eleventh aspect, the base frame may have a main portion, first and second arms that may extend in a cantilevered manner from a foot end of the main portion, and third and fourth arms that may extend in a cantilevered manner from a head end of the main portion. If desired, the first, second, third, and fourth mecanum wheels may be coupled to distal ends of the first, second, third, and fourth arms of the base frame, respectively.

Optionally, the base frame of the eleventh aspect may have a pair of longitudinally extending sides and may further include at least one optical sensor and at least one optical target located at each side of the pair of longitudinally extending sides. Further optionally, the at least one optical sensor may be configured to sense a second optical target that may be on a second patient support apparatus to assist in aligning the patient support apparatus with the second patient support apparatus for patient transfer. If desired, the at least one optical sensor at each side of the pair of longitudinally extending sides may include first and second optical sensors and the at least one optical target at each side of the pair of longitudinally extending sides may include a first optical sensor situated between the first and second optical sensors For example, the first optical sensor at each side of the pair of longitudinally extending sides may be situated midway between the respective first and second optical sensors at each side of the pair of longitudinally extending sides.

In some embodiments of the patient support apparatus the eleventh aspect, the first, second, third, and fourth mecanum wheels may be driven so as to auto-align the patient support apparatus alongside the second patient support apparatus. The present disclosure also contemplates that the patient support apparatus of the eleventh aspect may be configured to receive height data that may be transmitted wirelessly from the second patient support apparatus and that may correlate to a height of a second upper frame of the second patient support apparatus. Optionally, therefore, the patient support apparatus may be configured to automatically adjust an elevation of the upper frame to match an elevation of the second upper frame based on the height data. Further optionally, the patient support apparatus of the eleventh aspect may be configured to wirelessly transmit patient data to the second patient support apparatus after a patient is transferred from the patient support apparatus to the second patient support apparatus.

If desired, the patient support apparatus of the eleventh aspect may further include at least one patient presence sensor that may detect a presence of the patient supported by the upper frame and that may detect the patient's absence when the patient is no longer supported by the upper frame. For example, the at least one patient presence sensor may include at least one load cell. Optionally, if the optical sensor of the patient support apparatus detects the second optical target and if the patient presence sensor changes from detecting the present of the patient to detecting the patient's absence, the transmission of the patient data from the patient support apparatus to the second patient support apparatus may be triggered.

In some embodiments of the patient support apparatus of the eleventh aspect, the first mecanum wheel may be located at a left side foot end region of the base frame, the second mecanum wheel may be located at a right side foot end region of the base frame, the third mecanum wheel may be located at a left side head end region of the base frame, and the fourth mecanum wheel may be located at a right side head end region of the base frame. In such embodiments, to propel the patient support apparatus in a longitudinal direction, without turning, the first, second, third, and fourth mecanum wheels all may be rotated with an equivalent angular velocity in a same rotational direction. Alternatively, to propel the patient support apparatus of such embodiments in a lateral direction, without turning, the first and fourth mecanum wheels both may be rotated at an equivalent angular velocity in a first rotational direction while the second and third mecanum wheels both may be rotated with the equivalent angular velocity in a second rotational direction that is opposite to the first rotational direction.

Further alternatively, to propel the patient support apparatus of such embodiments in a diagonal direction, without turning, the first and fourth mecanum wheels both may be rotated at an equivalent angular velocity in a first rotational direction while the respective hubs of the second and third mecanum wheels both may be maintained rotationally stationary. Still further alternatively, to propel the patient support apparatus of such embodiments so as to turn about an imaginary turning point that may be offset laterally to a side of the patient support apparatus, the first and third mecanum wheels both may be rotated at an equivalent angular velocity in a first rotational direction while the respective hubs of the second and fourth mecanum wheels both may be maintained rotationally stationary.

Yet further alternatively, to propel the patient support apparatus of such embodiments so as to turn about an imaginary turning point that may be offset longitudinally to a rear of the patient support apparatus, the first and second mecanum wheels both may be rotated at an equivalent angular velocity but in opposite rotational directions while the respective hubs of the third and fourth mecanum wheels both may be maintained rotationally stationary. Still yet further alternatively, to rotate the patient support apparatus of such embodiments about an imaginary turning point that may be generally centered with respect to the patient support apparatus, the first and third mecanum wheels both may be rotated at an equivalent angular velocity in a first rotational direction while the second and fourth mecanum wheels both may be rotated with the equivalent angular velocity in a second rotational direction that is opposite to the first rotational direction.

In some embodiments of the patient support apparatus of the eleventh aspect, each roller of the plurality of rollers of each of the first, second, third, and fourth mecanum wheels may be crowned. Alternatively or additionally, each roller of the plurality of rollers of each of the first, second, third, and fourth mecanum wheels may be freely rotatable relative to the respective hub. Further alternatively or additionally, each roller of the plurality of rollers of each of the first, second, third, and fourth mecanum wheels may be rotatable about a respective roller axis that is neither perpendicular to nor parallel with the respective hub axis.

According to a twelfth aspect of the present disclosure, a surface system for supporting a patient and for transfer between a first patient support apparatus and a second patient support apparatus may be provided. The surface system may include a support surface that may have at least one deformable patient support element, and a tray that may be located beneath the support surface. The tray may have grasp loops that may be formed at its sides and ends and the tray may have a cleat catch on its underside. The surface of the twelfth aspect also may have a platter that may be located beneath the tray. The platter may have a cleat configured to detachably couple to the cleat catch of the tray. Furthermore, the platter may be configured to move upon rollers that may be supported by longitudinally extending guides of the first and second patient support apparatuses during transfer therebetween. Moreover, the tray and support surface may be detachable from the platter for evacuation as a unit in an emergency situation.

In some embodiments of the surface system of the twelfth aspect, the tray may include spaced apart first and second side edges and the first and second side edges may be formed to include notches. Additionally, the support surface may include a plurality of keys that may extend downwardly into the notches to couple the support surface to the tray. If desired, each key may include a resilient band and a retainer. Optionally, the resilient band may have a proximal end that may be attached to the support surface and a distal end that may be spaced from the proximal end. Further optionally, the retainer may be coupled to the distal end of the resilient band. If desired, the retainer of each key may be larger than a width dimension of each notch of the plurality of notches.

The present disclosure contemplates that the tray of the twelfth aspect may include at least one first section that may be articulatable relative to a second section. In such embodiments, at least some of the notches may be formed in the first section to maintain a portion of the support surface in place relative to the first section as the first section articulates.

In some embodiments of the surface system of the twelfth aspect, the support surface may include an upper support surface upon which the patient may lies and each of the grasp loops may have an upper grip portion that may be situated below the upper surface of the support surface. Alternatively or additionally, the tray may include at least one bottom panel that may underlie the support surface and the grasp loops may be formed in side and end panels that may extend upwardly from sides and ends, respectively, of the at least one bottom panel.

Optionally, the platter of the twelfth aspect may have a stepped configuration with a central region that may be recessed downwardly from a pair of side regions. If desired, the central region of the platter may have at least one artifact that may be adapted for detection by at least one proximity sensor of the first patient support apparatus. For example, the artifact may include a magnet and the at least one proximity sensor may include a Hall Effect sensor. The at least one artifact may include four artifacts that may be arranged to define a first quadrilateral and the at least one proximity sensor may include four proximity sensors that may be arranged to define a second quadrilateral. If desired, the at least one proximity sensor may be coupled to a top surface of a lift system of the first patient support apparatus.

In some embodiments of the surface system of the twelfth aspect, the pair of side regions of the platter may be configured to ride upon underlying rollers of the first patient support apparatus during transfer of the surface system between the first and second patient support apparatuses. Optionally, the rollers may be power-driven to effect the transfer of the surface system between the first and second patient support apparatuses.

According to a thirteenth aspect of the present disclosure, a patient support apparatus for use with a second patient support apparatus is provided. The patient support apparatus of the thirteenth aspect may include a frame that may, in turn, include a base frame and an upper frame. The patient support apparatus of the thirteenth aspect also may include a surface system that may be supported by the upper frame and that may be transferrable from the upper frame to the second patient support apparatus along a longitudinal dimension of the frame and away from a head end of the upper frame. Additionally, the patient support apparatus of the thirteenth aspect may include a ballast weight that may move from a foot end region of the base frame toward a head end region of the base frame as the surface system moves away from the head end of the upper frame to counter balance a portion of the surface system that may extend beyond a foot end of the upper frame.

In some embodiments the patient support apparatus of the thirteenth aspect further may include a driver to move the ballast weight between the head end region and foot end region of the base frame. For example, the driver may include a motor and a lead screw that may be rotated by the motor. In such embodiments, the ballast weight may be coupled to the lead screw to advance therealong as the lead screw is rotated by the motor.

The present disclosure also contemplates that the frame of the thirteenth aspect may include a lift that may interconnect the base frame with the upper frame. If desired, the lift may be operable to change an elevation of the upper frame relative to the base frame. Optionally, the ballast weight may move beneath a lower end of the lift when the ballast weight moves between the head end region and foot end region of the base frame. If desired, the base frame may include a lower platform along which the ballast weight may move, an upper platform that may support the lift, and a set of struts that may support the upper platform above the lower platform. Also if desired, the ballast weight may include one or more batteries.

In some embodiments, the surface system of the thirteenth aspect may include a support surface that may have at least one deformable patient support element and a tray that may be located beneath the support surface. The tray of the thirteenth aspect may have grasp loops that may be formed at its sides and ends. The tray of the thirteenth aspect also may have a cleat catch on its underside. The surface system of the thirteenth aspect further may have a platter that may be located beneath the tray. The platter of the thirteenth aspect may have a cleat that may be configured to detachably couple to the cleat catch of the tray. The platter of the thirteenth aspect may be configured to move upon rollers that may be supported by longitudinally extending guides of the first and second patient support apparatuses during transfer therebetween. The tray and support surface of the thirteenth aspect may be detachable from the platter for evacuation as a unit in an emergency situation.

In some embodiments of the patient support apparatus of the thirteenth aspect, the tray may include spaced apart first and second side edges and the first and second side edges may be formed to include notches. In such embodiments, the support surface may include a plurality of keys that may extend downwardly into the notches to couple the support surface to the tray. Optionally, each key may include a resilient band and a retainer. Further optionally, the resilient band may have a proximal end that may be attached to the support surface and a distal end that may be spaced from the proximal end. Still further optionally, the retainer may be coupled to the distal end of the resilient band. If desired, the retainer of each key may be larger than a width dimension of each notch of the plurality of notches.

In some embodiments of the patient support apparatus of the thirteenth embodiment, the tray may include at least one first section that may be articulatable relative to a second section and at least some of the notches may be formed in the first section to maintain a portion of the support surface in place relative to the first section as the first section articulates. If desired, the support surface of the thirteenth aspect may include an upper support surface upon which the patient may lie and each of the grasp loops may have an upper grip portion that may be situated below the upper surface of the support surface. Alternatively or additionally, the tray may include at least one bottom panel that may underlie the support surface and the grasp loops may be formed in side and end panels that may extend upwardly from sides and ends, respectively, of the at least one bottom panel.

The present disclosure also contemplates that the platter of the thirteenth aspect may have a stepped configuration with a central region that may be recessed downwardly from a pair of side regions. Optionally, the patient support apparatus of the thirteenth aspect further may include a proximity sensor that may be coupled to the upper frame and the central region of the platter may have at least one artifact that may be adapted for detection by the least one proximity sensor. For example, the artifact may include a magnet and the at least one proximity sensor may include a Hall Effect sensor.

In some embodiments, the patient support apparatus of the thirteenth aspect further may include a plurality of rollers that may be coupled to the upper frame and the pair of side regions of the platter may be configured to ride upon the rollers during transfer of the surface system from the patient support apparatus to the second patient support apparatus. If desired, the rollers may be power-driven to effect the transfer of the surface system between the patient support apparatus and the second patient support apparatus. Optionally, the patient support apparatus of the thirteenth aspect may further include first, second, third, and fourth mecanum wheels including any one or more of the features discussed above in connection with the eleventh aspect.

Additional features, which alone or in combination with any other feature(s), such as those listed above and those listed in the claims, may comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

The detailed description particularly refers to the accompanying figures in which.

DETAILED DESCRIPTION

The present disclosure relates primarily to steerable motorized casters that are employed, for example, on patient support apparatuses to propel the patient support apparatuses along an underlying floor. In some embodiments, the steerable motorized casters are dual-wheel casters having two wheels, each with respective drive motors. When it is desired to swivel the dual-motorized casters about a respective swivel axis, the two wheels are operated at different rotational speeds. Thus, a separate, third actuator to swivel the dual-wheel motorized caster is not needed. That is, the differential drive of the two wheels of the dual-wheel motorized caster accomplishes the swiveling. After the dual-wheel motorized casters are swiveled to the desired position, the two wheels of the dual-wheel motorized casters are operated at the same rotational speed to propel the patient support apparatus along the floor without swiveling of the dual-wheel motorized casters. FIGS. 1-12, 14, 15, 16A, and 16B relate to such dual-wheel motorized casters and patient support apparatus employing such casters. FIG. 13 shows an alternative embodiment in which four single-wheel motorized casters are used in a patient support apparatus, with each of the single wheel motorized casters being freely swivelable. To accomplish the swiveling of the single-wheel motorized casters, at least one of them is operated at a speed that is different than the others.

Figure 1:
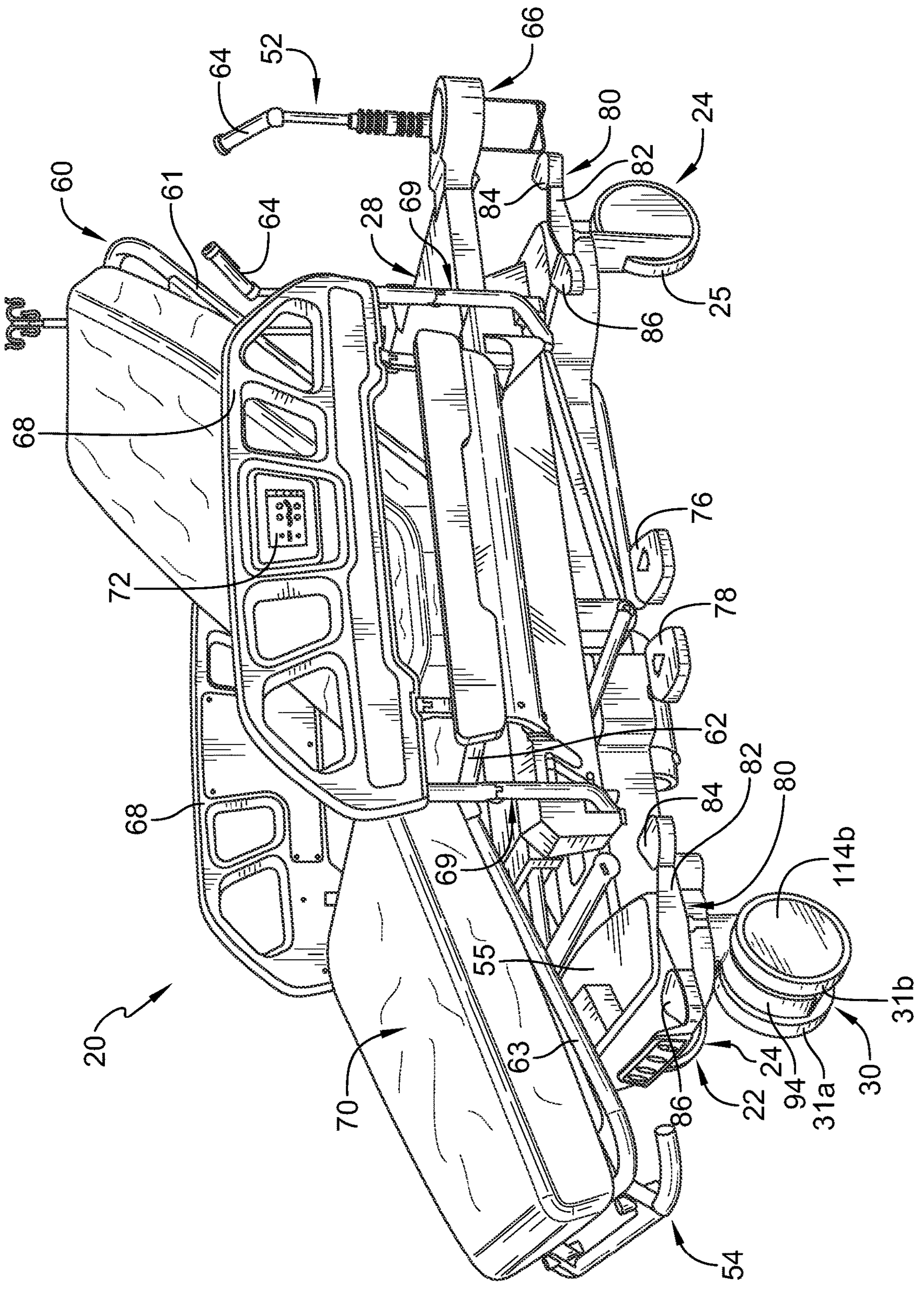
FIG. 1 is a perspective view of a patient support apparatus having two single-wheel non-motorized casters and two dual-wheel motorized casters coupled to a base frame.
Figure 2:
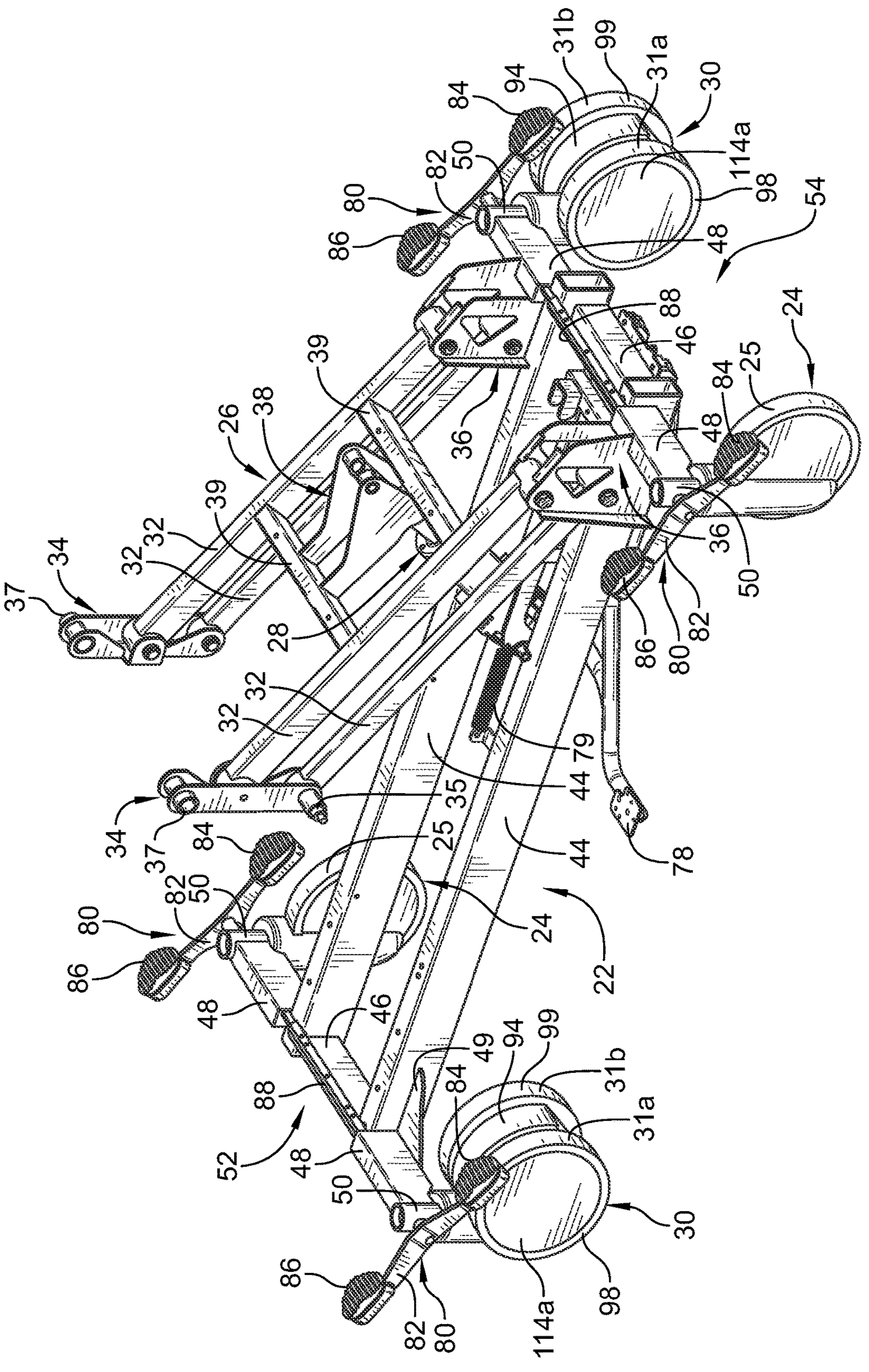
FIG. 2 is a perspective view of the base frame of the patient support apparatus of FIG. 1 showing the two single-wheel non-motorized casters at a rear left and front right corner of the base frame and showing the two dual-wheel motorized casters at the rear right and front left corner of the base frame.

An example of a patient support apparatus 20 is shown in FIG. 1 and further details of a portion of the illustrative patient support apparatus is shown in FIG. 2. This patient support apparatus 20 is given as just one example of the type of patient support apparatus in which motorized casters, either dual-wheel or single-wheel, may be used for propulsion. Accordingly, it should be appreciated that the teachings in the present disclosure are applicable to all types of patient support apparatuses as well as other maneuverable apparatuses having casters.

Patient support apparatus 20 includes a base 22 supported on an underlying floor by four casters, two of which are freely swivelable, single-wheel non-motorized casters 24 and two of which are dual-wheel motorized casters 30 as shown in FIGS. 1 and 2. Illustratively, patient support apparatus 20 is a stretcher but the present disclosure is also applicable to other types of patient support apparatuses such as patient beds and surgical tables, for example. Patient support apparatus 20 includes an upper frame 28, shown in FIG. 1, supported above base 22 by a lift assembly 26, shown in FIG. 2. Lift assembly 26 is operable to raise, lower, and tilt upper frame 28 relative to base 22. Lift assembly 26 includes a set of links 32, illustratively arranged as a pair of spaced parallelogram linkages that are moved by an actuator 28 such as a hydraulic cylinder or electrically operated linear actuator. Base 22 is sometimes referred to as a base frame 22 herein.

One or more additional actuators (not shown) of the lift assembly 26 interconnect upper brackets 34 of lift assembly 26 with upper frame 28 and are operable to tilt the upper frame from a horizontal position to Trendelenburg and reverse Trendelenburg positions, for example. One end of each of links 32 is pivotably coupled to a respective upper bracket 34 and an opposite end of each link is pivotably coupled to a respective lower bracket 36 that is attached to base frame 22 such as by welding as shown in FIG. 2. The one or more additional actuators act between pins 35 that extend from lower ends of brackets 34 and upper frame 28 which is supported for pivoting movement by joints 37 at the upper ends of brackets 34.

One end of actuator 28 is pivotably coupled to a first actuator bracket 38 which is connected to a pair of cross members 39 that interconnect upper links 32 of the parallelogram linkages of lift assembly 26. The other end of actuator 28 is pivotably coupled to base frame 22. Base frame 22 includes a pair of longitudinally extending frame members 44 and a pair of transverse frame members 46 which are located at opposite ends of frame members 44. Thus, frame members 44, 46 cooperate to form a rectangle when viewed from above (or from below). Base 22 further includes four laterally projecting frame members 48 that are each attached at their proximal ends, such as by welding, to respective longitudinal frame members of base frame 22. Frame members 44, 46, 48 make up the base frame 22 of patient support apparatus 20 in the illustrative example.

Mounting tubes 50 of each of casters 24, 30 are coupled, such as by welding, to the distal ends of each of laterally projecting frame members 48 of base frame 22. Reinforcement plates 49 (only one of which can be seen in FIG. 2) are attached to frame members 44, 48 at a head end 52 of base frame 22 to strengthen the connection therebetween. At a foot end 54 of base frame 22, brackets 36 serve to strengthen the connection between respective frame members 44, 48. Reference numbers 52, 54 are also used to denote the head end and foot end of the patient support apparatus 20 (sometimes referred to herein as "stretcher 20") as shown in FIG. 1. Base 22 also has a shroud 55 that covers frame members 44, 46, 48.

Referring once again to FIG. 1, upper frame 28 supports an articulated mattress support deck 60. Deck 60 has multiple sections including a head section 61, a thigh section 62, and a foot section 63. Deck also includes a seat section (not shown) that is situated between the head section 61 and thigh section 63. In some embodiments, each section 61, 62, 63 (and, optionally, the seat section) of deck 60 has a perimeter frame and a panel supported by the respective perimeter frame. In some embodiments, the panel of the seat deck section is coupled directly to frame members of the upper frame rather than having its own perimeter frame. If desired, the panels of deck 60 are constructed of radiolucent material so that a C-arm of an x-ray device or other similar imaging device may be used with the stretcher 20 to take images of a patient supported thereon. In some embodiments of stretcher 20, the articulation of panels 61, 62, 63 is assisted by one or more releasable gas springs (not shown) which provides some force to assist in movement of the sections 61, 62, 63 when being manually manipulated by a caregiver. In other embodiments, patient support apparatus 20 has one or more powered actuators (e.g., fluid operated hydraulic actuators or electrically power linear actuators) to move corresponding deck sections 61, 62, 63.

To assist with the mobility of the patient support apparatus 20, push handles 64 are attached to head end 52 of upper frame 28 and are gripped by a caregiver while moving stretcher 20 from one location to another in a healthcare facility. In the illustrative example, patient support apparatus 20 also includes a pair of oxygen tank holders 66 (only one of which can be seen in FIG. 1) at head end corner regions of upper frame 28. Stretcher 20 further includes a pair of siderails 68 coupled to the opposite sides of the upper frame 28 by respective linkage mechanisms 69 to permit the respective siderails 68 to be moved between raised positions, shown in FIG. 1, and lowered positions (not shown, but well known to those skilled in the art).

Patient support apparatus 20 further includes a support surface or mattress 70 supported on the deck 60 and movable with the deck 60 to support a patient in multiple positions, as desired. Additionally, in the illustrative example, patient support apparatus 20 includes a graphical user interface (GUI) 72 that is coupled to either or both siderails 68 and that is used by a caregiver to operate various functions of the patient support apparatus, such as a scale system that is built into the patient support apparatus 20 as is known in the art.

The lift assembly 26 of the illustrative embodiment of stretcher 20 is operated by a raise pedal 76, shown in FIG. 1, which is pressed downwardly and released one or more times by a user to manually operate the actuator 28 to extend so that links 32 of lift assembly 26 are raised. When pedal 76 is released, a return spring (not shown) moves pedal 76 back to its raised position. Pressing pedal 76 downwardly results in a volume of hydraulic fluid being pumped into a hydraulic cylinder of actuator 28, thereby to move a piston inside the hydraulic cylinder and extend a hydraulic piston rod relative to the hydraulic cylinder. Thus, the raise pedal 76 may require multiple downward activations to fully extend the piston rod out of the hydraulic cylinder of actuator 28 to move the lift assembly 26 all the way to its fully raised position. In other embodiments, the lift assembly 26 is powered upwardly to its raised position with a single press and hold of raise pedal 76. For example, pressing pedal 76 downwardly may turn on an electrically operated pump that pumps hydraulic fluid into the hydraulic cylinder of actuator 28 while pedal 76 is held down by the user's foot. Alternatively, in embodiments in which actuator 28 is an electrically operated linear actuator, pressing pedal 76 downwardly results in electrical power being applied to the linear actuator to extend the actuator while pedal 76 is held down. Alternatively or additionally, in some embodiments, GUI 72 includes user inputs (e.g., graphical buttons or icons) that are selected by a user to operate the electrically operated linear actuator or electrically operated pump to raise lift assembly 26.

A lower pedal 78 is also coupled to base frame 22 and is actuable to cause the lift assembly 16 to lower, thereby lowering the upper frame 28. Pressing pedal 78 downwardly opens a valve to a fluid reservoir (not shown) which results in hydraulic fluid flowing out of the hydraulic cylinder of actuator 28 to the fluid reservoir, thereby allowing the piston inside the hydraulic cylinder to move to retract the hydraulic piston rod relative to the hydraulic cylinder. When pedal 78 is released, a return spring 79, shown in FIG. 2, moves pedal 78 back to its raised position. In other embodiments, the lift assembly 26 is powered downwardly to its lowered position. For example, pressing pedal 78 downwardly may turn on an electrically operated pump that pumps hydraulic fluid into the hydraulic cylinder to retract the piston of actuator 28 while pedal 78 is held down by the user's foot. Alternatively, in embodiments in which actuator 28 is an electrically operated linear actuator, pressing pedal 78 downwardly results in electrical power being applied to the linear actuator to retract the actuator while pedal 78 is held down. Alternatively or additionally, in some embodiments, GUI 72 includes user inputs (e.g., graphical buttons or icons) that are selected by a user to operate the electrically operated linear actuator or electrically operated pump to lower lift assembly 26.

Illustrative patient support apparatus 20 also includes a caster braking mechanism supported by base frame 22. It is contemplated that the caster braking mechanism is operable to brake and release the single-wheel non-motorized casters 24. In a braked position of the caster braking mechanism, a brake element, such as a plunger, within casters 24 prevents rotation of wheels 25 of the respective casters 24. In a released or unbraked position of the caster braking mechanism, wheels 25 of casters 24 are able to freely rotate. With regard to the dual-wheel motorized casters 30, electromotive forces (EMF's) of motors internal to the casters 30 prevents wheels 31*a*, 31*b* of the respective casters 30 from rotating when the motors are de-energized. Of course, when the motors of casters 30 are energized to operate, wheels 31*a*, 31*b* are rotated under the power of the respective motors.

The caster braking mechanism includes four butterfly pedals 80 positioned at corner regions of base 22 as shown best in FIG. 2. Each butterfly pedal 80 includes an arm 82, a brake pedal 84 coupled to one end of arm 82, and a release pedal 86 coupled to an opposite end of arm 82. Stepping downwardly on pedal 84 moves the caster braking mechanism to the braked position, shown in FIG. 2, and stepping downwardly on pedal 86 moves the caster braking mechanism to the released position, shown in FIG. 1. The caster braking mechanism further includes a pair of laterally extending hexagonal rods (aka "hex rods") 88, one at the head end 52 and one at the foot end 54 of base frame 22 as shown in FIG. 2. Hex rods 88 extend between respective pairs of arms 82 of the corresponding butterfly pedals 80. More particularly, hex rods 88 extend through respective mounting tubes 50 of casters 24, 30, through interior regions of respective frame members 48, and over respective frame members 46. Thus, frame members 48 are offset upwardly relative to frame members 44, 46 of base frame 22 to provide access to the interior regions thereof.

As is known in the art, the single-wheel non-motorized casters 24 each include a cam mounted to the hex rod 88 within the respective mounting tube 50. The cams rotate with the hex rods 88 as the hex rods 88 are rotated by pedals 80. When any of the butterfly pedals 80 are moved to the braking position, a lobe of the cam of each caster 24 acts against an upper end of the respective internal plunger to push the plunger downwardly against the bias of an internal spring of the respective caster 24 so that a lower end of each plunger engages the outer circumferential surface of wheels 25, either directly or indirectly through another braking element, to prevent the rotation of wheels 25. When any of the butterfly pedals 80 are moved to the released position, the cams are rotated to permit the internal springs of casters 24 to raise the respective plungers out of engagement from the wheels 25 thereby allowing the wheels to freely rotate. It should be appreciated, therefore, that movement of any of pedals 80 to the braked position or released position, moves all of the pedals 80 to their respective braked positions or released positions, respectively. Accordingly, the braking mechanism of patient support apparatus 20 includes additional links (not shown), at least one of which extends through one of frame members 44, to interconnect hex rods 88 together to rotate in unison.

As noted above, in some embodiments, dual-wheel motorized casters 30 rely on the internal EMF of the motors for braking to prevent the respective wheels 31*a*, 31*b* from rotating when the motors are de-energized. Thus, casters 30 do not include any cams, plungers, or biasing springs therein for braking. Accordingly, hex rods 88 pass through mounting tubes 50 of casters 30 without otherwise interacting with any of the components of casters 50. However, one or more bushings (not shown) with hexagonal bores to receive hex rods 88 therethrough are provided in some embodiments to rotatably support hex rods 88 relative to mounting tubes 50 of casters 30. This arrangement allows for butterfly pedals 80 to be situated outboard of the dual-wheel motorized casters 30 to provide patient support apparatus with four-corner braking capability. In other embodiments, hex rods 88 do not pass through mounting tubes 50 of casters 30 and the butterfly pedals 80 that are shown adjacent to dual-wheel motorized casters 30 in the illustrative example are omitted. In still other embodiments, a set of mechanical linkages may be routed around mounting tubes 50 of casters 30 to support butterfly pedals 80 adjacent to casters 30 but without any elements of these alternative mechanical linkages extending into or through the respective mounting tubes 50.

Figures 3, 4, 5, 6, 7:
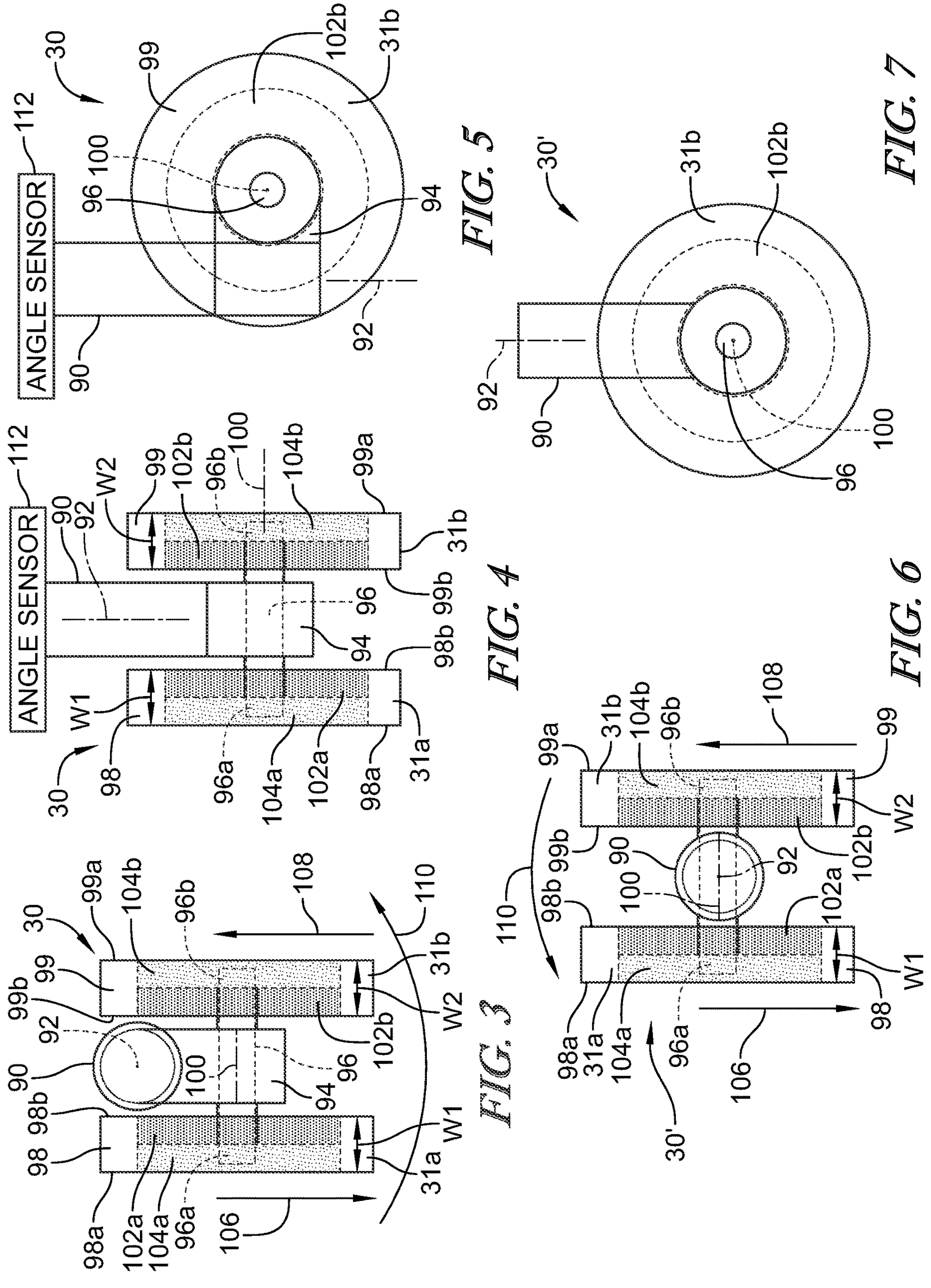
FIG. 3 is a diagrammatic top view of one of the dual-wheel motorized casters showing an axle support extending from a caster stem, an axle supported by the axle support, and first and second motorized wheels situated on opposite sides of the axle support.
FIG. 4 is a diagrammatic rear elevation view of the dual-wheel motorized caster of FIG. 3 showing an angle sensor situated atop the caster stem.
FIG. 5 is a diagrammatic left side view of the dual-wheel motorized caster of FIGS. 3 and 4 showing the axle support extending from the caster stem in a cantilevered manner.
FIG. 6 is a diagrammatic top view, similar to FIG. 3, of an alternative embodiment of a dual-wheel motorized caster in which the caster stem is situated over the axle.
FIG. 7 is a diagrammatic side view of the dual-wheel motorized caster of FIG. 6.

Referring now to FIGS. 3-5, dual-wheel motorized caster 30 is depicted diagrammatically. Caster 30 is sometimes referred to herein as a "differential drive caster" because wheels 31*a*, 31*b* are operated at different rotational speeds, as desired to swivel the casters 30. As shown in FIGS. 3-5, differential drive caster 30 includes a caster shaft 90 (sometimes referred to herein as a caster tube 90) that defines a caster swivel axis 92. Caster shaft 90 is received within a respective mounting tube 50 for rotation about axis 92. It should be appreciated that when base frame 22 is viewed from above (or below), the caster swivel axes 92 of casters 30 and the similar caster swivel axes of casters 24 are located at the four corners of an imaginary rectangle.

Still referring to FIGS. 3-5, caster 30 has an axle support 94 coupled to caster shaft 90 for swiveling movement therewith about caster swivel axis 92. Caster 30 further includes an axle 96 coupled to axle support 94. Axle 96 has a first axle portion 96*a* on a first side of axle support 94 and a second axle portion 96*b* on a second side of axle support 94. A first tire 98 of first wheel 31*a* is rotatable relative to first axle portion 96*a* and a second tire 99 of second wheel 31*b* is rotatable relative to second axle portion 96*b*. Axle 96 defines a rotation axis 100 about which tires 98, 99 of wheels 31*a*, 31*b* rotate relative respective axle portions 96*a*, 96*b*. Tires 98, 99 are solid in some embodiments and are air-filled in other embodiments. For example, tires 98, 99 are made of a solid rubber ring or other suitable durable and resilient material in some embodiments.

Each differential drive caster 30 includes a first pancake motor 102*a* and a first planetary gear set 104*a* that couples first tire 98 of first wheel 31*a* to first axle portion 96*a* and each differential drive caster 30 includes a second pancake motor 102*b* and a second planetary gear set 104*b* that couples the second tire 99 of the second wheel 31*b* to second axle portion 96*b*. In some embodiments, the first and second planetary gear sets 104*a*, 104*b* are integrated into the respective first and second pancake motors 102*a*, 102*b* in that the motors 102*a*, 102*b* are supplied together with the respective gear sets 104*a*, 104*b* in a pre-assembled state.

In the illustrative embodiment, the first and second pancake motors 102*a*, 102*b* are operable to rotate the first and second tires 98, 99 in opposite directions, as indicated in FIG. 3 by arrows 106, 108, respectively, to cause caster shaft 90, axle support 94, axle 96, first pancake motor 102*a* with first planetary gear set 104*a*, second pancake motor 102*b* with second planetary gear set 104*b*, first tire 98, and second tire 99 to all swivel about the caster swivel axis 92 as indicated by curved arrow 110 of FIG. 3. However, pancake motors 102*a*, 102*b* may be operated to rotate first and second tires 98, 99 of wheels 31*a*, 31*b* in the same direction, but at different speeds so as to swivel caster 30 while the patient support apparatus 20 is being propelled. To accommodate the ability of wheels 31*a*, 31*b* to rotate in opposite directions on axle 96, axle 96 is fixed to axle support 94. That is, in the illustrative embodiment, axle 96 does not rotate relative to axle support 94 about axis 100.

The term "pancake motor" as used herein is intended to distinguish over a standard cylindrical motor in which an air gap is situated radially between the stator and rotor of the motor. That is, in a pancake motor, an air gap is situated axially between the stator and rotor of the motor. Furthermore, in a pancake motor, the magnetic field flux lines through the air gap between stator and rotor extend primarily in the axial direction so as to be generally parallel with the axis of rotation of the rotor, whereas in a cylindrical motor, the magnetic flux lines through the air gap extend primarily in the radial direction generally perpendicular to the axis of rotation of the rotor. Therefore, a pancake motor is sometimes referred to as an axial flux motor. Another distinguishing feature of a pancake motor is that it is larger in the radial direction than in the axial direction, thereby appearing to be generally disk-like, similar to a "pancake" which its name implies. For example, a radial dimension of a pancake motor may be three or four times larger, or even more, than its axial dimension.

As is most apparent in FIG. 4, axes 92, 100 of differential drive caster 30 are generally perpendicular to each other. However, in FIGS. 3 and 5 it is apparent that axes 92, 100 are offset from each other. Thus, axes 92, 100 do not intersect in the illustrative example. In fact, axes 92, 100 of caster 30 are offset by a sufficient amount that axis 92 does not intersect any portion of axle 96. In the illustrative embodiment, axle support 94 extends from caster tube 90 in a cantilevered manner to support axle 96 away from caster tube 90. However, in an alternative embodiment caster 30' shown in FIGS. 6 and 7, caster swivel axis 92 intersects the axle 96 and, in fact, intersects the tire rotation axis 92.

Reference numbers are used in connection with caster 30' to denote the same components as caster 30, where appropriate, and the descriptions herein of such components are applicable to dual-wheel motorized casters 30 and to dual-wheel motorized casters 30'. Accordingly, in some embodiments of patient support apparatus 20 of FIGS. 1 and 2, casters 30' are used instead of casters 30. Furthermore, due to the ability of motors 102*a*, 102*b* to differentially drive wheels 31*a*, 31*b* of caster 30' at different speeds in the same direction, or in opposite directions 106, 108, respectively, caster 30' is able to swivel about caster swivel axis 92 as indicated by curved arrow 110 in FIG. 6.

In some embodiments, differential drive caster 30 includes an angle sensor 112 as shown diagrammatically in FIGS. 4 and 5. Caster 30' also may include an angle sensor 112 if desired. Angle sensor 112 has a first sensor portion coupled to caster shaft 90 to swivel or rotate therewith about caster swivel axis 92. Angle sensor 112 also includes a second sensor portion that is decoupled from caster shaft 90 so as not to swivel or rotate therewith. For example, the second sensor portion of angle sensor 112 is attached to mounting tube 50 or to some other structure that is stationary relative to mounting tube 50. Angle sensor 112 is configured to produce a signal from which a drive direction of caster 30 is determinable. In general, the drive direction of caster 30 is a horizontal direction (assuming patient support apparatus 20 is being propelled along a floor that is horizontal) that is perpendicular to wheel rotation axis 100 of axle 96 and perpendicular to swivel axis 92 caster shaft 90.

As will be described in further detail below, angle sensor 112 may include a slip ring or may be included in a slip ring, for example. As will also be described in further detail below, the first sensor portion of angle sensor 112 may include a magnet and the second sensor portion of angle sensor 112 may include a magnetic field sensor. Alternatively, the first sensor portion of angle sensor 112 may include a magnetic field sensor and the second sensor portion of angle sensor 112 may include a magnet.

In some embodiments, differential drive caster 30 includes a first hub 114*a*, shown in FIG. 2 for example, that is mounted to first axle portion 96*a* and a second hub 114*b*, shown in FIG. 1 for example, mounted to second axle portion 96*b*. First tire 98 is mounted to an outer periphery of first hub 114*a* and second tire 99 is mounted to an outer periphery of second hub 114*b*. Optionally, first pancake motor 102*a* along with its associated planetary gear set 104*a* may be embedded at least partially within first hub 114*a* and second pancake motor 102*b* along with its associated planetary gear set 104*b* may be embedded at least partially within second hub. In some embodiments, first pancake motor 102*a* is situated between first hub 114*a* and axle support 94 and second pancake motor 102*b* is situated between the second hub 114*b* and axle support 94.

As shown in FIGS. 3, 4, and 6, first tire 98 has first and second sidewalls 98*a*, 98*b*. Similarly, second tire 99 has first and second sidewalls 99*a*, 99*b*. Sidewall 98*a* of first tire 98 and sidewall 99*a* of second tire 99 each face away from axle support 94. Sidewalls 98*b*, 99*b* of respective tires 98, 99 face toward axle support 94 and toward caster shaft 90. In the illustrative example, no portion of first pancake motor 102*a* extends beyond either of sidewalls 98*a*, 98*b* of first tire 98 and no portion of second pancake motor 102*b* extends beyond sidewalls 99*a*, 99*b* of tire 99. Similarly, no portion of first planetary gear set 104*a* extends beyond either of sidewalls 98*a*, 98*b* of first tire 98 and no portion of second planetary gear set 1024*b* extends beyond sidewalls 99*a*, 99*b* of tire 99.

Still with reference to FIGS. 3, 4, and 6, first tire 98 has a first width W1 defined between sidewalls 98*a*, 98*b* of first tire 98 and second tire 99 has a second width W2 defined between sidewalls 99*a*, 99*b*. Furthermore, the first pancake motor 102*a*, either alone or with its associated planetary gear set 104*a*, has a third width that is no greater than the first width W1. Thus, no portion of first pancake motor 102*a* and no portion of planetary gear set 104*a* extends beyond either of first and second sidewalls 98*a*, 98*b* of first tire 98 in the illustrative embodiment. Similarly, the second pancake motor 102*b*, either alone or with its associated planetary gear set 104*b*, has a fourth width (which may be substantially equal to the third width) that is no greater than the second width W2. Thus, no portion of second pancake motor 102*b* and no portion of planetary gear set 104*b* extends beyond either of first and second sidewalls 99*a*, 99*b* of second tire 99 in the illustrative embodiment.

In other embodiments, portions of motors 102*a*, 102*b* and/or planetary gear sets 104*a*, 104*b* may extend beyond respective sidewalls 98*a*, 98*b*, 99*a*, 99*b* of tires 98, 99, but it is preferable to keeps this to a minimum to lessen the chance of inadvertent contact of these components with objects or obstacles in the ambient environment. If the combined widths of respective motors 102*a*, 102*b* and corresponding gear sets 104*a*, 104*b* need to be wider than respective widths W1, W2 of tires 98, 99, it is preferable that any excess width extends beyond sidewalls 98*b*, 99*b* of tires 98, 99 toward axle support 94, rather than extending beyond respective sidewalls 98*a*, 99*b*.

In some embodiments, each of first and second pancake motors 102*a*, 102*b* includes a pulse modulated direct current (DC) motor. Furthermore, each of first and second pancake motors 102*a*, 102*b* have Hall Effect sensors configured to sense rotor position in some embodiments. The present disclosure further contemplates that each of first and second pancake motors 102*a*, 102*b* may be operable as an electric brake by applying a short across motor windings of the respective first and second pancake motors 102*a*, 102*b*. Alternatively, each of first and second pancake motors 102*a*, 102*b* may be operable as an electric brake by being electrically signaled to drive in synchronization in a reverse rotary direction which is opposite to a present rotary direction of the first and second pancake motors 102*a*, 102*b*.

Based on the foregoing, it should be appreciated that differential drive casters 30, 30' each have two drive wheels 31*a*, 31*b* included in a single caster assembly, driven independently from one another about axis 100 via a an in-hub motor or alternatively, an out of hub motor, with direction sensing of the caster 30, 30' by angle sensor 112 for input to an automatic control system for direction control as will be discussed in further detail below. The two drive wheels 31*a*, 31*b* of each caster 30, 30' are either driven at the same rotational speed about axis 100 relative to each other, which results in motion of the caster 30, 30' in the direction it is pointed, or are driven in opposite directions or at different rotational speeds in the same direction about axis 100 relative to each other, which results in a torque about respective swivel axis 92, causing a yawing moment for the caster 30, 30' thereby rotating the respective caster shaft 90 within the corresponding mounting tube 50 about axis 92.

The first and second planetary gear sets 104*a*, 104*b* are used to obtain an acceptable combination of speed and torque for driving the respective drive wheels 31*a*, 31*b* of casters 30, 30'. The planetary gear sets 104*a*, 104*b*, which interconnect the rotor outputs of the respective motors 102*a*, 102*b* with the corresponding wheels 31*a*, 31*b*, operate to reduce the speed from the rotor outputs of the respective motors 102*a*, 102*b* and provide the torque required for driving/stopping the corresponding wheels 31*a*, 31*b*. In this physical configuration, planetary gear sets 104*a*, 104*b* are suitable and give the desired speed reduction in a small package in the dimension along axle 96. Inclusion of angle sensor 112 in caster 30 or caster 30', as the case may be, allows the wheels 31*a*, 31*b* of these casters 30, 30' to be driven in a drive direction commanded by a user input as will be described in further detail below.

In some embodiments, because the angle of casters 30 relative to the stretcher 20 or base frame 22 is always known based on the output signal from the respective angle sensors 112, and because there is differential control of the drive direction of casters 30 relative to the frame 22, it is possible to drive casters 30 in an orientation which would normally cause a 180° reversal of the direction of casters 30 due to the torque moment caused by the offset of axis 100 of axle 96 relative to the swivel axis 92 of caster 30. That is, because the drive direction of each of casters 30 is under closed loop control, the present disclosure contemplates that each caster 30 can be driven stably in any direction without the need to execute a 180° reversal of the casters 30. Stated another way, each dual-wheel motorized caster 30 is drivable in a trailing orientation having wheel rotation axis 100 trailing caster swivel axis 92 as patient support apparatus 20 is propelled along the floor, and each dual-wheel motorized caster 30 is also drivable in a non-trailing orientation (aka leading orientation) having wheel rotation axis 100 leading caster swivel axis 92 as patient support apparatus 20 is propelled along the floor. In the trailing orientation, therefore, axle support 94 extends from caster shaft 90 in a direction opposite from the drive direction of caster 30 and, in the leading orientation, axle support 94 extends from caster shaft 90 in the same direction as the drive direction of caster 90.

As noted above, angle sensor 112 is sometimes included in a slip ring. As will be discussed in further detail below, in some embodiments, casters 30, 30' include a slip ring configured to provide power and communication to the control electronics collocated with the drive motors 102*a*, 102*b* of the respective caster 30, 30'. Thus, some of the electrical circuitry of the control electronics (aka power drive circuitry) is included within casters 30, 30' themselves, such being coupled to axle support 94 and/or caster tube 90 to rotate therewith about axis 92. The slip rings of casters 30, 30', therefore, provide a continuous connection to the power and communication source in the control system of the patient support apparatus 20. Use of such a slip ring allows for an unlimited number of rotations of casters 30, 30' about axis 92 in either direction without concern about having to 'unwind' the caster 30, 30' due to any angularly restricted tether on the caster such as may be found in some prior art motorized casters.

Caster 30' may be referred to as a "non-cantilevered" dual-wheel motorized caster 30' which resembles, for example, an aircraft nose wheel truck design. That is, a cantilevered axle support 94 like that provided in caster 30 is absent from caster 30'. By omitting the cantilevered design aspect from caster 30' as compared to caster 30, a resistance to swiveling about axis 92 due to a compound mechanical force component including weight of the motor 102*a*, 102*b* and gearbox 104*a*, 104*b* combination plus the weight of the patient support apparatus 20 acting through the cantilevered wheels 31*a*, 31*b* is avoided. That is, less driving force by motors 102*a*, 102*b* is needed to swivel caster 30' about axis 92 than is required in caster 30. Moreover, the non-cantilevered design of caster 30' eliminates attendant bending moments in caster tube 90 of the type that are incurred in the cantilevered design of caster 30 due to the use of axle support 94 in caster 90.

In some prior art motorized caster designs, a motor and gearbox may be housed in an enclosure designed to bear the reactive forces between the wheel and the stem of the caster/truck assembly. This requires that the reactive forces be transmitted through both the gearbox case and the motor case. This can necessitate a large, heavy and expensive enclosure for the motor and gearbox, and makes the integration of the motor and gearbox more difficult, perhaps necessitating a secondary shaft inside the motor/gearbox assembly to provide a support mechanism for the sun gear in a planetary gearbox. The non-cantilevered design of caster 30' of the present disclosure avoids these drawbacks. In particular, caster 30' uses an integral axle 96 whereby the motors 102*a*, 102*b*, gearboxes 104*a*, 104*b*, and wheels 31*a*, 31*b* can move at independent speeds from each other about axle 96 which permits motors 102*a*, 102*b* to spin at the optimal speed to produce the motor's speed torque requirements and to produce the speed and torque requirements for wheels 31*a*, 31*b* via planetary gear sets 104*a*, 104*b*.

Moreover, the common, central axle 96 used in caster 30' for the non-cantilevered caster/truck design avoids cantilevered loads as a result of caster swivel axis 92 intersecting wheel rotation axis 100 of axle 96 on which motors 102*a*, 102*b*, gearboxes 104*a*, 104*b*, and wheels 31*a*, 31*b* run. Assuming sufficient stiffness of the axle 94 to the applied loads, there are no bending moments imposed on motors 102*a*, 102*b* or gearboxes 104*a*, 104*b* in the non-cantilevered design. The axle 94 takes up all of these moments, enabling the individual components to be stiff in only the direction perpendicular to the axis 100 of the axle 94 instead of stiff in two directions as would be the case if the motors 102*a*, 102*b* and gearboxes 104*a*, 104*b* were taking up bending loads. The non-cantilevered design of caster 30' is also much more tolerant of shock loads, which can be ten times or more of the maximum weight of the patient support apparatus 20 and the patient as supported by the casters 24, 30'.

In a variant of caster 30', rather than the having capability to rotate an unlimited number of times about caster swivel axis 92, caster 30' is permitted to only rotate or swivel by 180° about axis 90. This is possible because, to achieve the other 180° of drive direction so as to permit the drive direction to encompass a full 360° about axis 92, the rotational directions of motors 102*a*, 102*b* are reversed thereby achieving the ability to drive caster 30' in any direction of travel relative to axis 92. Such a variant of caster 30' eases the design task of constructing a direction sensor, by restricting the range of motion required to be sensed to 180°.

With regard to non-cantilevered caster 30' and its variant, if the drive direction is to be adjusted while the patient support apparatus 20 is in a stopped condition, the drive angle of caster 30' can be adjusted without any motion of the base frame 22, upper frame 28, and deck 60 of the patient support apparatus, because the tires 98, 99 of caster 30' will be moving about axis 92 by an equivalent amount with no net force against the caster tube or stem 90, assuming the wheels 98, 99 are moved at the same angular rate about axis 92 while rotating about axis 100 at the same rotational speed in opposite directions. Also, the amount of time it takes for the non-cantilevered caster 30' to move into a new direction that is perpendicular to an old direction (e.g., from purely side-to-side motion to motion aligned with a longitudinal axis of the stretcher 20) is faster than the cantilevered caster 30, because the wheels 98, 99 of caster 30' do not have to traverse an arced path to compensate for the cantilever distance while changing direction by 90°.

Figure 8:
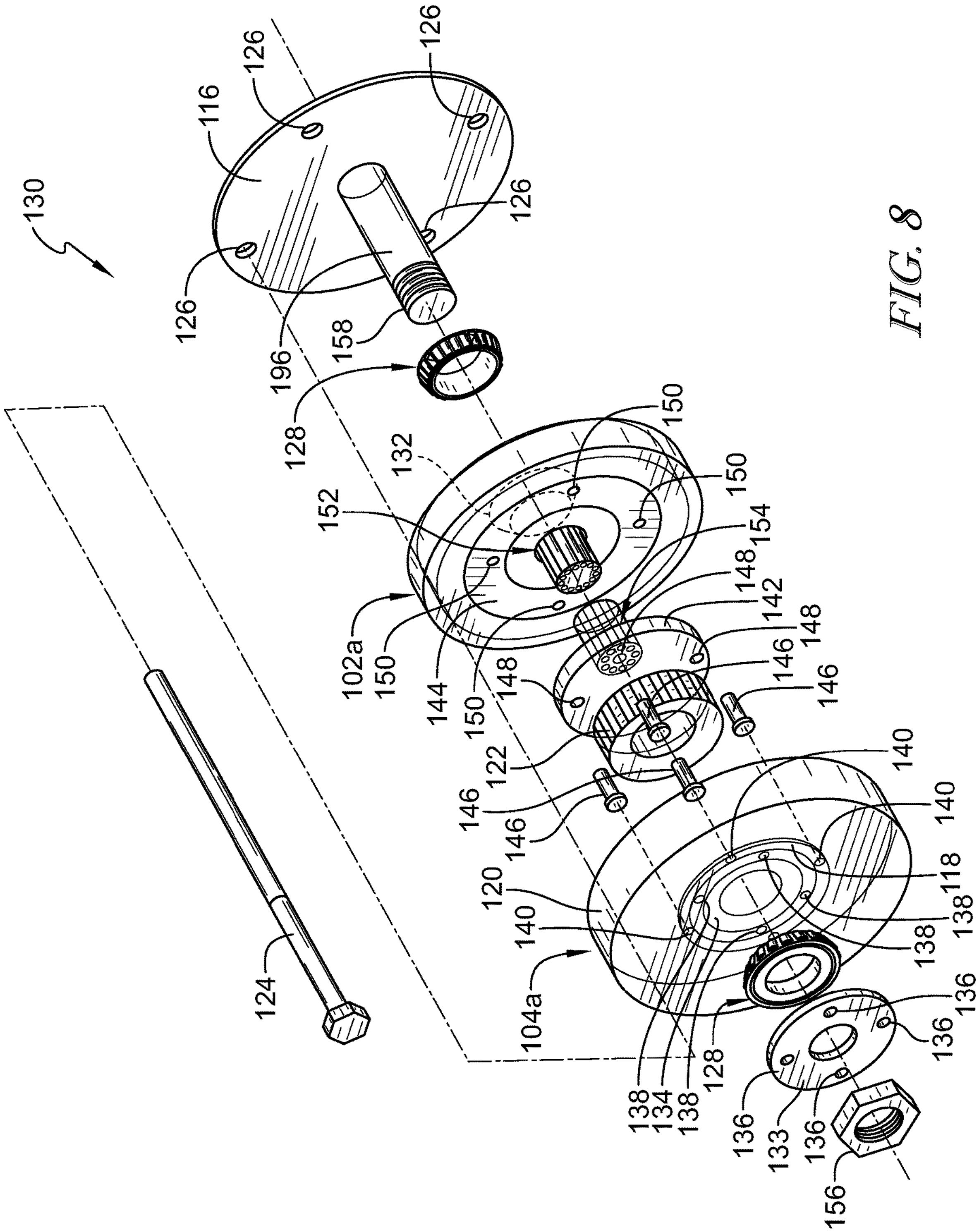
FIG. 8 is an exploded view of a motor included in each wheel of the two dual-wheel motorized casters of FIGS. 3-7, the motor including an integrated planetary gear set.

Referring now to FIG. 8, an exploded view of a portion of an alternative dual-wheel motorized caster 130 is shown. Caster 130 includes pancake motor 102*a* and planetary gear set 104*a* like casters 30, 30' described above, but caster 130 has an axle 196 extending in a cantilevered manner from a mounting plate 116 which attaches to an axle support, similar to axle support 94, or attaches directly to a caster tube, similar to caster tube 90. The dual-wheel motorized caster 130 also includes motor 102*b* and planetary gear box 104*b*, along with other components like those shown in FIG. 8, but these are not shown and are included on an opposite side of the respective axle support or caster tube. The wheel 31*a* (not shown) of caster 130 is affixed to a wheel mounting flange 118 that extends out of a gearbox housing 120. Wheel mounting flange 118 is fixed to, or is part of, a carrier spider (not shown) in the gearbox housing which is coupled to the planet gears (not shown) of the planetary gear set 104*a* and which keeps the planet gears in place between a sun gear 122 and a ring gear (not shown). The ring gear is fixed in place relative to housing 120.

A set of four long bolts 124 (only one of which is shown in FIG. 8) extend through the gearbox housing 120 of planetary gear set 104*a*, through a casing of motor 102*a*, and through holes 126 of mounting plate 116. The passages through which bolts 124 extend through housing 120 and the motor casing of motor 102*a* are not shown in FIG. 8. Tapered roller bearings 128 are provided on the inside of the motor frame and the outside of the gearbox housing 122. Mounting plate 116 retains one of tapered roller bearings 128 within a bearing race 132 of motor 102*a* and a retention plate 133 retains the other of tapered roller bearings 128 within a bearing race 134 of wheel mounting flange 118. Fasteners such as bolts (not shown), extend through holes 136 in retention plate 133 and are threadedly received in threaded holes 138 of flange 118. Fasteners such as bolts (not shown) are also used to attach a hub of wheel 31*a* to wheel mounting flange 118. Flange 118 includes additional threaded holes 140 to receive such bolts thereby to mount wheel 31*a* to flange 118.

Sun gear 122 includes, or is fixed to, a sun gear flange 142 which mounts to a rotor flange 144 of pancake motor 102*a*. Fasteners such as bolts 146 extend through holes 148 in sun gear flange 142 and are threadedly received in threaded holes 150 of rotor flange 144. A first complement of needle bearings 152 supports the rotor and the accompanying rotor flange 144 of motor 102*a* on axle 196 and a second complement of needle bearings 154 supports sun gear 122 and the accompanying sun gear flange 142 on axle 196 within gearbox housing 120. A nut 156 threads onto a threaded end 158 of axle 196 to mount pancake motor 102*a* and planetary gear set 104*a* to axle 196 of caster 130.

It should be appreciated that sun gear 122 rotates on axle 196 at the same rotational speed as the rotor of pancake motor 102*a* and the ring gear (not shown) fixed to housing 120 remains stationary relative to axle 196. The planet gears (not shown), the spider to which the planet gears are coupled, and the wheel mounting flange 118 rotate about axle 196 at a reduced rotational speed as compared to the rotational speed of the rotor and sun gear 122. The rotational speed of the wheel 31*a* mounted to flange 118 is thereby reduced by the same amount as compared to the speed of the rotor and sun gear 122, but the torque is increased. The components of FIG. 8 described above may be included in casters 30, 30' in some embodiments, although axle 196 is replaced by axle 96 and flange 116 is omitted, in such embodiments.

According to the present disclosure, casters 30, 30', 130 each may include a regenerative braking feature for purposes of recharging a battery of patient support apparatus 20. Thus, the propulsion system of patient support apparatus 20, including casters 30, 30', 130 as the case may be, is battery powered and as such, the battery for the propulsion system of apparatus 20 is a finite energy resource that should desirably be conserved to the extent possible in order to extend the uptime of the propulsion system of apparatus 20 before recharging of the battery is required.

A large amount of energy from the battery of patient support apparatus 20 is expended by motors 102*a*, 102*b* in accelerating the mass of patient support apparatus 20 and, if present, the patient support thereon, to a desired velocity, which inherently is stored as kinetic or potential energy in the moving mass. Oftentimes in the prior art, when a patient support apparatus having a propulsion system is brought to rest, the kinetic energy in the moving apparatus is dissipated as heat in various components of a mechanical braking system such as brake pads/rotors/drums, or in the windings of the propulsive motor(s) or accompanying auxiliary resistors of such motor(s). In contrast, patient support apparatus 20 is configured to capture at least some of the energy dissipated in bringing the apparatus 20 to a stop or lower energy state, and returning the captured energy back to the battery of the propulsion system for recharging.

The mass of patient support apparatus 20 with patient thereon can be in excess of 500 kilograms (kg). The kinetic energy in a 500 kg transport system, such as patient support apparatus 20 with patient, is ½×(mass (m)×velocity $(v)^2$), or for a 500 kg mass moving at 2 meters per second (m/s) is 1 kilojoule (kJ). As noted above, in many prior art systems, this energy is dissipated in the windings of the drive motor(s), causing a temperature rise in the windings, potentially limiting the number of times a braking operation can be conducted before the acceptable upper limit of winding temperature is reached. With regard to some prior art systems, however, if electronic braking is desired without as great a temperature rise in the motor windings, a load or dump resistor is placed across the motor leads, and the energy from braking is dissipated as heat in the load resistor(s), thus removing some or most of the energy dissipated in the windings. These load or dump resistors can be adequately heat-sunk to allow operating with the required duty cycle (e.g., frequency of braking) without exceeding the maximum desired temperature for these components. Alternatively or additionally, in some prior art systems, conventional mechanical brakes are used to dissipate the energy in the form of heat in the brake system components. The disadvantage to this approach is that such mechanical brake components are wear items that, therefore, require periodic maintenance, adjustment, and/or replacement.

The present disclosure contemplates that instead of simply dissipating the kinetic energy of the patient support apparatus 20 as heat during braking or otherwise during deceleration, the motor(s) 102*a*, 102*b* of casters 30, 30', 130, as the case may be, that propel patient support apparatus 20 are used as generators to provide current, and therefore voltage, to the battery of the propulsion system, thereby converting the kinetic energy of patient support apparatus 20 into electrical energy. This electrical energy is placed back into the battery of patient support apparatus 20 as current that is fed into the battery instead of being drawn out of it. A key difference between using motors 102*a*, 102*b* as both generators and loads, instead of just as generators, is that the power dissipated in motors 102*a*, 102*b* is only the resistive loss in the windings normally associated with driving motor 102*a*, 102*b*. This results in the motor losses for driving and braking motors 102*a*, 102*b* being essentially equivalent, and therefore, not much higher for braking in the case where the braking energy is captured and recycled.

This method of regenerative braking in apparatus 20 has particular advantages when patient support apparatus 20 is designed for transporting a bariatric patient. The mass of a bariatric patient support apparatus 20, plus patient, can approach 1,000 kg. Maximum braking effort to bring such a large mass to rest can result in unacceptable temperature rise in the propulsion motor(s), and in some prior art designs, causes a safety mechanical brake to be deployed which can result in a delay for the propulsion motor(s) to cool before normal operation of the transport device is, once again, possible. Prior to normal operation, such prior art patient support apparatuses may require transport using only caregiver-supplied mechanical energy.

The present disclosure contemplates that the regenerative braking effort by motors 102*a*, 102*b* of casters 30, 30', 130 can be varied continuously, or periodically from time-to-time, as an aid to achieving a control goal, such as maintaining a particular velocity or acceleration of the corresponding patient support apparatus 20. For instance, in order to maintain a given velocity when ascending up a ramp or descending down a ramp, it may be desirable either to add energy to the propulsion system (e.g., add additional power to motors 102*a*, 102*b* when ascending a ramp), or remove some amount of energy from the propulsion system (e.g., reduce power to motors 102*a*, 102*b* when descending a ramp) in order to maintain a commanded velocity of the patient support apparatus 20. Accordingly, in some embodiments, an energy regeneration circuit of patient support apparatus 20 is engaged in a pulse width modulated (PWM) fashion with low duty cycle (e.g., less than 50% duty cycle) to effect the desired velocity control.

While the energy harvesting from the kinetic energy in a transport device, such as patient support apparatus 20, is not 100% efficient due to losses in the drive electronics, motor winding resistance, connector wiring resistance, and internal resistance of the battery, these losses are small in comparison to the loss of energy caused by simply dissipating the kinetic energy as is done in some prior art systems. By implementing the regenerative braking recharging of the propulsion system battery of patient support apparatus 20 as described herein, it is believed that the range that patient support apparatus 20 can be propelled by motors 102*a*, 102*b* of casters 30, 30', 130 could be extended by as much as 50% for the same initial charge on the battery. Even if the range is extended by less than 50% using regenerative braking, the gains will still be an improvement over systems that simply dissipate the kinetic energy in waste heat.

With regard to patient support apparatus 20, by recapturing energy otherwise lost in heat allows the propulsion system battery to operate in the 80% to 40% charge regime, which is optimal for battery life for many Lithium based chemistries such as LiIon, LiFe, etc. This is because ‘micro charging’ via the regenerative braking approach contemplated herein (e.g., low duty cycle PWM regenerative braking) is much less taxing on the battery separators than a full up charge/discharge cycle. Each time energy is captured by regenerative braking of motors 102*a*, 102*b* of patient support apparatus 20, it adds to the overall charge state of the propulsion system battery and postpones the need for a global charge event, thus extending the life of the battery.

Figure 9:
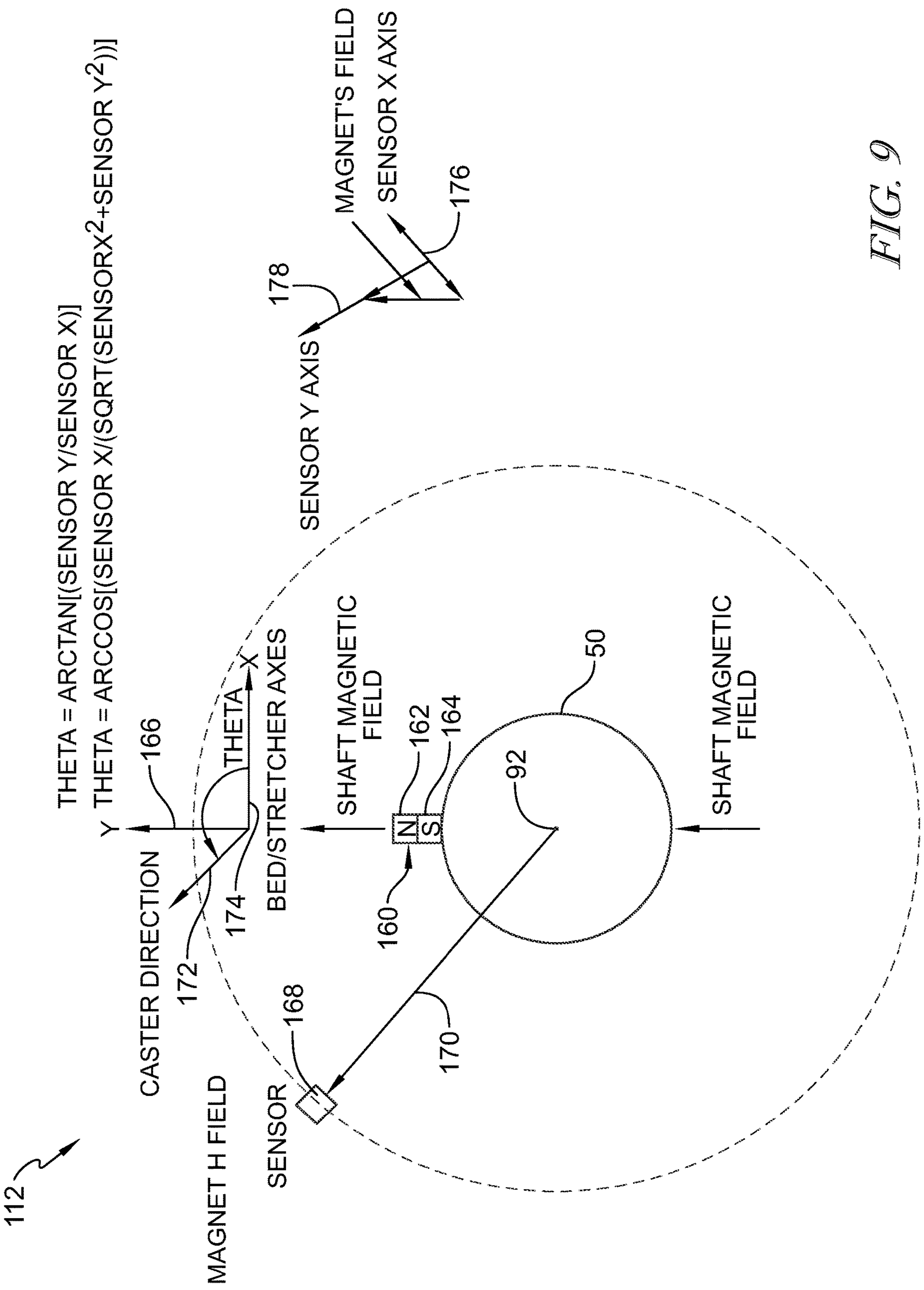
FIG. 9 is a diagrammatic view showing the angle sensor of FIG. 4 having a magnet that is rotatable relative to a caster swivel axis defined by the caster stem and having a sensor that is stationary relative to the base frame.

Referring now to FIG. 9, a diagrammatic view of one embodiment of angle sensor 112 is provided along with annotations relating to operation of angle sensor 112. In the illustrative example of FIG. 9, angle sensor 112 includes a magnet 160 that is attached to mounting tube 50 of caster 30, 30', 130 as the case may be, either directly or via some other intermediate mounting structure. Magnet 160 has a north pole 162 and a south pole 164 that are arranged along a longitudinal axis 166 of patient support apparatus 20. Longitudinal axis 166 extends parallel with the long dimension of patient support apparatus 20 meaning the dimension from the head end 52 to the foot end 54. Angle sensor 112 further includes at least one sensor 168 which is attached to caster tube 90, either directly or indirectly via some other intermediate mounting structure, to swivel therewith about caster swivel axis 92. In the illustrative example, a sensor magnetic field vector 170 from axis 92 to sensor 168 points in the same direction relative to axis 166 as the caster drive direction 172 of the associated caster 30, 30' 130. Caster drive direction 172, as noted above, is perpendicular to axis 100 of axle 96 and is oriented horizontally (assuming patient support apparatus 20 is being propelled along a floor that is horizontal).

Control of the drive direction 172 of the dual-wheel differentially steered casters 30, 30', 130 disclosed herein is contingent upon the ability to sense an angle θ of the respective caster 30, 30', 130 with respect to the body axes (e.g., longitudinal axis 166 or a transverse axis 174 that extends side-to-side in a lateral dimension of the stretcher 20 or bed 20 being driven), preferably without the need for a home pulse or the need to find any home position of the caster 30, 30', 130 to determine the angle of the caster 30, 30', 130 or associated shaft 90 on power up. The longitudinal axis 166 of patient support apparatus 20 is sometimes referred to as the Y-axis herein and the transverse axis 174 is sometimes referred to as the X-axis herein.

In some embodiments such as the illustrative embodiment of FIG. 9, angle sensor 112 is a 3-dimensional magnetic field sensor in which magnet 160 is a fixed location magnet that, in cooperation with sensor 168, is able to measure the X and Y magnetic field vector components that are oriented along the respective X-axis 174 and Y-axis 172 of the patient support apparatus 20. Once the magnetic field vector components in the X and Y directions are known, the drive direction of caster 30, 30', 130 corresponding to the direction of the overall magnetic field vector 170 of the caster 30, 30', 130 can be computed using simple trigonometry. There is no 180° ambiguity because the magnetic field is sensed as a vector and the output of the angle computation is continuous from 0 to 2π radians, or 0 to 360°, without any ambiguity.

The caster angle θ with respect to X-axis 174 of patient support apparatus 20 is determined using either of the formulae shown at the top of FIG. 9. The given formulae are θ=ARCCOS [(sensor X/(SQRT(sensor $X^2$+sensor $Y^2$))] and θ=ARCTAN [(sensor Y/sensor X)], where sensor X and sensor Y are strengths of the magnetic fields measured by sensor 168 along a sensor X-axis 176 and a sensor Y-axis 178. The sensor Y-axis 178 is oriented parallel with the caster direction 172. Computationally, using the ARCCOS function is more complex due to the need to calculate the hypotenuse of the triangle from the magnetic field vector X and Y components, but the cosine function is bounded to +/−1, as opposed to the tangent function, which is bounded by +/−∞, which computationally is more difficult to deal with. The use of the ARCCOS function does require a square root function be used, however.

Features of angle sensor 112 in the illustrative embodiment of FIG. 9 include: 1) the ability of sensor 168 to resolve the magnetic field from the reference magnet 160 into X and Y components, or if desired, into X, Y, and Z components, and 2) the ability of magnet 160 and sensor 168 to rotate with respect to each other as the caster tube 90 swivels or rotates relative to mounting tube 50. Which of sensor 168 and magnet 160 are fixed with respect to base frame 22 of patient support apparatus 20 and which of the other of sensor 168 and magnet 160 rotates or swivels about axis 92 with caster shaft 90 is immaterial. In some embodiments of patient support apparatus 20, there may be system constraints that dictate an optimal partitioning of the location of the magnet 160 and sensor 168 but ultimately, the ability to mathematically determine the caster drive direction is not dependent upon sensor 168 and magnet 160 placement. Thus, the magnet 160 can be stationary relative to base frame 22 with the sensor 168 swiveling about axis 92 in some embodiments, and the sensor 168 can be stationary relative to the base frame 22 with the magnet 160 swiveling about axis 92 in other embodiments.

In order to improve the accuracy of the caster angle reading using angle sensor 112 of FIG. 9, it may be desirable to calibrate sensor 112 to account for any residual magnetic fields generated by bed/stretcher 20 components, such as base frame 22. This calibration is accomplished in some embodiments, for example, by measuring the static magnetic fields at sensor 168 with the respective caster 30, 30', 130 pointed at one or more known directions such as 0°, +/−90°, 180°. Depending on how nonlinear the magnetic fields are due to extraneous DC magnetic fields and their variation, for example, a correction algorithm or table may used to linearize the raw sensor readings of sensor 168 and get an accurate caster angle, such as <<1° from the true caster angle.

Additionally, in connection with the use of angle sensor 112 of FIG. 9, it may be desirable to account for time varying ambient magnetic fields. For example, angle sensor 112 may be exposed to time varying magnetic fields produced by motors 102*a*, 102*b* and associated wiring. To compensate for such time varying magnetic fields, the present disclosure contemplates that averaging readings from the magnetic sensor 168 will help to nullify the effect of such time varying magnetic fields on the sensor magnetic field values used to calculate the angle θ. This is because it is believed that the time varying magnetic fields from motors 102*a*, 102*b* will have a mean of zero, and thus be nulled out by the averaging mathematical operation.

In some embodiments, magnet 160 is a high field strength magnet that is aligned with long axis 166 of bed/stretcher 20. By ensuring that the angle reference magnet 160 is stronger than any ambient disturbing magnetic fields such as Earth's DC magnetic field or time varying magnetic fields from nearby motors (e.g., motors 102*a*, 102*b*), currents in wires, etc., a good signal to noise ratio can be achieved thereby improving the accuracy of sensor 112. That is, the stronger the magnet 160 is, the more accurate sensor 112 is. Even with a strong magnet 160, it is desirable to implement fast sampling of readings from magnetic field sensor 168 and averaging of measured X and Y magnitudes of magnetic field to null out zero mean interfering or 'noise' ambient fields. Use of a calibration algorithm to null out static magnetic fields due to magnetization of structural members in bed/stretcher 20 also serves to improve the accuracy of angle sensor 112 as noted above.

Figure 10:
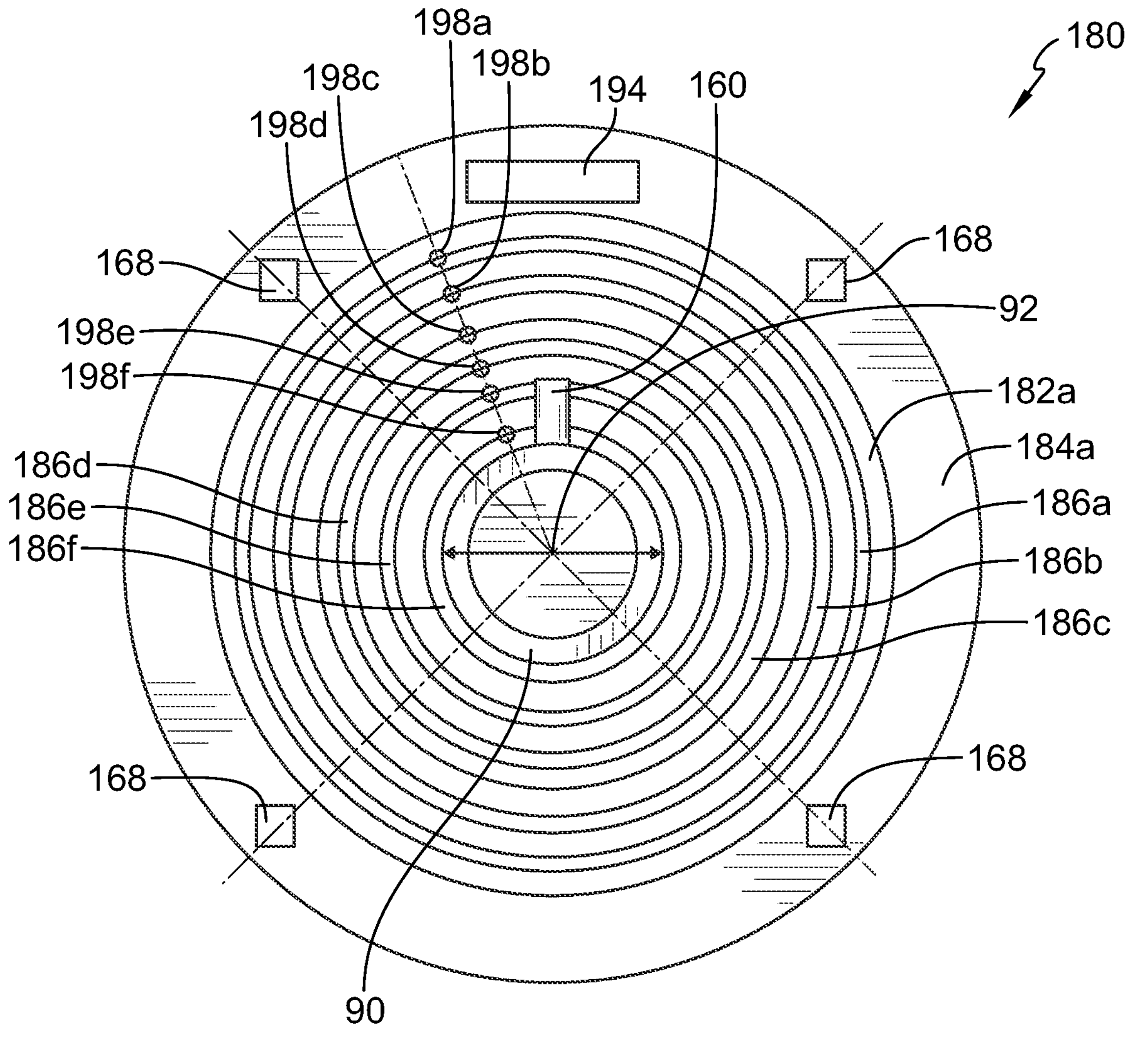
FIG. 10 is a top view of a first portion of a slip ring to which part of the angle sensor is coupled, the first portion having a first printed circuit board with electrically conductive concentric circles and a first race of the slip ring having four magnetic field sensors coupled thereto, the caster stem being located at a central region of the first race, and a magnet being coupled to the caster stem.
Figure 11:
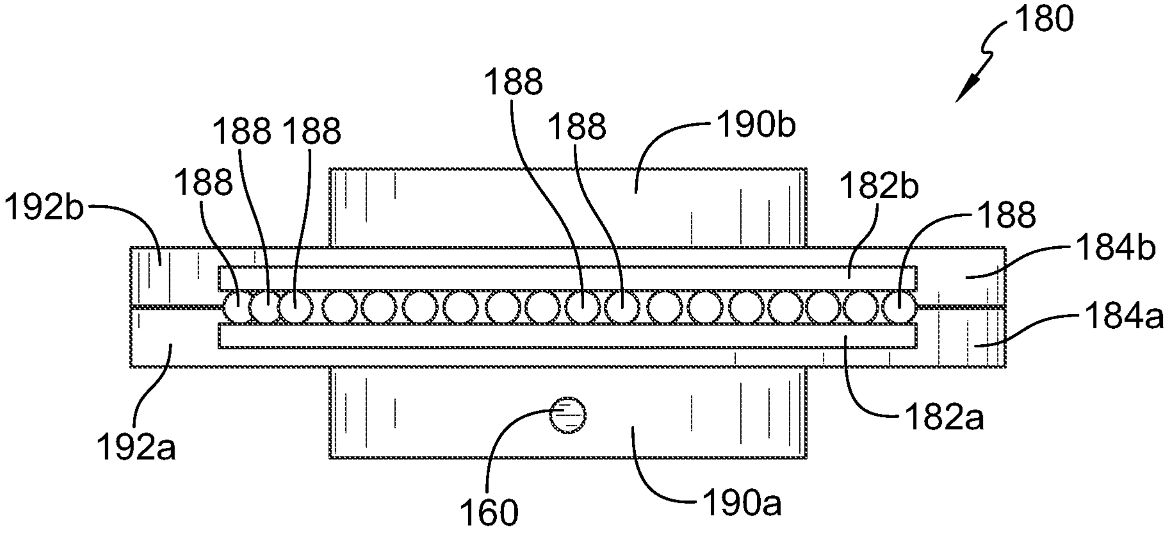
FIG. 11 is a side view of the slip ring of FIG. 10, showing the slip ring having a second race with a second printed circuit board above the first race and showing non-magnetic, electrically conductive balls situated between the first and second circuit boards for passage of electric current therebetween.

Referring now to FIGS. 10 and 11, an example of a slip ring 180 that may be included in casters 30, 30', 130 in some embodiments is shown. Slip ring 180 includes first and second printed circuit boards (PCB's) 182*a*, 182*b* that are coupled to respective first and second races 184*a*, 184*b*. In some embodiments, races 184*a*, 184*b* are made of plastic and the PCB's 182*a*, 182*b* are embedded into races 184*a*, 184*b*. However, the confronting surfaces of the PCB's 182*a*, 182*b* that face toward each other are exposed and so are not covered by the plastic of the races 184*a*, 184*b*. Each PCB 182*a*, 182*b* includes a plurality of concentric, circular conductive traces 186*a*, 186*b*, 186*c*, 186*d*, 186*e*, 186*f* that are centered on caster swivel axis 92. In the illustrative example, there are six such conductive traces on each PCB 182*a*, 182*b* but a different number of conductive traces, more or less than six, may be present in other embodiments of slip ring 180.

A plurality of electrically conductive balls 188 are interposed between PCB's 182*a*, 182*b* and are in rolling contact with respective conductive traces 186*a-f* as shown in FIG. 11 (only balls 188 in contact with traces 186*a* of PCB's 182*a*, 182*b* can be seen in FIG. 11). One or more circular spacers or cages (not shown) may be provided to hold each of the circular group of balls 188 in place relative to the respective conductive traces 186*a-f* that are above and below balls 188. In the illustrative example of slip ring 180, magnet 160 is fixed to caster shaft 90 to rotate therewith about axis 92. More particularly, magnet 160 is embedded into a cylindrical wall portion 190*a* of race 184*a* in the illustrative embodiment. Wall portion 190*a* extends downwardly from a disk portion 192*a* of race 184*a*. Disk portion 192*a* carries PCB 182*a*. Race 184*b*, similarly, includes a cylindrical wall portion 190*b* and disk portion 192*b*. Wall portion 190*a* attaches to caster tube 90 such as with a press fit or by using a coupler such as a set screw or adhesive. Thus, magnet 160 and race 184*a* rotate together with caster shaft 90 about caster swivel axis 92. On the other hand, race 184*b* does not swivel about axis 92 with caster shaft 90. Thus, race 184*b* is fixed in place with respect to base frame 22 and mounting tube 50.

Power to operate motors 102*a*, 102*b* is provided through some of conductive traces 186*a-f* and the associated balls 188 and data is provided through others of traces 186*a-f* and the associated balls 188. Use of balls 188 to pass electrical current therethrough for communication of power and data allows for the rotation of motors 102*a*, 102*b*, caster tube 90, and wheels 31*a*, 31*b* through an unlimited number of revolutions about axis 92. In some embodiments, balls 188 have a diameter of about 0.125 inches, plus or minus manufacturing tolerances such as ±0.01 inch or ±0.001 just to give a couple of examples. Slip ring 180 includes a connector 194 attached to race 184*a* and a similar connector (see FIG. 17) attached to race 184*b*. Connector 194 is shown diagrammatically in FIG. 10 but has pins or similar electrical contacts that are electrically coupled to traces 186*a* via wires or other conductors that extend within PCB 184*a* to connector 194 from respective contact points 198*a*, 198*b*, 198*c*, 198*d*, 198*e*, 198*f*. The connector 194 of race 184*a* is coupled to motors 102*a*, 102*b* via circuitry to be described below in connection with FIGS. 16A and 16B and via suitable conductors such as wires that are routed along caster tube 90, axle support 94 (if present), and axles 96, 196 of the respective caster 30, 30', 130. The connector 194 of race 184*b* is coupled to the power circuitry and propulsion system control circuitry (aka power drive circuitry) of patient support apparatus 20 which is described below in connection with FIG. 15.

To facilitate automatic control of the propulsion system of patient support apparatus 20, it is desirable to be able to determine with high precision the angle of the rotating race 184*a* of the slip ring with respect to the fixed race 184*b*. Thus, the illustrative embodiment of slip ring 180 includes angle sensor 112 integrated therein. In the illustrative example, angle sensor 112 does not require a home position indication and therefore, is invariant to removal of power or to a power interruption with regard to determining the relative angle of the rotating and fixed races 184*a*, 184*b* of slip ring 180 about axis 92. When power is applied, the angle of magnet 160 about axis 92 relative to one or more sensors 168 is substantially continuously calculated. After power is lost, because the orientation of magnet 160 and associated swiveling caster components are not referenced to a 'home' position, the angle of magnet 160 about axis 92 relative to the one or more sensors 168 is calculated once again on power up, and hence is invariant to removal of power. If the caster tube 90, wheels 31*a*, 31*b*, motors 102*a*, 102*b* are swiveled about axis 92 with power off, the correct angle will still be calculated upon power up.

Slip ring 180 with its conductive traces 186*a-f* and conductive balls 188 allows for the conduction of high currents and signal level currents in the same package with low resistance, low cost, and low threshold currents. Furthermore, the direction of the respective caster 30, 30', 130, as the case may be, is determined using simple trigonometry from the X and Y magnetic field magnitudes reported by the 2D magnetic angle sensor 112 embedded in the slip ring 180 as described above. In particular, magnet 160 is included in rotatable race 184*a* of slip ring 180 with its magnetic field perpendicular to the caster swivel axis 92. One or more sensors 168 of angle sensor 112, which in the illustrative example are embodied as micro-electromechanical systems (MEMS) magnetometers, are located around the perimeter of the slip ring PCB 184*b*. In FIG. 10, four MEMS magnetometers 168 are shown but it should be understood that these MEMS magnetometers 168 are included in race 184*b* which is above the depicted race 184*a*. Accordingly, FIG. 10 is somewhat diagrammatic in nature.

In some embodiments, a single magnetometer 168 may be sufficient if the magnetic field around the caster shaft 90 is sufficiently linear and relatively undisturbed. If the magnetic field is too distorted, the use of multiple sensors 168 are used in order to determine the angle of the slip ring 180 and therefore, the drive direction of the associated caster 30, 30' 130. In still other embodiments, a second magnet (not shown, but similar to magnet 160) is coupled to race 184*a* and caster tube 90 with its magnetic field aligned with the first magnet 160. That is, the second magnet is located 180° about axis 92 from the primary magnet 160 with its magnetic field aligned with the primary magnet 160 such that the north pole of the first and second magnets 160 point toward head end 52 of patient support apparatus 20 when patient support apparatus 20 is being driven in the forward direction parallel with longitudinal axis 166. The use of a second magnet helps to linearize the magnetic field being sensed by sensors 168.

If the magnetic field surrounding the caster shaft 90 is too distorted to provide a sufficiently accurate direction indication, a calibration procedure can be utilized and a correction factor applied to the angle reading based on the calibration data, and the accuracy of the angle reading corrected to an acceptable level. Such a calibration was described above in which static magnetic fields at each sensor 168 is measured with the respective caster 30, 30', 130 pointed at one or more known directions such as 0°, +/−90°, 180°. Because illustrative slip ring 180 has four MEMS magnetometers as its sensors 168, with the sensors 168 being spaced from each other by 90° about axis 92, the magnetic field measurements of the calibration process can be taken with magnet 160 (and the second magnet, if present) positioned midway between (i.e., 45° from) each pair of sensors 168. Alternatively, the magnetic field measurements of the calibration process can be taken with magnet 160 (and the second magnet, if present) in alignment with pairs of sensors that are spaced 180° apart.

If the magnetic field around the respective caster 30, 30', 130 is severely distorted beyond the ability of a simple calibration to correct the field nonlinearity and the ability of angle sensor 112 to resolve the angle to the required precision, the use of the array of more than one magnetometer 168, such as is shown in the illustrative embodiment of slip ring 180, may be implemented. Because each of the multiple magnetometers 168 are addressed individually for taking magnetic field measurements, their location on slip ring 180 relative to axis 92 is always known by the processing circuitry associated with angel sensor 112. This knowledge coupled with the fields indicated at the magnetometers 168 enables a sufficiently accurate indication of the angle between the magnetometers 168 of the respective caster 30, 30', 130 and the reference magnet 160 location about axis 92.

In order to minimize the distortion of the magnetic field surrounding the magnet(s) 160 of angle sensor 112 of slip ring 180, the balls 188 (sometimes referred to as "ball bearings") used in slip ring 188 are made of a non-magnetic material such as but not limited to a 300 series stainless steel. Because this type of stainless steel material is not magnetic, distortion of the magnetic field of magnet 160 is reduced or eliminated as the array of sensors 168 moves around the magnet 160 as the caster 30, 30' 130 including slip ring 180 swivels. Balls 188 made of other paramagnetic materials such as aluminum, titanium, ceramics, brass, copper, bronze, or zinc are used in other embodiments to reduce or eliminate distortion of the magnetic field and hence, increase the accuracy of the angle sensor 112 of slip ring 180. It should be understood that not all of balls 188 of slip ring 180 need to be made of the same material. For example, in each complement of circularly arranged balls 188 that are sandwiched between respective pairs of traces 186*a-f* of PCB's 182*a*, 182*b*, some (e.g., half, one third, two thirds, a quarter, three quarters, etc.) may be made of ceramic and the rest may be made of stainless steel (or one of the other listed metallic materials). Furthermore, complements of balls 188 that are made up of three, four, five, etc. different types of materials are possible according to the present disclosure.

As should be understood from the above discussion, in some embodiments of casters 30, 30', 130 slip ring 180 with angle sensor 112 included. Angle sensor 112 of slip ring has a first sensor portion coupled to first plastic race 184*a* to swivel therewith about caster swivel axis 92 and a second sensor portion coupled to second plastic race 184. As noted above, the angle sensor 112 is configured to produce a signal from which the drive direction 172 of the respective caster 30, 30', 130 is determinable. In the illustrative example of FIGS. 10 and 11, the first sensor portion comprises a magnet 160 and the second sensor portion comprises at least one magnetic field sensor 168. More particularly, the at least one magnetic field sensor 168 comprises four magnetic field sensors 168 that are spaced apart from each other by 90 degrees about the caster swivel axis 92.

In some embodiments, the at least one magnetic field sensor 168 is mounted to the second PCB 184*b*. Optionally, the at least one magnetic field sensor 168 is located radially outboard of the largest concentric, circular conductive trace 186*a* of the plurality of concentric, circular conductive traces 186*a-f* of PCB 184*b* as suggested in FIG. 10. In alternative embodiments of slip ring 180, magnet 160 is located radially outboard of the largest concentric, circular conductive trace 186*a* of the plurality of concentric, circular conductive traces 186*a-f* of PCB 184*a* rather than being mounted adjacent to caster shaft 90. For example, instead of being embedded in cylindrical portion 190*a* of race 184*a*, magnet 160 can be embedded in disk portion 192*a* of race 184*a* or mounted to PCB 182*a*.

As noted above, angle sensor 112 further comprises a supplementary magnet coupled to the first plastic race 182*a* at a position spaced 180 degrees from the magnet 160 relative to the caster swivel axis 92. Thus, such a supplementary magnet as described above is envisioned as being embedded in cylindrical portion 190*a* of race 184*a*. However, the present disclosure also contemplates that, in alternative embodiments of slip ring 180, the supplementary magnet could instead be embedded in disk portion 192*a* of race 184*a* or mounted to PCB 182*a*, while still being at a position spaced 180 degrees from the magnet 160 relative to the caster swivel axis 92.

In further alternative embodiments contemplated by the present disclosure, the first sensor portion of sensor 112 of slip ring 180 comprises at least one magnetic field sensor 168 and the second sensor portion comprises magnet 160. That is, the magnet 160 is the portion of angle sensor 112 that is stationary relative to the respective caster 30, 30', 130, and the at least one magnetic field sensor 168 is the portion of angle sensor 112 that rotates or swivels about axis 92. Even in such alternative embodiments, the at least one magnetic field sensor 168 may comprise four magnetic field sensors 168 that are spaced apart from each other by 90 degrees about the caster swivel axis 92.

It is contemplated that the at least one magnetic field sensor 168 in these alternative embodiments in which magnet 160 is stationary and sensors 168 swivel about axis 92 with caster tube 90, the magnetic field sensors 168 may be mounted to the first printed circuit board 182*a* coupled to race 184*a*. Thus, the at least one magnetic field sensor 168 may be located radially outboard of the largest concentric, circular conductive trace 186*a* of the plurality of concentric, circular conductive traces 186*a-f* of PCB 182*a*. In a variant of these alternative embodiments, the stationary magnet 160 may be located radially outboard of the largest concentric, circular conductive trace 186*a* of the plurality of concentric, circular conductive traces 186*a-f* of PCB 184*b*. In any event, embodiments in which magnet 160 is embedded in cylindrical portion 190*b* of race 184*b*, or embedded in disk portion 192*b* of race 184*b*, or mounted to PCB 184*b*, are all within the scope of the present disclosure. Furthermore, embodiments in which a stationary supplementary magnet (i.e., stationary with respect to mounting tube 50 and base frame 22) may be mounted at these same locations at a position spaced 180 degrees from magnet 160 relative to the caster swivel axis 92.

Figure 12:
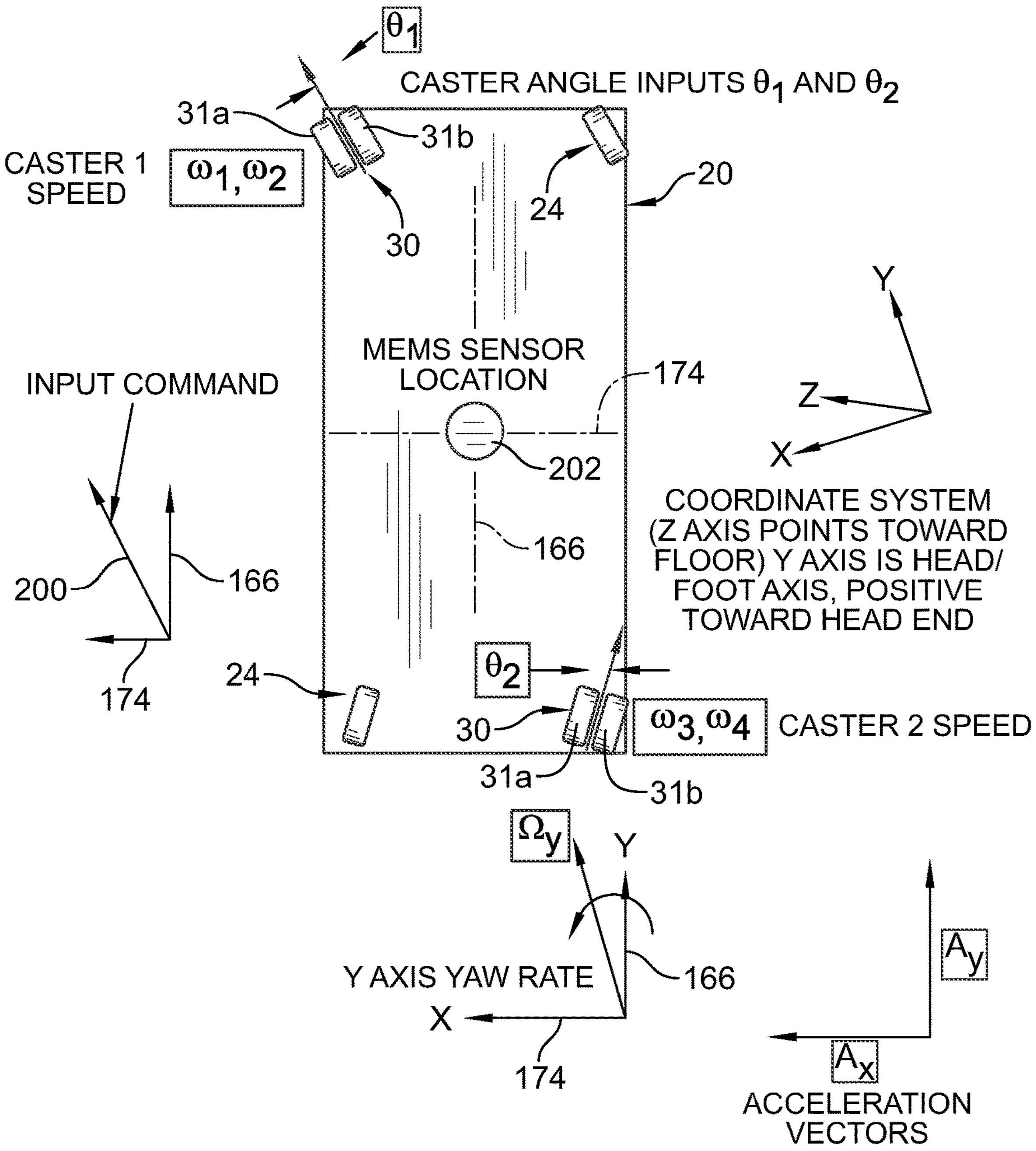
FIG. 12 is a diagrammatic top view of the base frame of the patient support apparatus showing nine variable that are provided as inputs to power drive circuitry of the patient support apparatus for controlling the dual-wheel motorized casters.
Figure 13:
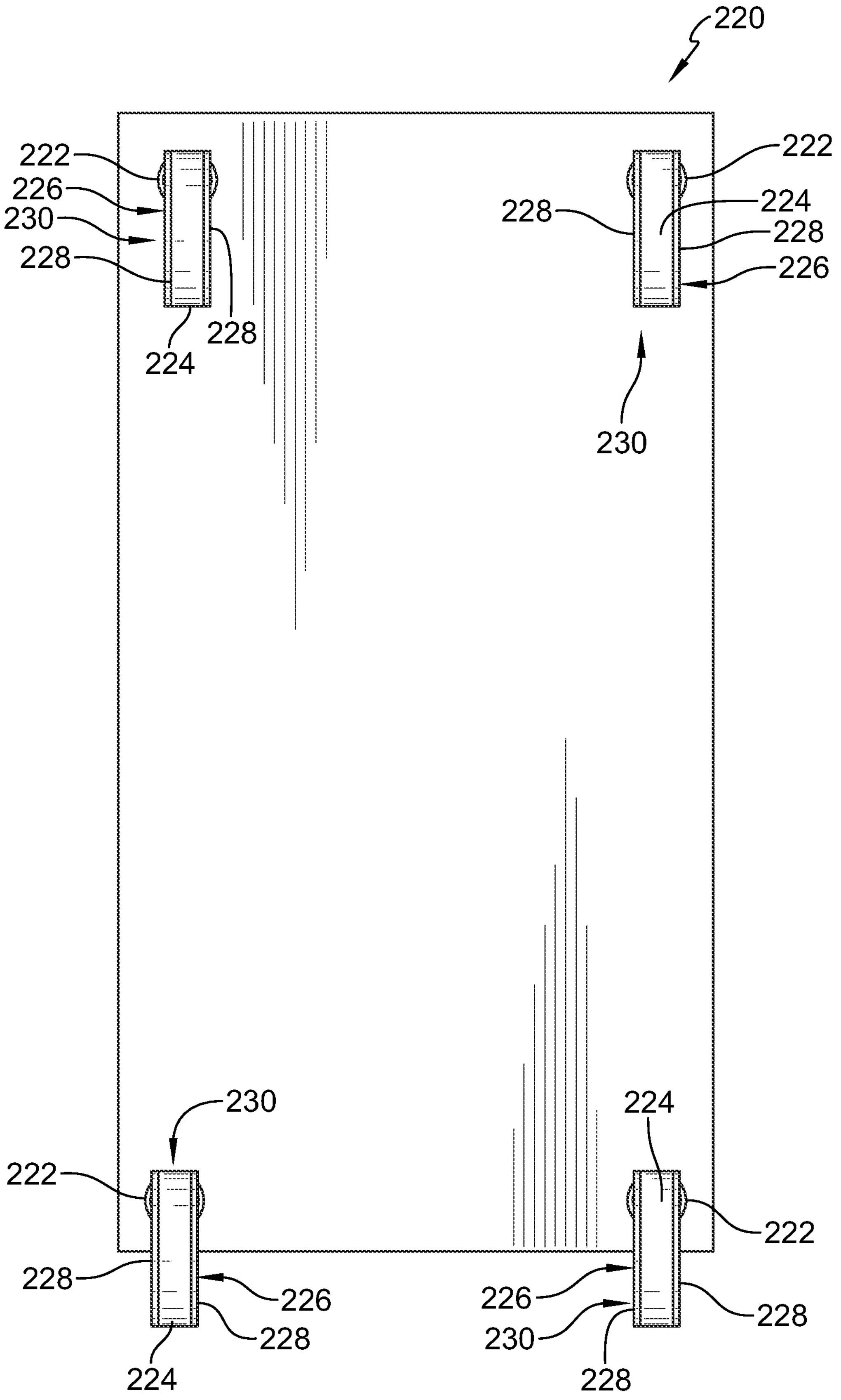
FIG. 13 is a diagrammatic bottom view of a base frame of an alternative embodiment of a patient support apparatus having four single-wheel motorized casters coupled thereto.

Referring now to FIG. 12, patient support apparatus 20 is shown diagrammatically and includes casters 24, 30. The discussion of FIG. 12 that follows is equally applicable to embodiments of patient support apparatus 20 that include casters 30' or casters 130 in lieu of either or both of casters 30. According to the present disclosure, drive motors 102*a*, 102*b* of casters 30 are controlled by power drive circuitry based on nine input variables. This is sometimes referred to as nine degree of freedom (9DoF) control. The power drive circuitry is discussed below in connection with FIGS. 15, 16A, and 16B.

The nine input variables received from various sensors of patient support apparatus 20 by the power drive circuitry and used in the control of motors 102*a*, 102*b* of casters 30 include the following: (1) a first angle, θ1, at which a first of the dual-wheel motorized casters 30 is oriented relative to the longitudinal dimension or axis 166 of the frame 22, (2) a first angular velocity, ω1, at which wheel 31*a* of the first dual-wheel motorized caster 30 is being rotated by the respective motor 102*a*, (3) a second angular velocity, ω2, at which wheel 31*b* of the first dual-wheel motorized caster 30 is being rotated by the respective motor 102*b*, (4) a second angle, θ2, at which a second of the dual-wheel motorized casters 30 is oriented relative to the longitudinal dimension or axis 166 of the frame 22, (5) a third angular velocity, ω3, at which wheel 31*a* of the second dual-wheel motorized caster 30 is being rotated by the respective motor 102*a*, (6) a fourth angular velocity, ω4, at which wheel 31*b* of the second dual-wheel motorized caster 30 is being rotated by the respective motor 102*b*, (7) a yaw rate, $\Omega_y$, at which longitudinal axis 166 of frame 22 is rotating in a plane parallel to the floor (e.g., can be thought of as a plane defined by the page on which FIG. 12 appears), (8) a first acceleration, $A_y$, at which the frame 22 is accelerating in longitudinal dimension 166 of the frame 22, and (9) a second acceleration, $A_x$, at which the frame 22 is accelerating in the transverse direction or axis 174 perpendicular to the longitudinal dimension or axis 166 of frame 22.

Still referring to FIG. 12, an input command 200 is provided to the power drive circuitry of patient support apparatus 20. Input command 200 is shown diagrammatically in FIG. 12 as a vector on a coordinate system aligned with the longitudinal and transverse axes 166, 174 of patient support apparatus. Thus, input command 200 has a magnitude, which corresponds to the speed at which patient support apparatus 20 is to be propelled along the floor, and a direction at which the patient support apparatus 20 is to be propelled. If the direction of input command 200 is not parallel with the longitudinal axis 166 of the patient support apparatus 20, then motors 102*a*, 102*b* of wheels 31*a*, 31*b* of casters 30 of patient support apparatus 20 need to be controlled to turn the patient support apparatus 20 until command input 200 is parallel with axis 166.

Command input 200 is a signal provided by a user input of patient support apparatus 20. For example, in some embodiments, apparatus 20 includes a joystick which is moved to provide the command input 200. In other embodiments, load cells such as strain-gage based load cells, capacitive-based load cells, load cells using magnetostrictive technology, and the like, are coupled to push handles 64 of patient support apparatus 20. In such embodiments, these load cells detect an amount of force, and the direction of the force (e.g., forward direction or reverse direction), applied to push handles 64 by the person transporting patient support apparatus. The power drive circuitry processes the load cell signals from the two push handles 64, such as by summing the forces and/or using trigonometric functions to determine a speed and direction of a single, virtual input command 200.

As shown in FIG. 12, patient support apparatus 200 includes a MEMS sensor 202 mounted near a center of base frame 22, or alternatively, near a center of upper frame 28. More particularly, MEMS sensor 202 is mounted on or near a point in a horizontal plane at which diagonals extending between the swivel axes of casters 30 and the swivel axes of casters 24 intersect. Signals from the MEMS sensor 202, which measures $A_y$, $A_x$, and $\Omega_y$, and caster angle sensors 112, which measure angles θ1, θ2, contribute to the vector control of patient support apparatus 20 along with signals correlating to the rotational speeds ω1, ω2, ω3, ω4 of wheels 31*a*, 31*b* of casters 30.

It should be appreciated that, in order to implement vector control of a hospital bed or stretcher such as patient support apparatus 20, it is necessary to be able to automatically sense the direction the patient support apparatus 20 is actually moving, and compare that to the user input command 200. The automatic control system takes these 9DOF sensor inputs, corresponding to θ1, θ2, ω1, ω2, ω3, ω4, $A_y$, $A_x$, and $\Omega_y$, along with the user command 200 for magnitude and direction of bed or stretcher motion, and generates motor drive commands for motors 102*a*, 102*b* of casters 30 based on these inputs. The control system also uses these nine inputs θ1, θ2, ω1, ω2, ω3, ω4, $A_y$, $A_x$, and $\Omega_y$ to maintain the commanded motion after the direction and velocity corresponding to input command 200 are achieved. It should be appreciated, therefore, that these nine inputs θ1, θ2, ω1, ω2, ω3, ω4, $A_y$, $A_x$, and $\Omega_y$ to the control system completely describe the movement state of the patient support apparatus 20 while being propelled along a floor and allow the automatic control system (aka the power drive circuitry) to follow the input command 200 within the required performance parameters for acceleration and deceleration and directional control.

The rate of change of either or both of acceleration signals $A_y$, $A_x$ from MEMS sensor 202 are determined in the processing software of the power drive circuitry to calculate the yaw rate $\Omega_y$, in some embodiments. In other embodiments, a separate yaw rate gyroscope (not shown) is used in combination with MEMS sensor 202 such that separate processing steps are not needed to determine yaw rate $\Omega_y$. In other words, MEMS accelerometer or sensor 202 measures accelerations $A_y$, $A_x$ and the yaw rate gyroscope measures the angular rate of change of the Y-axis 166 or yaw rate $\Omega_y$.

The present disclosure contemplates that, in some embodiments, even more parameters are calculated from those that are measured, such as the linear velocities of patient support apparatus 20 in the directions of longitudinal and transverse axes 166, 174, which are calculated by integrating the respective accelerations $A_y$, $A_x$. Additionally, the accelerations of wheels 31*a*, 31*b* of each of casters 30 can be calculated by taking the derivative of the measured wheel speeds ω1, ω2, ω3, ω4. Furthermore, a distance travelled can be calculated by integrating the wheel speeds ω1, ω2, ω3, ω4 in combination with knowing the wheel diameter of wheels 31*a*, 31*b* and hence the wheel circumference of wheels 31*a*, 31*b*. The calculated distance traveled can include an overall distance that patient support apparatus 20 has been propelled during its life, or the distance traveled during a single powered transport of the patient support apparatus 20 from one location to another, or both.

These above-discussed derived or calculated parameters also allow for traction control of patient support apparatus 20, by establishing a limit on the acceleration of the wheels 31*a*, 31*b* of casters 30 so as to control the acceleration of the wheels 31*a*, 31*b* to be within certain limits, or more particularly, to be below a threshold acceleration value, thereby to guarantee there is no slippage. That is, the power drive circuitry of apparatus 20 is configured to implement traction control by limiting the first, second, third, and fourth accelerations of respective wheels 31*a*, 31*b* of casters 30 to within acceleration thresholds to prevent slippage of each of wheels 31, 3*b* of casters 30.

In some embodiments, patient support apparatus 20 is equipped with an integral scale system to allow for weighing of the patient supported on the patient support apparatus 20. For example, a scale system having load cells that support portions of upper frame 28 relative to lift system 26 or base frame 22 and that produce signals that are used by the bed control circuitry to determine the patient weight is included in some embodiments of patient support apparatus 20. For additional details of such scale systems see U.S. Pat. Nos. 7,610,637; 7,253,366; 7,176,391; 6,924,441; 6,680,443; and 5,859,390; which are hereby incorporated by reference herein for all that the teach to the extent not inconsistent with the present disclosure which shall control as to any inconsistencies.

The 9DoF input information discussed above coupled with the determined patient weight by the scale system of patient support apparatus 20 is used by the control system or power drive circuitry to aid in accelerating and decelerating patient support apparatus 20 during powered transport. Furthermore, after the overall weight of the patient support apparatus 20 with patient is determined, such as by adding the patient weight measured by the scale system to a known weight of the patient support apparatus 20 stored in memory, the kinetic energy of the system (i.e., patient support apparatus 20 plus the patient) can be determined at any given time because the velocity of the system is known. The calculated kinetic energy is used to determine how aggressively the braking action of casters 30 needs to be to in order to execute the user input command 200, assuming the input command 200 is indicative that braking action is needed.

Because a complete state of patient support apparatus 20 in terms of velocity, acceleration, direction, kinetic energy, and control effort (e.g., based on the control input 200) is known based on sensor measurements and/or calculations, the automatic control system is able to enforce an operating envelope of arbitrary bounds by restricting the measured parameters to within boundaries to guarantee safety, battery life, or other limits for valid system reasons. For example, if it is known that a particularly heavy patient is on the patient support apparatus 20, the turn or yaw rate $\Omega_y$ of the patient support apparatus 20 may be restricted to avoid toppling the patient support apparatus 20, or the maximum forward speed can be restricted based on the current system weight to control the stretcher to stay within certain requirements such as stopping distance or time to stop based on the known maximum braking effort performance. This information (e.g., velocity, acceleration, direction, kinetic energy, and control effort) can also be used to enforce an operating envelope on the patient support apparatus 20 to prevent braking too aggressively.

Based on the foregoing, therefore, it should be understood that in some embodiments of patient support apparatus 20, a patient weight of a patient supported by the frame of the patient support apparatus 20 as measured by a scale system (sometimes referred to as simply a "scale") is used as an additional input to the power drive circuitry, and the power drive circuitry adjusts an electronic braking feature of the first and second dual-wheel motorized casters 30 based on the patient weight. Furthermore, in some embodiments, the power drive circuitry is configured to calculate kinetic energy of patient support apparatus 20 during movement along the floor based on overall weight of the patient support apparatus, including the patient weight, and based on overall velocity of the patient support apparatus 20.

Moreover, in some embodiments, if the patient weight measured by the scale of patient support apparatus 20 is above a weight threshold, then the power drive circuitry implements restriction on the yaw rate $\Omega_y$ restriction which is accomplished by limiting the first, second, third, and fourth angular velocities ω1, ω2, ω3, ω4 of the respective wheels 31*a*, 31*b* of casters 30 thereby to inhibit toppling of the patient support apparatus 20 during turning of patient support apparatus 20. Also, in some embodiments, if the patient weight is above a weight threshold, then the power drive circuitry of patient support apparatus 20 implements a forward speed restriction to limit the first, second, third, and fourth angular velocities ω1, ω2, ω3, ω4 of wheels 31*a*, 31*b* of casters 30, thereby to achieve a maximum stopping distance requirement during electronic braking of the dual-wheel motorized casters 30.

Referring now to FIG. 13, an alternative embodiment patient support apparatus 220 is shown diagrammatically and has a quad single-wheel differential steering control feature. Patient support apparatus 220 is depicted in FIG. 13 as a simple rectangle but the present disclosure contemplates that patient support apparatus 220 has all of the structures and features of patient support apparatus 20 described above, including the variants thereof, except that casters 30, 30' 130 as the case may be, and casters 24, are omitted in patient support apparatus 220. Instead, patient support apparatus 220 has four single-wheel motorized casters 230 attached to the respective base frame 22 in lieu of casters 24, 30, 30' 130. For example, each caster 220 has a caster shaft or tube 222 ("caster shaft" and "caster tube" are used interchangeably herein) that is received in mounting tube 50 of base frame 22 for swiveling movement about a respective swivel axis (note shown, but basically the same caster swivel axis 92 described above). When viewed from above (or below), the swivel axes of casters 230 define corners of an imaginary rectangle.

In some embodiments, casters 230 each include a motor with an integrated planetary gear set which are not shown in FIG. 13 but are the same as motor 102*a* and planetary gear set 104*a* described above in connection with FIGS. 3-8. The motor and gear set of each caster 230 drives a wheel 224 of the corresponding caster 230 to rotate about a respective rotation axis (not shown, but basically the same as wheel rotation axis 100 described above) that is offset from the respective caster swivel axis. However, instead of axle support 94 that is situated between motorized wheels 31*a*, 31*b*, casters 230 each have a caster fork 226 with a pair of spaced fork plates 228 between which extends a respective axle (not shown, but similar to axles 96, 196 described above) that supports the corresponding motor, gear box, and wheel 224 between the associated fork plates 228. In some embodiments, therefore, the motor and gear box of each caster 230 is contained within a hub of wheel 224.

To turn patient support apparatus 220, one or more of the single-wheel motorized casters 230 are controlled differentially so as to drive at different rotational speeds than others of casters 230. For example, one or two of casters 230 are driven faster than the others to accomplish the turning. This is achievable because each of wheels 224 of casters 230 is driven independently from the others by the respective motors and gearboxes, which as described above, can include an in-hub motor assembly, but in alternative embodiments, can include an out-of-hub motor assembly that projects outwardly from one or both of fork plates 228. In response to one or two of wheels 224 of casters 230 being driven faster than the others, each of casters 224 will swivel about the respective swivel axis. For example, if the two casters 230 on the left side of patient support apparatus are driven faster than the two on the right, all of casters 230 will swivel to turn the patient support apparatus 220 to the right. Thus, the four drive wheels 224 of casters 230 can be driven at the same speed, which will result in motion of patient support apparatus 220 in the direction that the casters 230 are pointed. However, if casters 230 at opposite corners of the base frame 22 of patient support apparatus 220 are driven in opposite directions, or at different speeds relative to the other two casters 230, such that certain wheels 224 are rotating at different speeds relative to each other, a torque about a center of mass of patient support apparatus 220 will result, causing a yawing moment for each caster 230 that swivels the respective caster 230 about its respective swivel axis.

The present disclosure contemplates that, in some embodiments, casters 230 include angle sensors, such as angle sensors 112 described above and including angle sensors 112 integrated into slip rings 180, to provide direction sensing of the respective caster 230 for input to the automatic control system (aka power drive circuitry) of patient support apparatus 220. Other inputs to the power drive circuitry of patient support apparatus 220 include one or more of the 9DoF inputs described above in connection with FIG. 12. For example, the rotational speeds of each wheels 224 or the corresponding motors of casters 230 can be input to the power drive circuitry as ω1, ω2, ω3, ω4. Furthermore, in some embodiments, patient support apparatus 220 includes MEMS sensor 202, either alone or in combination with a separate gyroscope, to provide $A_y$, $A_x$, and $\Omega_y$, inputs to the power drive circuitry of patient support apparatus 220.

In some embodiments, the motors of casters 230, as well as the motors 102*a*, 102*b* of casters 30, 30', 130 for that matter, are pulse modulated (PM) brushless direct current (DC) motors with Hall effect sensors for rotor position and/or speed sensing, although sensorless control can also be implemented if desired. As with all PM motors, the motors used in casters 230 (and motors 102*a*, 102*b* discussed above) can also be used as an electrical brake by either applying a short across the motor windings, or driving the motor in synchronization in the reverse direction for maximum braking effort. In some embodiments, the motor windings can be open circuited in casters 230 to permit wheels 224 to freely rotate like a non-motorized caster. The same goes for motors 102*a*, 102*b* in casters 30, 30', 130 described above.

Based on the foregoing, it should be understood that patient support apparatus 220 is configured for propelling a patient along floor using a quad single-wheel differential steering control arrangement. Patient support apparatus 220 includes a frame (e.g., base frame 22, lift system 26, and upper frame 28) configured to support the patient. As noted above, the lift system 26 supports upper frame 28 above base frame 22 to raise, lower, and tilt relative to base frame 22. Patient support apparatus 220 also has first, second, third, and fourth single-wheel casters 230 coupled to base frame 22 and engaging (e.g., contacting or touching) an underlying floor. Regions of base frame 22 to which the first, second, third, and fourth single-wheel casters 230 are coupled form an imaginary rectangle when base frame 22 is viewed from above (or below). Each of the first, second, third, and fourth single-wheel casters 230 includes a respective motor that is operable to drive a respective wheel 224 of the corresponding caster 230 to propel patient support apparatus 220 along the floor.

Figure 15:
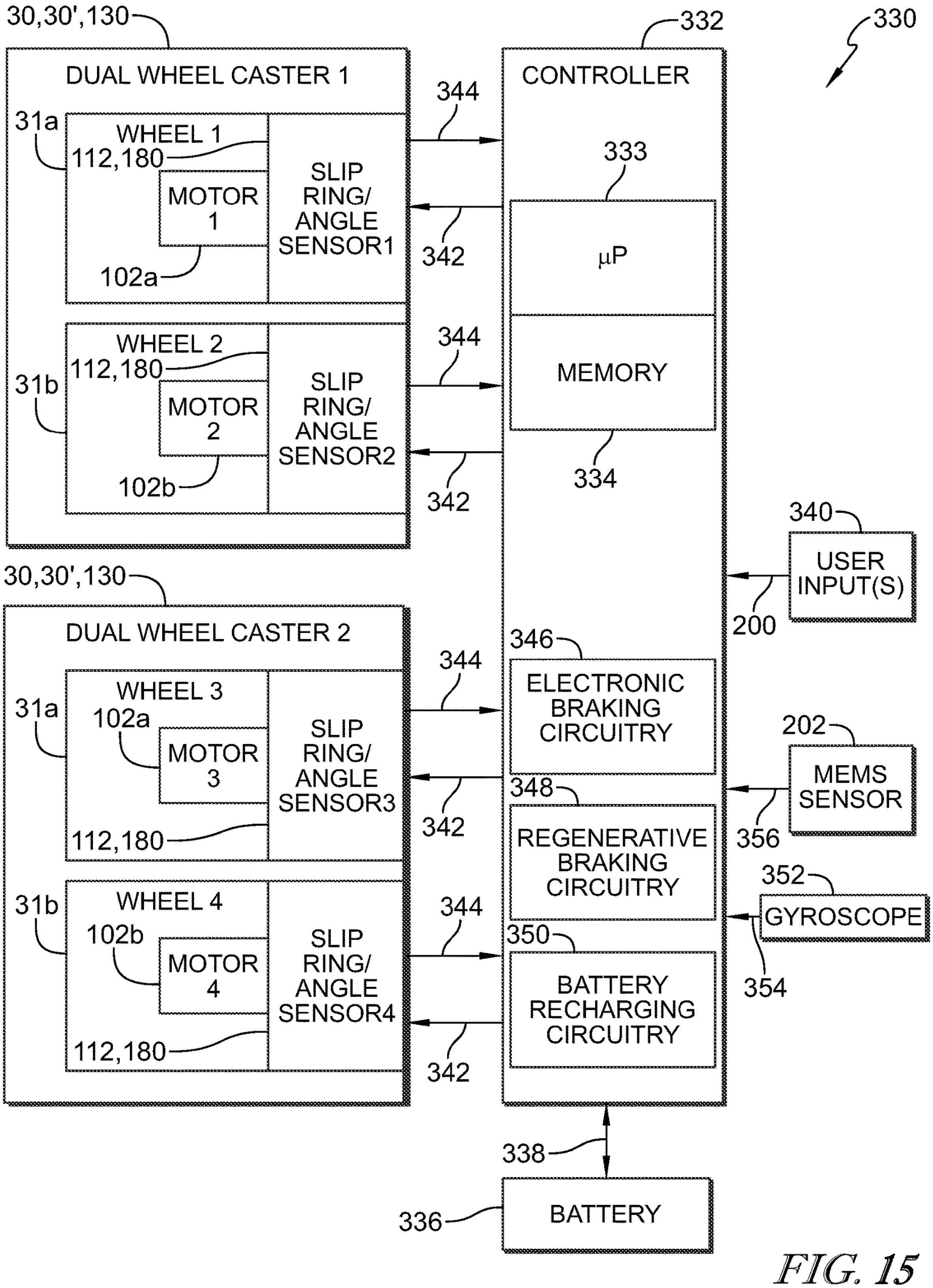
FIG. 15 is a block diagram of power drive circuitry of the patient support apparatus of FIG. 1.
Figure 16A:
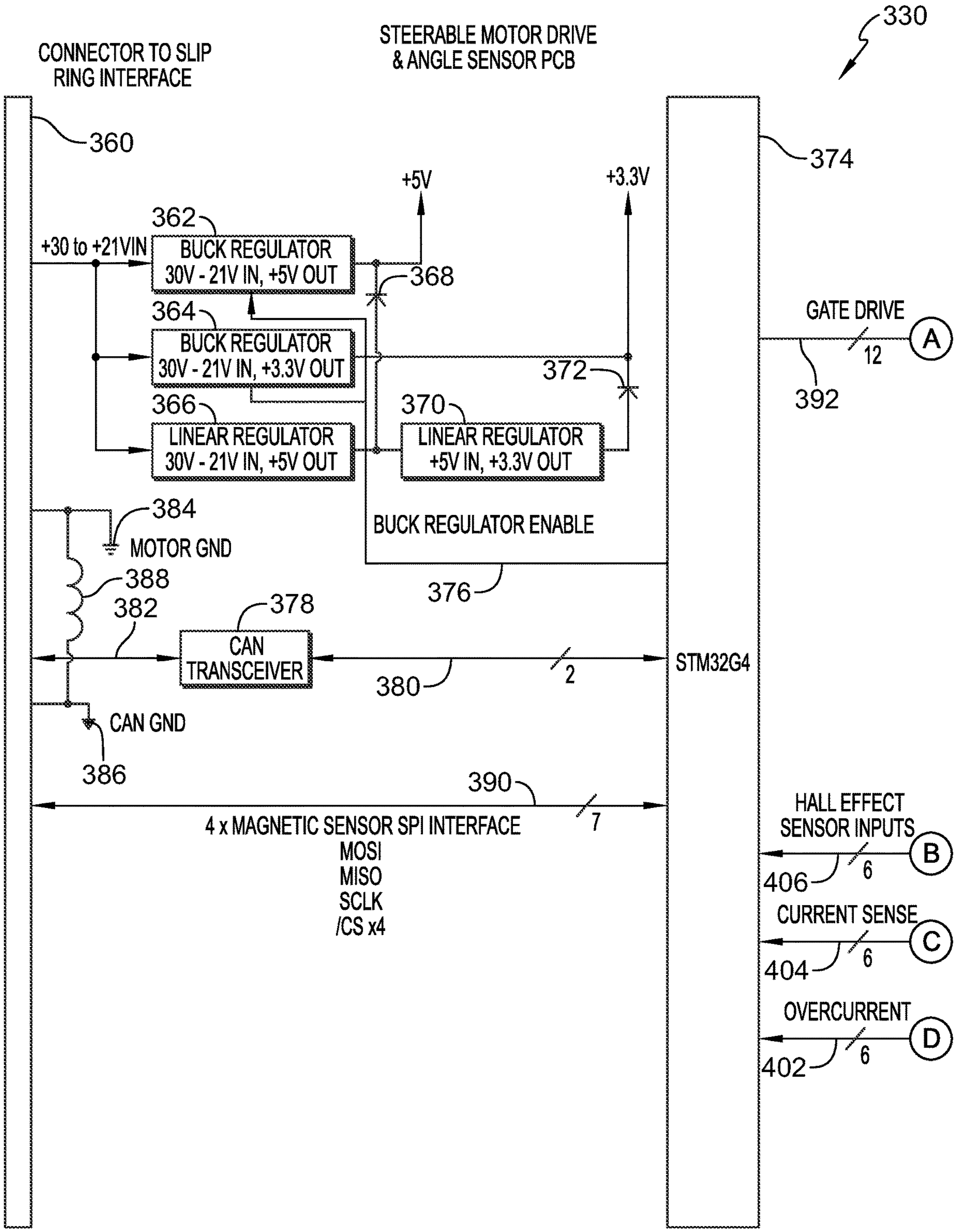
FIGS. 16A and 16B, together form a block diagram showing details of the power drive circuitry included in the two dual-wheel motorized casters of FIGS. 1-7, 12 and 15.
Figure 16B:
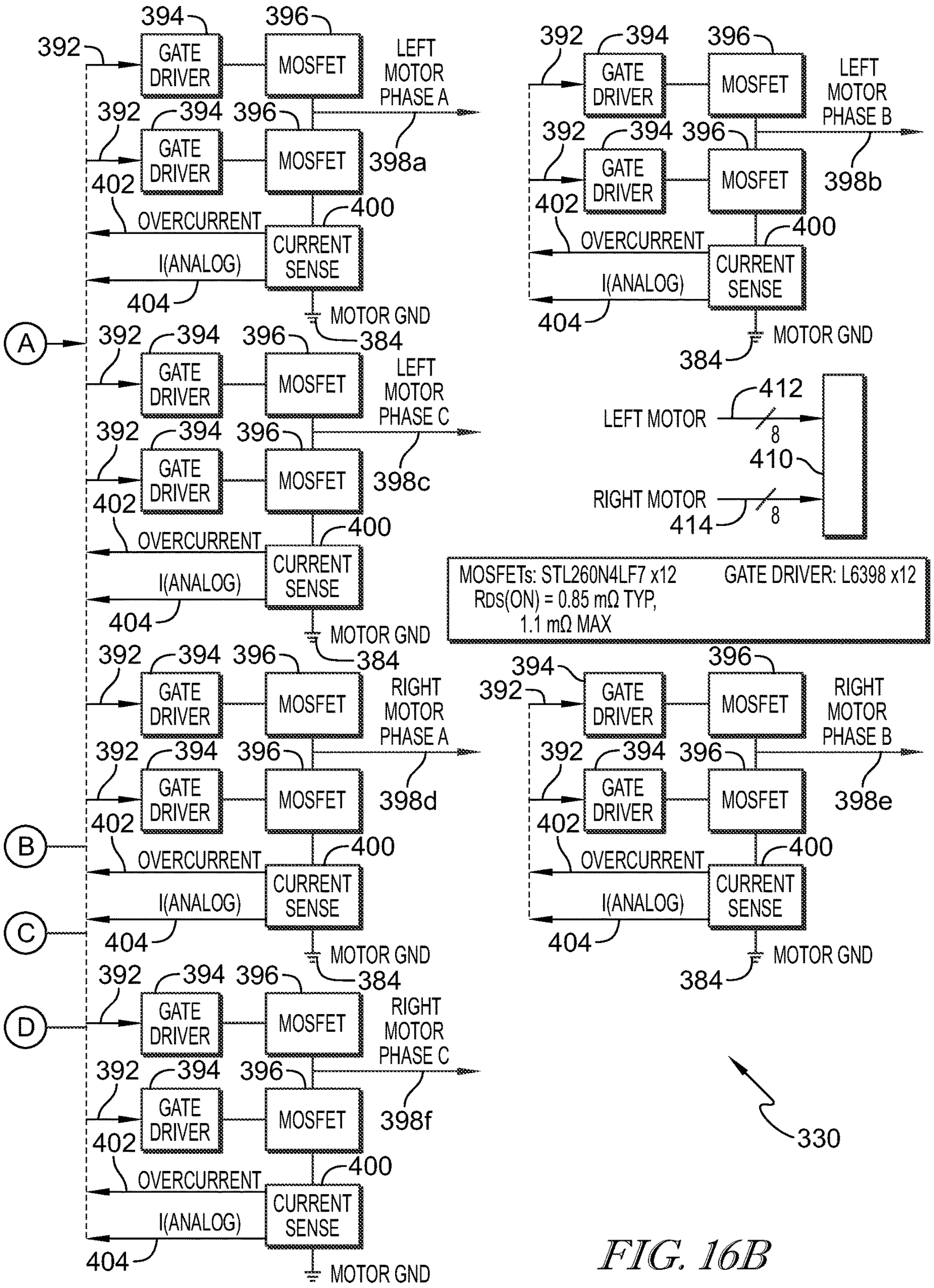

Power drive circuitry, similar to that discussed below in connection with FIGS. 15, 16A, and 16B is coupled to the motors of casters 230. The power drive circuitry is configured to command at least one of the four motors of casters 230 to operate at a speed faster than a speed at which others of the motors of the other casters 230 are operated so that the four casters 230 swivel about respective caster swivel axes, thereby to cause patient support apparatus 220 to turn while being propelled along the floor. In some embodiments, the power drive circuitry of patient support apparatus 220 includes a battery and regenerative braking circuitry to provide current generated by the motors of the corresponding single-wheel casters 230 during deceleration of patient support apparatus 220 to the battery to recharge the battery. Optionally, the power drive circuitry of patient support apparatus 220 includes electronic brake circuitry that is operable to cause deceleration of patient support apparatus 220. For example, the electronic brake circuitry may include switches that are each closed to apply a short across motor windings of the respective motors of the corresponding single-wheel casters 230.

As was the case with regard to motors 102*a*, 102*b* described above, each of the motors of casters 230 may be configured as a pancake motor. Moreover, such pancake motors of each of casters 230 can include an integrated planetary gear set. In some embodiments, each of the pancake motors of casters 230 is embedded at least partially within a respective hub of the corresponding wheel 224 of the respective caster 230. Thus, like tires 98, 99 of wheels 31*a*, 31*b* described above, each of the wheels 224 of casters 230 includes a tire that having a first sidewall and a second sidewall that faces away from the respective first sidewall and no portion of the pancake motors of casters 230 extends beyond the first and second sidewalls of the respective tire.

Figure 14:
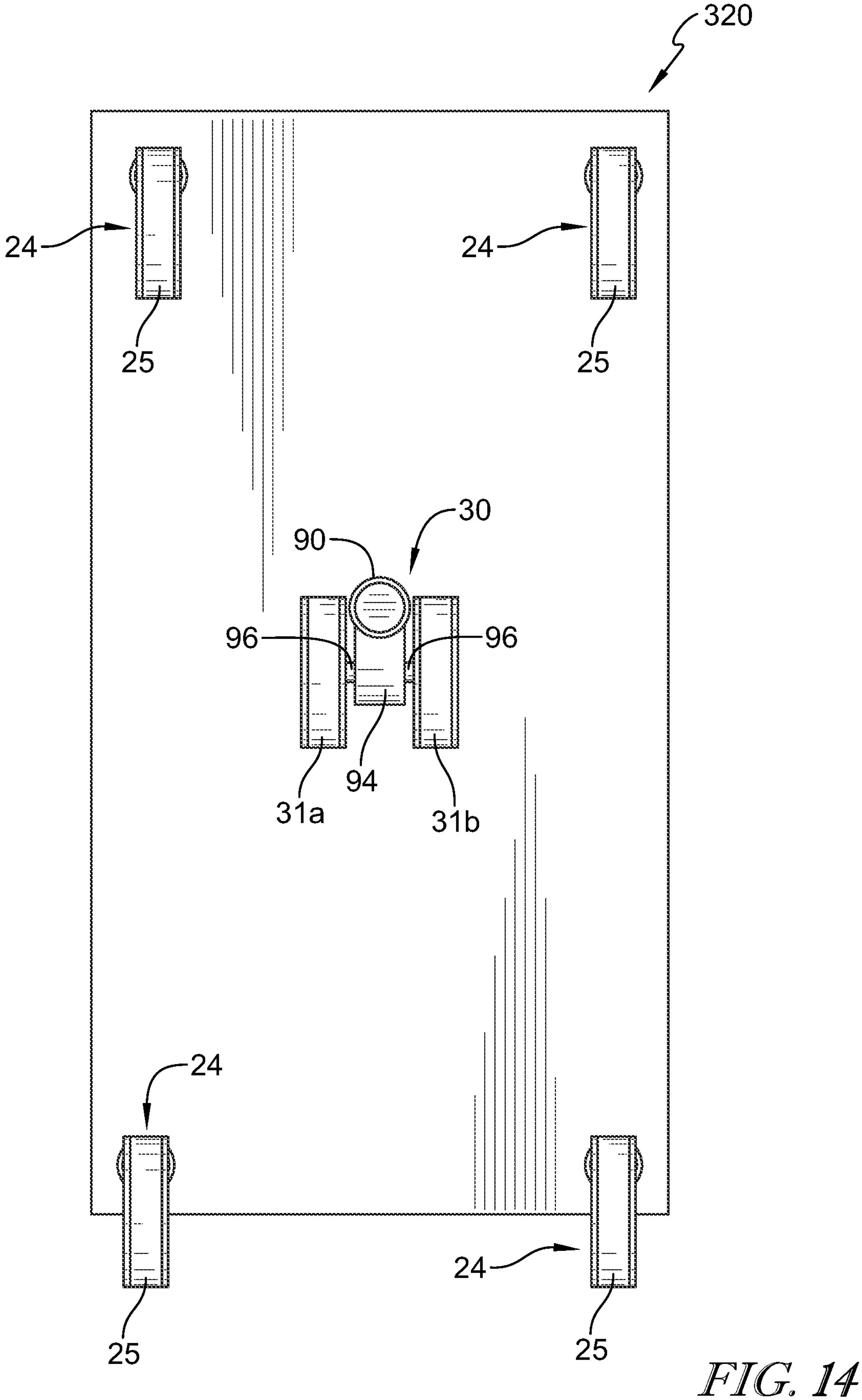
FIG. 14 is a diagrammatic bottom view of a base frame of another alternative embodiment of a patient support apparatus having four non-motorized, freely swivelable, single-wheel casters coupled to corner regions of the base frame and having one dual-wheel motorized caster coupled to a central region of the base frame.

Referring now to FIG. 14, an alternative embodiment patient support apparatus 320 is shown diagrammatically and has a single centrally mounted, dual-wheel differentially steered motorized caster 30 for propelling the patient support apparatus 320 along an underlying floor. Patient support apparatus 320 is depicted in FIG. 14 as a simple rectangle but the present disclosure contemplates that patient support apparatus 320 has all of the structures and features of patient support apparatus 20 described above, including the variants thereof, except for the different caster arrangement. In particular, in addition to centrally mounted dual-wheel motorized caster 30, patient support apparatus has freely rotatable, freely swivelable, casters 24 mounted at the corner regions of base frame 20.

When viewed from above (or below) the caster swivel axes of the four casters 24 of patient support apparatus 320 form an imaginary rectangle. With regard to the centrally mounted location of dual-wheel motorized caster 30 of patient support apparatus 320, it should be appreciated that the caster swivel axis 92 of caster 30 is on or near (e.g., within a few inches or one foot) a point at which diagonals of the just-described imaginary rectangle intersect. In a variant of patient support apparatus 320, dual-wheeled motorized caster 30' is included in patient support apparatus 320 in lieu of caster 30.

All of the discussion above regarding the internal structure of caster 30, including the structure of caster 130 in some embodiments, in connection with patient support apparatus 20 is equally applicable to this same type of caster 30 when used on patient support apparatus 320 unless specifically noted otherwise. Thus, caster 30 on patient support apparatus 320 can include pancake motors 102*a*, 102*b*, planetary gear sets 104*a*, 104*b*, wheels 31*a*, 31*b*, axle support 94, axle 96, angle sensor 112, slip ring 180, and so forth. Accordingly, the descriptions of these components found in various embodiments of caster 30 do not need to be repeated. It is worth noting, however, that in some embodiments of patient support apparatus 320, caster 30 is biased against the underlying floor by one or more biasing elements such as coil springs, torsion springs, leaf springs, gas cylinders (with or without internal springs), dashpots, and the like. These biasing elements may be used in conjunction with linkages that interconnect caster 30 to base frame 22 of patient support apparatus 320. Such biasing elements and linkages, if present, permit caster 30 of patient support apparatus 320 to track the contour of the underlying floor. For example, the floor may include depressions (e.g., holes, grooves, etc.) or protrusions (e.g., humps, door jambs, etc.).

Based on the foregoing, it should be understood that the power drive circuitry of patient support apparatus 320 will only receive caster angle information (e.g., 01) and angular velocity information (e.g., ω1, ω2) for one dual-wheel motorized caster 30 because there is no second dual-wheel motorized caster 30 in patient support apparatus 320 to provide the other sensor inputs (e.g., 02, ω3, ω4) like those discussed above in connection with automatic control of patient support apparatus 20. However, in some embodiments, patient support apparatus 320 includes MEMS sensor 202, either alone or in combination with a separate gyroscope, to provide $A_y$, $A_x$, and $\Omega_y$ inputs to the power drive circuitry of patient support apparatus 320. Thus, in some embodiments, patient support apparatus 320 implements a 6DoF control scheme based on six sensor inputs (e.g., θ1, ω1, ω2, $A_y$, $A_x$, $\Omega_y$) to differentially drive caster 30 to achieve the speed and direction indicated by the input command 200 provided to the power drive circuitry of patient support apparatus 320.

Referring now to FIG. 15, an example of power drive circuitry 330 included in patient support apparatus 20 is shown diagrammatically. Portions of FIG. 15 that were described above are denoted with like reference numbers and the descriptions do not need to be repeated. Circuitry 330 includes a controller 332 having a microprocessor 333 and a memory 334. Microprocessor 333 and memory 334 are included in a single microcontroller integrated circuit chip in some embodiments. In other embodiments, microprocessor 333 and memory 334 are included in separate integrated circuit chips. In still further embodiments, a microcontroller including microprocessor 333 and memory 334 is used in combination with additional memory devices such as one or more of the following: random access memory (RAM) integrated circuit chips (e.g., CBRAM, DRAM, EERAM, FRAM, NVSRAM, PRAM, PSRAM, and SRAM chips), read only memory (ROM) integrated circuit chips (e.g., PROM, EPROM, EEPROM, and MROM chips), and disk storage (e.g., hard disk drives (HDD's) and solid-state drives (SSD's)), just to name a few.

Controller 332 receives power from a battery 336 of patient support apparatus 20 and provides current to battery 336 for recharging as indicated diagrammatically by double headed arrow 338. Battery 336 is a dedicated battery for the power drive circuitry 330 in some embodiments. In such embodiments, patient support apparatus 20 includes one or more additional batteries for operating other functions of the patient support apparatus 20 such as powering GUI 72, powering other circuitry of patient support apparatus 20, operating lift system actuator 28, operating other actuators to tilt upper frame 28 relative to base frame 22 and to move deck sections 61, 62, 63 relative to upper frame 28, and powering the scale system, if present. In other embodiments, battery 336 is used to power all functions of patient support apparatus 20 including the functions of power drive circuitry 330. It should be appreciated that FIG. 15 depicts portions of the overall circuitry of patient support apparatus 20 that are allocated for propelling the patient support apparatus 20 along an underlying floor and that other portions of the overall circuitry of patient support apparatus 20 is omitted.

Controller 332 receives input command 200 from one or more user inputs 340. Examples of user input(s) 340 include a joystick and/or load cells coupled to push handles 64 as discussed above. Controller 332 sends motor control signals 342 via slip rings 180 to motors 102*a*, 102*b* of the two dual-wheel motorized casters 30, 30', 130 as the case may be. Moreover, controller 332 receives feedback signals 344 from motors 102*a*, 102*b* and from angle sensor 112. For example, motors 102*a*, 102*b* include Hall effect sensors in some embodiments to provide signals from which the rotational output speed of the respective rotors of motors 102*a*, 102*b* is determinable. The rotational speeds ω1, ω2, ω3, ω4 of wheels 31*a*, 31*b* of casters 30 are then determinable by multiplying the rotor speeds by the gear reduction ratios of the planetary gear sets 104*a*, 104*b* of motors 102*a*, 102*b*.

Still referring to FIG. 15, controller 332 includes electronic braking circuitry 346, regenerative braking circuitry 348, and battery recharging circuitry 350 as indicated diagrammatically by separate blocks. However, circuitry 346, 348, 350 may have some circuit components (e.g., transistors, resistors, capacitors, processors, voltage controllers, etc.) in common in some embodiments. That is components of circuitry 346 also may be considered to be part of circuitry 348 and vice versa; components of circuitry 348 may be considered to be part of circuitry 350 and vice versa; and components of circuitry 346 may be considered to be part of circuitry 350 and vice versa. Furthermore, circuitry 346, 348, 350 may output signals that are included in the control signals 342 for motors 102*a*, 102*b* and may receive signals that are included in the feedback signals 344 from motors 102*a*, 102*b*.

In some embodiments, battery recharging circuitry 350 also recharges battery 336 when a power plug of a power cord (not shown) of patient support apparatus 20 is plugged into a standard alternating current (AC) power outlet in a healthcare facility, for example. Battery 336 includes one or more rechargeable battery cells, such as one or more of the following: lead-acid battery cells, nickel-cadmium (NiCd) battery cells, nickel-metal hydride (NiMH) battery cells, lithium-ion (Li-ion) battery cells, lithium-ion polymer (LiPo) battery cells, and rechargeable alkaline battery cells, in some embodiments.

As further shown in FIG. 15, a gyroscope 352 is shown as a separate component from the MEMS sensor 202 and provides a gyroscope signal 354 to controller 332 from which the yaw rate $\Omega_y$, of patient support apparatus 20 is determinable by microprocessor 333 based on programming stored in memory 334 in some embodiments. As alluded to above, MEMS sensor 202 provides one or more sensor signals 356 from which the longitudinal acceleration $A_y$ and lateral acceleration $A_x$ of patient support apparatus 20 is determinable by microprocessor 333 based on programming stored in memory 334 in some embodiments.

Each of the arrows in FIG. 15 denoted by reference numerals 200, 338, 342, 344, 354, 356 represent any number of conductors, such as wires included in insulated cables, ribbon cables, coaxial cables, twisted wire pairs, and the like, for carrying the associated power and/or data signals. Accordingly, various types of electrical connectors are provided at the terminal ends of these various conductors to interface with mating connectors of controller 332 and the associated components (e.g., slip ring 180, MEMS sensor 202, battery 336, and user input(s) 340). The various circuitry 346, 348, 350 and circuit components 333, 334 of controller 332 are provided on a common printed circuit board (PCB) in some embodiments. In other embodiments, multiple PCB's are used to carry the various circuitry and circuit components that make up power drive circuitry 330. For example, in some embodiments, circuitry 346, 348, 350 is carried on one PCB and microprocessor 333, 334 are carried on another PCB. If multiple PCB's are used, then communication circuitry is provided to interconnect these various PCB's of the power drive circuitry 330 to communicate associated power and data signals therebetween. Similar communication circuitry (e.g., input/output (I/O) ports, universal serial bus (USB) ports, serial peripheral interface (SPI) ports, transceivers such as controller area network (CAN) transceivers, and so forth) is used to interconnect the one or more PCB's of power drive circuitry 330 with other portions of the overall circuitry of patient support apparatus 20.

Referring now to FIGS. 16A and 16B, details of portions of power drive circuitry 300 included in each of the two dual-wheel motorized casters 30, 30', 130, as the case may be, of patient support apparatus 20 is shown diagrammatically. Thus, FIGS. 16A and 16B depict the portion of power drive circuitry 330 contained in only one of dual-wheel motorized caster 30, 30' 130, it being understood that the same circuitry is also included in the other dual-wheel motorized caster 30, 30', 130 as well. In some embodiments, some or all of the components of the circuitry shown in FIGS. 16A and 16B is mounted to PCB 182*a* of slip ring 180 to swivel therewith about caster swivel axis 92 of the corresponding dual-wheel caster 30, 30', 130. In other embodiments, such as the illustrative example of FIGS. 16A and 16B, some or all of the circuit components depicted in FIGS. 16A and 16B are mounted elsewhere in caster 30, 30' 130 such as being mounted to one or more PCB's attached to caster shaft 90, axle support 94, and/or motors 102*a*, 102*b*. In still further embodiments, some or all of the circuit components depicted in FIGS. 16A and 16B are mounted to PCB 182*b* of slip ring 180. In yet other embodiments, some or all of the circuit components depicted in FIGS. 16A and 16B are mounted to one or more of the PCB's of controller 332. Thus, because power and data signals are able to be communicated through slip ring 180 as described above, it is possible to mount the circuit components of FIGS. 16A and 16B within the corresponding caster 30, 30', 130, and/or within the slip ring 180, and/or at locations on patient support apparatus 20 away from the corresponding caster 30, 30', 130 and slip ring 180, at the discretion of the system designer.

As shown in FIG. 16A, a connector 360 which is configured to mate with connector 194 of race 184*a* of slip ring 180, is included in power drive circuitry 330 and communicates +30 to +21 Volts input (VIN) power to first and second buck regulators 362, 364 and to a first line regulator 366. First buck regulator 362 converts the +30 to +21 VIN signal into a +5 Volt (V) output for use in powering various integrated circuit chips of the power drive circuitry 330 of FIGS. 16A and 16B that require +5 V inputs. Similarly, second buck regulator 364 converts the +30 to +21 VIN signal into a +3.3 V output for use in powering various integrated circuit chips of the power drive circuitry 330 of FIGS. 16A and 16B that require +3.3 V inputs.

First linear regulator 366 converts the +30 to +21 VIN signal into a +5 V output which is coupled to the +5 V output of first buck regulator 362 through a first diode 368. The +5 V output of first linear regulator is also coupled to a second linear regulator 370 as a +5 V input. Second linear regulator 370 converts the +5 V input into a +3.3 V output which is coupled to the +3.3 V output of the second buck regulator 364 through a second diode 372. The portion of power drive circuitry 330 shown in FIG. 16A includes a microcontroller 374 which, in the illustrative example, is a model no. STM32G4 mixed-signal microcontroller available from STMicroelectronics of Geneva, Switzerland. Microcontroller 374 has a buck enable output line 376 that is input to first and second buck regulators 362, 364 to control the on/off state thereof.

In some embodiments, one or more of electronic braking circuitry 346, regenerative braking circuitry 348, and battery recharging circuitry 350 is included in, or is coupled to microcontroller 374. That is, the functionality and circuitry depicted as blocks 346, 348, 350 of controller 332 of patient support apparatus 20 in FIG. 15, is instead included internal to the caster 30, 30', 130 in combination with the circuitry shown in FIGS. 16A and 16B.

Microcontroller 374 is coupled to a CAN transceiver 378 via a pair of communication lines 380 as shown in FIG. 16A. CAN transceiver 380 is also coupled to connector 360 by a pair of communication lines 382. Thus, some communications between microcontroller 374 and controller 332 of circuitry 330 are formatted as CAN messages that are transmitted or received by CAN transceiver 378 and that are passed through connectors 194, 360 and slip ring 180. Connector 360 is also coupled to motor ground 384 and CAN ground 386. An inductor 388 interconnects grounds 384, 386 together.

Still referring to FIG. 16A, a 7-line serial peripheral interface (SPI) bus 390 extends between microcontroller 374 and connector 360 for SPI communications with the angle sensor 112 of slip ring 180. Bus 390 includes a master out slave in (MOST) line, a master in slave out (MISO) line, a serial clock (SCLK) line, and four chip select (/CS) lines. The /CS lines of bus 390 are used to determine which of the four magnetic field sensors 168 (see FIG. 10 above) is the one that is to be read by microcontroller 374 in connection with determining the drive direction (e.g., angle θ1) of the associated caster 30, 30', 130.

As shown in FIG. 16A, microcontroller 374 has twelve gate drive output lines 392 that are each input into a respective gate driver 394 as shown in FIG. 16B. An output of each gate driver 394 is input into an associated metal-oxide-semiconductor field effect transistor (MOSFET) 396 as also shown in FIG. 16B. Outputs of pairs of MOSFET's 396 are coupled together and provide respective phase inputs to either motor 102*a* (referred to as the "LEFT MOTOR" in FIG. 16B) or motor 102*b* (referred to as the "RIGHT MOTOR" in FIG. 16*b*). Because motors 102*a*, 102*b* in the illustrative embodiment are DC motors as discussed above, the phases to these motors output by the respective pairs of MOSFET's 396 are pulse width modulated (PWM) square waves (aka pulse modulated (PM) square waves). In any event, under the control of microcontroller 374, the pairs of MOSFET's 396 provide a left motor phase A output 398*a*, a left motor phase B output 398*b*, a left motor phase C output 398*c*, a right motor phase A output 398*d*, a right motor phase B output 398*e*, and a right motor phase C output 398*f*. Outputs 398*a-c* are input into motor 102*a* and outputs 398*d-f* are input into motor 102*b*.

In the illustrative embodiment, gate drivers 396 are model no. L6398 high voltage and low-side gate drivers available from STMicroelectronics of Geneva, Switzerland, and MOSFET's are model no. STL260N4LF7 N-channel MOSFET's also available from STMicroelectronics of Geneva, Switzerland. These STL260N4LF7 N-channel MOSFET's have a static drain-source ON resistance that is about 0.85 mega Ohms (me) typical and about 1.1 me maximum.

Still referring to FIG. 16B, one of MOSFET's 396 of each pair of MOSFET's 396 is coupled to motor ground 384 through a respective current sense circuit or current sensor 400. Each current sensor 400 outputs an overcurrent signal on an overcurrent line 402 and an analog current signal on a current sense line 404. The six overcurrent lines 402 and the six current sense lines 404 are input into microcontroller 374 as shown in FIG. 16A. Six Hall effect sensor lines 406 are also input into microcontroller 374. Three of Hall effect sensor lines 406 carry signals to microcontroller 374 from Hall effect sensors of motor 102*a* and three others of the Hall effect sensor lines 406 carry signals to microcontroller 374 from Hall effect sensors of motor 102*b*. Thus, the rotational speed of the rotors of motors 102*a*, 102*b* are determined based on the signals input to microcontroller 374 on lines 406.

Circuitry 330 further includes a motor control board 410 that couples to eight lines 412 for the left motor and eight lines 414 for the right motor as shown in FIG. 16B. Motor control board 410 is internal to the caster 30, 30', 130 (e.g., coupled to PCB 182*a* or caster shaft 90 or axle support 94). The eight left motor lines 412 include lines for left motor phase A 398*a*, left motor phase B 398*b*, left motor phase C 398*c*, left motor Hall effect sensor A, left motor Hall effect sensor B, left motor Hall effect sensor C, left motor +V, and left motor GND 384. Similarly, the eight right motor lines 414 include lines for right motor phase A 398*d*, right motor phase B 398*e*, right motor phase C 398*f*, right motor Hall effect sensor A, right motor Hall effect sensor B, right motor Hall effect sensor C, right motor +V, and right motor GND 384. The motor control board 410 connects to motors 102*a*, 102*b* of the respective caster 30, 30', 130 to provide the signals that actually drive motors 102*a*, 102*b* and to receive the Hall effect sensor feedback signals therefrom.

Figure 17:
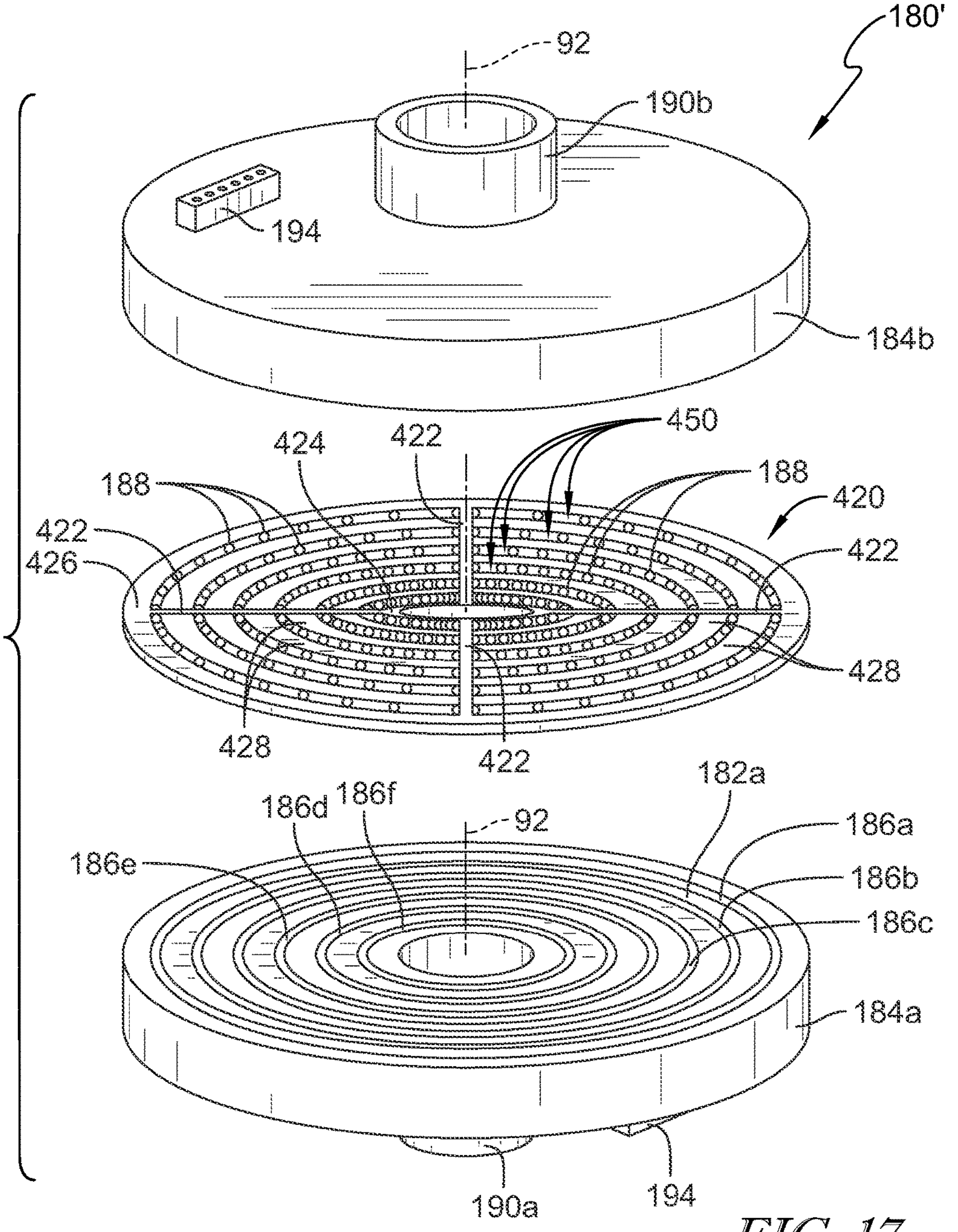
FIG. 17 is an exploded view of an alternative embodiment of a slip ring showing a spacer supporting a plurality of balls between a first race and a second race.

Referring now to FIG. 17, an exploded view of an alternative embodiment of a slip ring 180' is provided. Similar to slip ring 180, slip ring 180' may be included in casters 30, 30', 130 in some embodiments. Slip ring 180' is substantially the same as slip ring 180 discussed above and so, where appropriate, the same reference numbers are used to denote portions of slip ring 180' that are substantially the same as like portions of slip ring 180 and the descriptions are not repeated. Furthermore, the discussion above regarding the inclusion of an angle sensor 112 in slip ring 180 is equally applicable to slip ring 180'. Thus, slip ring 180' includes one or more magnets 160 and one or more sensors 168 in some embodiments. Additionally, the discussion above of various calibration algorithms in connection with angle sensor 112 of slip ring 180 is equally applicable to slip ring 180'.

Figure 18:
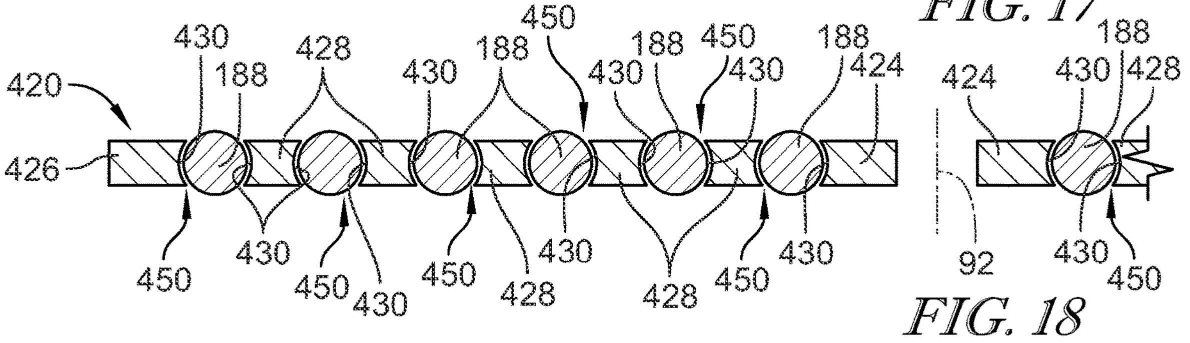
FIG. 18 is a cross sectional view showing the spacer having the balls snapped into slots in the spacer.

The main difference between slip ring 180 and slip ring 180' is the inclusion of a spacer 420 in slip ring 180' as shown in FIGS. 17 and 18. Spacer 420 is configured to guide and support the plurality of balls 188 between first race 184*a* and second race 184*b* or, more accurately, between conductive traces 186*a-f* of PCB's 182*a*, 182*b*. Thus, spacer 420 holds the plurality of conductive balls 188 in place between the first and second PCB's 182*a*, 182*b* while allowing rotation of at least one of the first and second PCB's 182*a*, 182*b* relative to the other about swivel axis 92. Spacer 420 is configured so that the six courses of balls 188 are maintained in contact with the respective conductive traces 186*a-f* of PCB's 182*a*, 182*b*.

In the illustrative embodiment, spacer 420 includes a set of spokes 422 that extend radially between an inner spacer ring 424 and an outer spacer ring 426. Illustratively, there are four spokes 422 that are spaced 90° apart from one another about axis 92. A different number of spokes 422, more or less than four, may be included in spacer 420 in other embodiments. Spacer 420 is formed to included arced slots 450 extending between respective pairs of spokes 422. The plurality of balls 188 are situated within the arced slots 450. In the illustrative embodiment, there are six arced slots 450 between adjacent pairs of spokes 422 with each of the arced slots 450 having a radius of curvature that is centered on the swivel axis 92. It should be appreciated that arced slots 450 are formed at locations in spacer 420 so as to position balls 188 between the respective pairs of conductive traces 186*a-f* with which each of the balls 188 is to be in electrically contact.

The size of slots 450 varies depending upon the distance away from axis 92. Thus, the number of balls 188 that are able to fit within any given arced slot 450 varies depending upon the distance away from axis 92. Accordingly, the number of balls 188 that can fit into arced slot 450 adjacent to outer spacer ring 426 is greater than the number of balls 188 that can fit into arced slot 450 adjacent to inner spacer ring 424, with an intermediate number of balls 188 being able to fit into one or more of the other four arced slots 450 situated radially between the outermost and innermost arced slots 450. Depending upon the diameter of balls 188, the same number of balls 188 may be positioned within radially adjacent arced slots if the larger arced slot 188 of the two radially adjacent slots 450 is not large enough to fit an additional ball 188.

In some embodiments, however, an equivalent number of balls 188 may be placed in each arced slot 450 such that an amount of possible circumferential spacing between balls 188 increases as the radial distance away from axis 92 increases. In such embodiments, therefore, the number of balls 188 that is able to fit within the arced slot 450 closest to axis 92 determines the number of balls 188 that are inserted into the remaining companion slots 450 that are radially outboard of the innermost slot 450 that is closest to axis 92. Furthermore, if an equivalent number of balls 188 is provided in each arced slot 450, then the number of electrical contact points between balls 188 and each of conductive traces 186*a-f* is equivalent which results in an impedance associated with balls 188 being substantially equivalent for the electric current passing between respective pairs of traces 186*a-f* through slip ring 180'.

Referring now to FIG. 18, inner and outer spacer rings 424, 426, as well as each of a plurality of arced segments 428 of spacer 420, have curved circumferential surfaces 430 that face toward or confront each of the respective balls 188 that are situated within arced slots 450. Curved circumferential surfaces 430 define grooves having rounded cross sections and that extend along the arc length of each arced slot 450. The grooves of surfaces 430 are shaped to retain balls 188 within the arced slots 450. A small amount of diametral clearance exists between surfaces 430 and balls 188 such that balls 188 have a loose fit (i.e., do not have an interference fit) relative to respective inner and outer spacer rings 424, 426 and arced segments 428, as the case may be. Such a loose fit may be on the order of 0.01 to 0.001 inches, for example, although other clearances between balls 188 and rings 424, 426 and segments 428 that are greater than or lesser than these values are within the scope of the present disclosure.

Based on the foregoing, it should be appreciated that inner and outer spacer rings 424, 426 and arced segments 428 of spacer 420 are sized and configured such that balls 188 are each snapped into the respective arced slots 450 past the corner edges defined between curved circumferential surfaces 430 and the upper and lower planar surfaces of spacer 420. As a result, if spacer 420 is held up in the air, the balls 188 situated within the arced slots 450 of spacer 420 would not fall out of the respective slots 450 due to the retention of balls 188 relative to spacer 420 by the configuration of surfaces 430. Due to the ball retention feature of spacer 420, the spacer 420 may sometimes be referred to as a "keeper."

In some embodiments, spacer 420 is made of a plastics material or other non-conductive material. Illustrative spacer 420 is configured to restrict the radial movement of the conductive balls 188 and maintain respective circular orbits of balls 188 about axis 92 which allows for the proper functioning of slip ring 180' for current conduction between the relatively rotating PCB's 182*a*, 182*b*. It should be noted that all of balls 188, along with spacer 420, travel at the same angular rate about axis 92. However, the linear rate at which balls 188 travel varies from inside to outside. For example, during one revolution of spacer 420 about axis 92, each ball 188 adjacent to inner spacer ring 424 travels a shorter distance than each ball adjacent to outer spacer ring 426.

Figure 19:
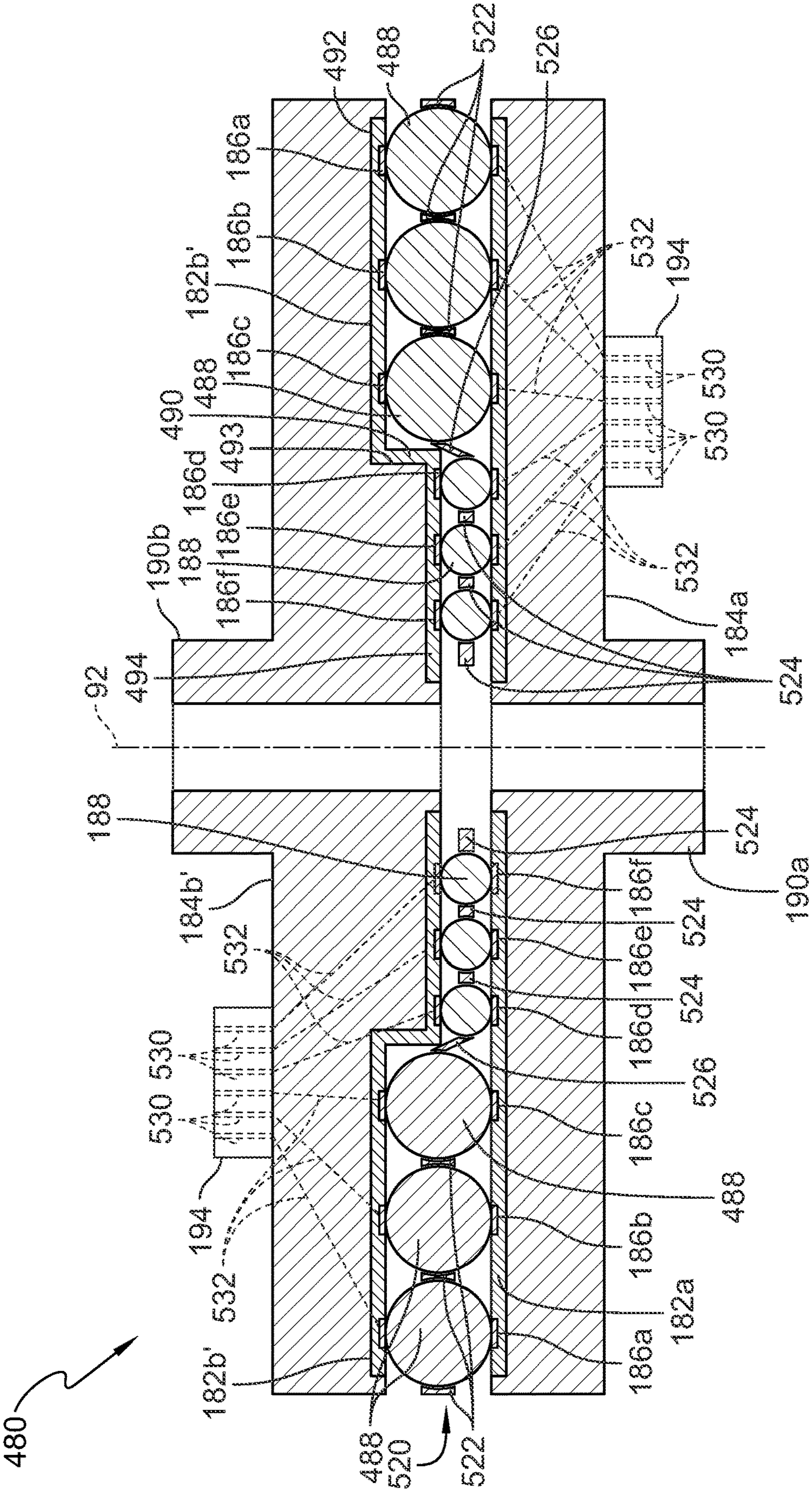
FIG. 19 is a cross sectional view of another alternative embodiment of a slip ring showing a set of large-diameter balls and a set of small-diameter balls situated between an upper, stepped printed circuit board and associated upper race and a lower, planar printed circuit board and associated lower race.

Referring now to FIG. 19, a cross sectional view of another alternative embodiment of a slip ring 480 is provided. Similar to slip rings 180, 180', slip ring 480 may be included in casters 30, 30', 130 in some embodiments. Slip ring 480 is similar to slip rings 180, 180' discussed above and so, where appropriate, the same reference numbers are used to denote portions of slip ring 480 that are substantially the same as like portions of slip rings 180, 180' and the descriptions are not repeated. Furthermore, the discussion above regarding the inclusion of an angle sensor 112 in slip rings 180, 180' is equally applicable to slip ring 480. Thus, slip ring 480 includes one or more magnets 160 and one or more sensors 168 in some embodiments. Additionally, the discussion above of various calibration algorithms in connection with angle sensor 112 of slip ring 180, 180' is equally applicable to slip ring 480.

One of the main differences between slip ring 480 and slip rings 180, 180' is that slip ring 480 includes a set of conductive balls 488 that are larger in diameter than the set of conductive balls 188. To accommodate the large size balls 488, slip ring 480 has a stepped race 184*b*', a stepped PCB 182*b*', and a stepped spacer 520. In the illustrative example of FIG. 19, stepped PCB 182*b*' is embedded into the stepped race 184*b*' and PCB 182 is embedded into race 184*a*. The depth of the embedding is approximately equivalent to the thickness of the PCB's 182*a*, 182*b*'. Circular conductive traces 186*a-f* are embedded into respective PCB's 182*a*, 182*b*' by an amount that is approximately equivalent to the thickness of conductive traces 186*a-f* as also shown in the embodiment of FIG. 19.

A step portion 490 of PCB 182*b*' is formed as a cylindrical wall that interconnects a first or upper portion 492 of PCB 182*b*' with a second or lower portion 494 of PCB 182*b*' in the illustrative embodiment of slip ring 480. The terms "upper" and "lower" are used with reference to the orientation of slip ring 480 in FIG. 19. However, it should be understood that slip ring 480 may be used in other orientations as well, such as being rotated 90 degrees or 180 degrees or any other desired amount of rotation in a clockwise or counterclockwise direction with respect to the plane of the paper on which FIG. 19 appears. In other embodiments, step portion 490 is formed as a frustoconical wall that interconnects first and second portions 492, 494 of PCB 182*b*'. Step portion 490 engages a cylindrical surface 492 of race 184*b*'. In embodiments in which step portion 490 is frustoconical, surface 492 has a complimentary frustoconical shape.

Spacer 520 includes upper segments 522 that are shaped and configured to guide and retain balls 488 and lower segments 524 that are shaped and configured to guide and retain balls 188. Spacer 520 further includes a transition segment 526 that helps to guide and retain the radially inwardmost compliment of balls 488 and the radially outwardmost compliment of balls 188. A thickness of segments 522 in a direction parallel with axis 92 is larger than a thickness of segments 524 in the same direction. In the illustrative example of FIG. 19, transition segment 526 is frustoconical in shape. In other embodiments, transition segment 526 is cylindrical in shape. Spacer 520 includes arced slots similar to slots 450 of spacer 420 in which balls 188, 488 are situated. Spacer 520 further includes spokes similar to spokes 422 of spacer 420. Of course, the arced slots in spacer 520 that receive balls 488 have a larger radial width than the slots that receive balls 188.

Still referring to FIG. 19, connectors 194 coupled to races 184*a*, 184*b*' each have six contacts 530. Contacts 530 are male contacts (e.g., pins) in some embodiments and are female contacts (e.g., sockets) in other embodiments. The present disclosure also contemplates that some of contacts 530 of each connector 194 are male contacts and that others of contacts 530 of each connector 194 are female contacts. For example, if contacts 530 of each connector 194 include a group of three successive male contacts adjacent to a group of three successive female contacts, then an orientation of a companion connector of circuit 330 (see FIGS. 16A and 16B above) that mates with the respective connectors 194 will only mate in a single, proper orientation, assuming the companion connectors each have three female contacts that mate with the three male contacts of each connector 194 and each have three male connectors that mate with the three female contacts of each connector 194. To give some other examples, each of connectors 194 may be configured with two successive male contacts adjacent to a group of four successive female contacts, or a single male contact adjacent to a group of five successive female contacts, or two successive female contacts adjacent a group of four successive male contacts, or a single female contact adjacent to a group of five successive male contacts. In each of these additional examples, the proper orientation of an appropriately configured companion connector is assured.

Each of contacts 530 of connectors 194 couples electrically with a respective one of circular conductive traces 186*a-f* via a respective conductor 532 as shown diagrammatically in FIG. 19. Conductors 532 may include wires, for example. In some embodiments, conductors 532 may be grouped together in a single cable that extends through the respective race 184*a*, 184*b*' from the associated connector 194 to respective PCB's 182*a*, 182*b*' rather than routing through races 184*a*, 184*b*' along individual, spread-apart paths as suggested diagrammatically in FIG. 19 although such individual paths are within the scope of the present disclosure. In still other embodiments, connectors 194 and the corresponding contacts 530 may extend through the respective races 184*a*, 184*b*' all the way to respective PCB's 182*a*, 182*b*' and then conductors 532 are contained entirely within PCB's 182*a*, 182*b*'. In such embodiments, each of races 184*a*, 184*b*' is formed to include a hole through which such elongated connectors 194 and the corresponding contacts 530 extend. In other words, connectors 194 may be mounted to PCB's 182*a*, 182*b*' and extend through the corresponding hole formed in respective races 184*a*, 184*b*'.

Figure 20:
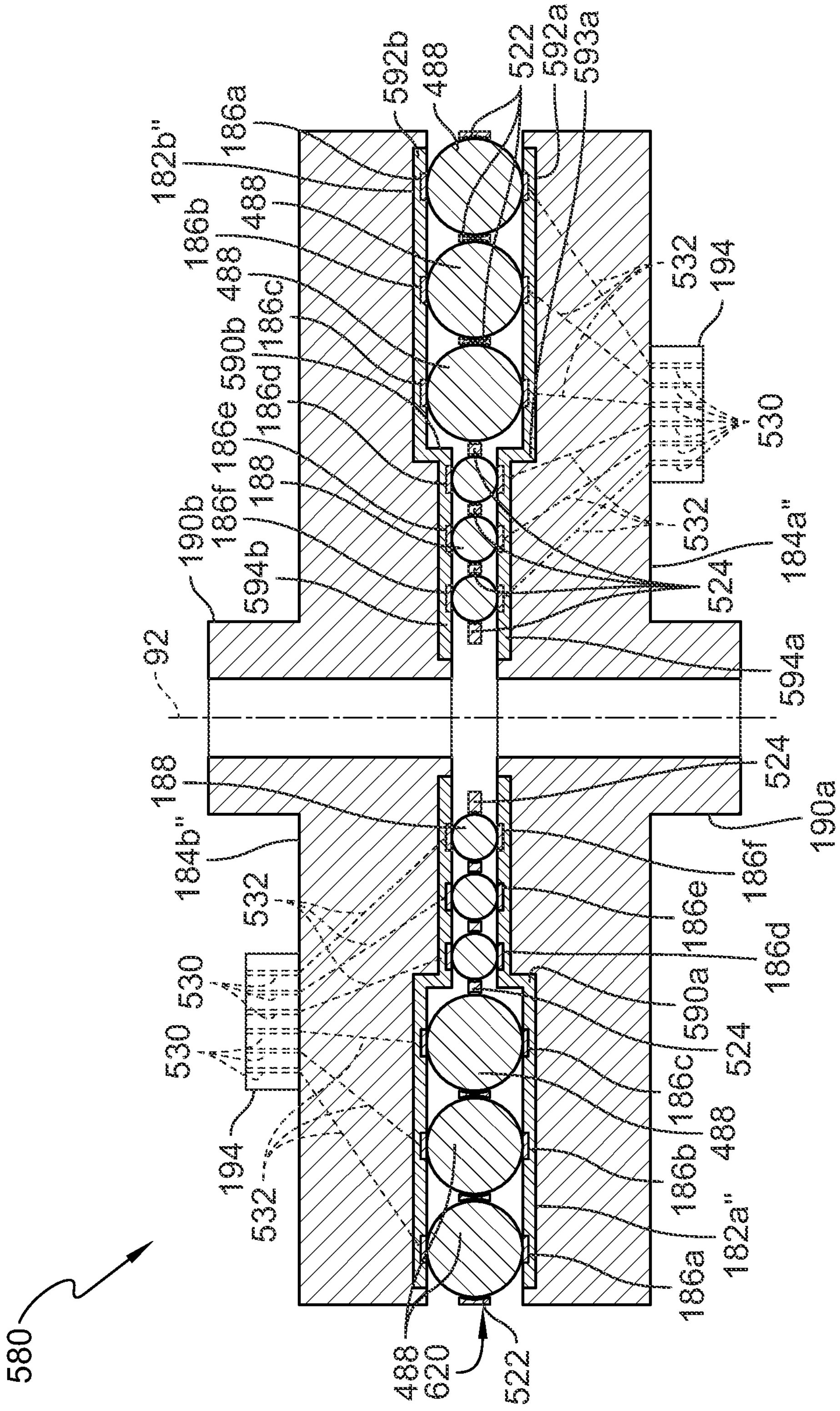
FIG. 20 is a cross sectional view of yet another alternative embodiment of a slip ring showing a set of large-diameter balls and a set of small-diameter balls situated between an upper, stepped printed circuit board and associated upper race and a lower, stepped printed circuit board and associated lower race.

Referring now to FIG. 20, a cross sectional view of another alternative embodiment of a slip ring 580 is provided. Similar to slip rings 180, 180', 480, slip ring 580 may be included in casters 30, 30', 130 in some embodiments. Slip ring 580 is similar to slip rings 180, 180', 480 discussed above and so, where appropriate, the same reference numbers are used to denote portions of slip ring 580 that are substantially the same as like portions of slip rings 180, 180', 480 and the descriptions are not repeated. Furthermore, the discussion above regarding the inclusion of an angle sensor 112 in slip rings 180, 180' is equally applicable to slip ring 580. Thus, slip ring 580 includes one or more magnets 160 and one or more sensors 168 in some embodiments. Additionally, the discussion above of various calibration algorithms in connection with angle sensor 112 of slip ring 180, 180' is equally applicable to slip ring 580.

One of the main differences between slip ring 580 and slip rings 180, 180' is that slip ring 580 includes a set of conductive balls 488 that are larger in diameter than the set of conductive balls 188. In this regard, slip ring 580 is like slip ring 480 in that two different sized balls 188, 488 are used. However, to accommodate the large size balls 488 in slip ring 580, two stepped races 184*a*", 184*b*" and two stepped PCB's 182*a*", 182*b*" are provided. The steps formed in races 184*a*", 184*b*" are similarly sized which permits the center points of balls 188, 488 to be aligned in a plane. As a result, a stepped spacer is not needed in slip ring 580. Instead, slip ring 580 has a spacer 620 with segments 524 that retain and guide balls 488 and segments 522 that retain and guide balls 188 but these segments 522, 524 are generally aligned radially with each other as shown in FIG. 20. As compared to spacer 520 of slip ring 480, spacer 620 of slip ring 580 omits the transition segment 426 and has an additional segment 522 in its place. Spacer 620 includes arced slots similar to slots 450 of spacer 420 in which balls 188, 488 are situated. Spacer 620 further includes spokes similar to spokes 422 of spacer 420. Of course, the arced slots in spacer 620 that receive balls 488 have a larger radial width than the slots that receive balls 188.

In the illustrative example of FIG. 20, stepped PCB 182*a*" is embedded into the stepped race 184*a*" and PCB 184*b*" is embedded into stepped race 184*b*". The depth of the embedding is approximately equivalent to the thickness of the PCB's 182*a*", 182*b*". Circular conductive traces 186*a-f* are embedded into respective PCB's 182*a*", 182*b*" by an amount that is approximately equivalent to the thickness of conductive traces 186*a-f* as also shown in the embodiment of FIG. 20.

A step portion 590*a* of PCB 182*a*" is formed as a cylindrical wall that interconnects a first portion 592*a* of PCB 182*a*" with a second portion 594*a* of PCB 182*a*" in the illustrative embodiment of slip ring 580. Similarly step portion 590*b* of PCB 182*b*" is formed as a cylindrical wall that interconnects a first portion 592*b* of PCB 182*b*" with a second portion 594*b* of PCB 182*b*". The terms "upper" and "lower" are used with reference to the orientation of slip ring 580 in FIG. 19. In other embodiments, step portions 590*a*, 590*b* are formed as frustoconical walls that interconnects respective first and second portions 592*a*, 594*a* of PCB 182*a*" and respective first and second portions 592*b*, 594*b* of PCB 182*b*". Step portion 590*a* engages a cylindrical surface 593*a* of race 184*a*" and step portion 590*b* engages a cylindrical surface 593*b* of races 184*b*". In embodiments in which step portions 590*a*, 590*b* are frustoconical, respective surfaces 593*a*, 593*b* have complimentary frustoconical shapes.

Still referring to FIG. 20, connectors 194 coupled to races 184*a*", 184*b*" each have six contacts 530 and respective conductors 532 that electrically connect contacts 530 to respective circular, conductive traces 186*a-f*. The discussion above of connector 194, contacts 530, and conductors 532 and all of their variants in connection with slip ring 480 is equally applicable to slip ring 580 and the discussion is not repeated.

The use of balls 188, 488 (sometimes referred to as ball bearings rather than balls) in slip rings 180, 180', 480, 580 serves several functions. For example, in some embodiments, balls 188, 488 are plated with a hard metal, which is resistant to corrosion, and as is known in the art, corrosion is the enemy of efficient electrical conduction. Secondly, balls 188, 488 are very uniform in their dimensionality part-to-part, allowing for uniform current density across many points of contact, because of the uniformity of the mechanical dimensions of individual ball bearings 188, 488. As noted above, balls 188 have a diameter of about 0.125 inches, plus or minus manufacturing tolerances such as ±0.01 inch or ±0.001. Balls 488 are two to three times the size of balls 188 and so have a diameter on the order of 0.25 inches or 0.75 includes, plus or minus manufacturing tolerances, just to give a couple of examples.

The fact that the point of contact of balls 188 or balls 488, as the case may be, rolls across concentric circular conductors 186*a-f* on the top and bottom of the respective PCB's leads to a very low wear connection in contrast to the sliding contacts used by many prior art slip rings. When used with non-conductive lubricant, this yields an almost zero-wear contact. Non-conductive lubricant is used to avoid cross currents between conductive traces 186*a-f*. The current carrying capability of the conductors 532 increases as the radial distance from axis 92 increases because the number of contact points increases with each ring of conductors 186*a-f*, assuming the number of balls in each arced slot of the respective spacer 420, 520, 620 is maximized. For a given ball bearing size, the area of contact is fixed. Having more points of contact increases the effective contact area and reduces the contact resistance, because the individual contact resistances are in parallel, and thus lead to a lower presented contact resistance. This is useful when a mix of high and low current density signals are conducted across a rotating boundary.

The contacts 186*a-f* have low inductance due to multiple conducting paths through balls 188, 488 across the rotating barriers. The inductances are in series with each ball bearing point of contact being in parallel, leading to a low contact inductance, making this connection scheme suitable for high edge speed digital signaling such as controller area network (CAN) bus, Ethernet, or low-voltage differential signaling (LVDS). The present disclosure further contemplates that two adjacent conductors (e.g., traces 186*a-f* and/or balls 188, 488) could be spaced such that they have a controlled impedance at a given frequency or range of frequencies, allowing for impedance-controlled contacts suitable for radio frequency (RF) and high speed digital signaling where a controlled impedance is desirable such as universal serial bus (USB), LVDS and other RF signals.

The use of varying sizes of ball bearings and attendant conductor spacing allows for controlled impedances of varying values (e.g., about 50Ω, about 120Ω, etc) is also contemplated, which as shown in FIGS. 19 and 20 leads to a stepped arrangement of the PCB separation distances to account for differing ball bearing diameters to accommodate the track width and separation required to implement a particular characteristic impedance. Stitching vias can be utilized outside of the track of the ball bearings to maintain substantially continuous electrical continuity and low inductance between top and bottom conductors. Having the vias outside of the ball bearing contact area ensures that these connections do not wear over time.

Figure 21:
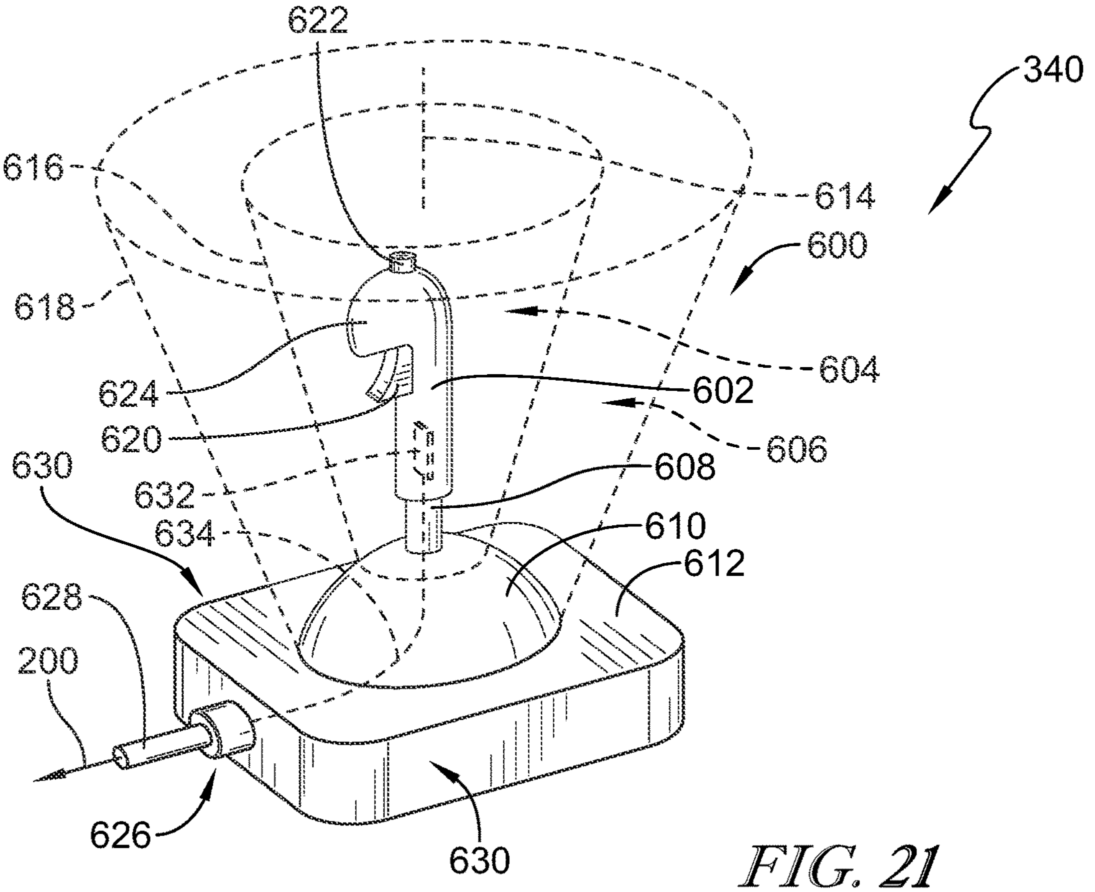
FIG. 21 is a perspective of a joystick usable to signal the power drive circuitry to orient and drive the dual-wheel motorized casters showing an inner frustoconical region (in phantom) that represents a dead band zone in which movement of a handle of the joystick orients the dual-wheel motorized casters relative to a longitudinal axis of a patient support apparatus, but without driving the wheels of the dual-wheel motorized casters, and showing an outer frustoconical region (in phantom) that represents a drive zone in which movement of the handle of the joystick results in motorized driving of the wheels of the dual-wheel motorized casters.

Referring now FIG. 21, in some embodiments, user input 340 comprises a joystick 600 that is movable to provide input command 200 to power drive circuitry 330 regarding propulsion of the patient support apparatus 20. Joystick 600 has a handle 602 that is movable into and through a dead band zone 604 (shown in phantom) to command power drive circuitry 330 to swivel dual-wheel motorized casters 30, 30', 130, as the case may be, into a drive orientation corresponding to drive direction 172 of patient support apparatus 20 without propelling patient support apparatus 20 in the drive direction 172. Patient support apparatus 20 may, however, shift slightly in position due to the offset between swivel axis 92 and the points or zones of contacts of wheels 31*a*, 31*b* with the floor, particularly in the case of caster 30.

Handle 602 of joystick 600 is also movable from dead band zone 604 into a drive zone 606 to command power drive circuitry 330 to propel patient support apparatus 20 in drive direction 172 via rotation of the first and second wheels 31*a*, 31*b* by the first and second motors 102*a*, 102*b*, respectively. Handle 602 is coupled to a shaft 608 of joystick 600 which, in turn, is coupled to a semi-spherical ball portion 610. Ball portion 610 is movably coupled to a base 612 of joystick 600. In alternative embodiments, ball portion 610 is omitted and a resilient boot, such as a corrugated rubber boot, is provided between shaft 608 and base 612 to accommodate the movement of handle 602 within zones 604, 606. In some embodiments, base 612 of joystick 600 is mounted to upper frame 28 of patient support apparatus 20 at the head end 52 thereof so that joystick 600 is located about midway between the sides of patient support apparatus 20. Suitable fasteners, such as bolts, clamps, straps, rivets, snaps, snap fingers, or the like, are provided to couple base 612 to upper frame 28 in this regard.

Figure 22:
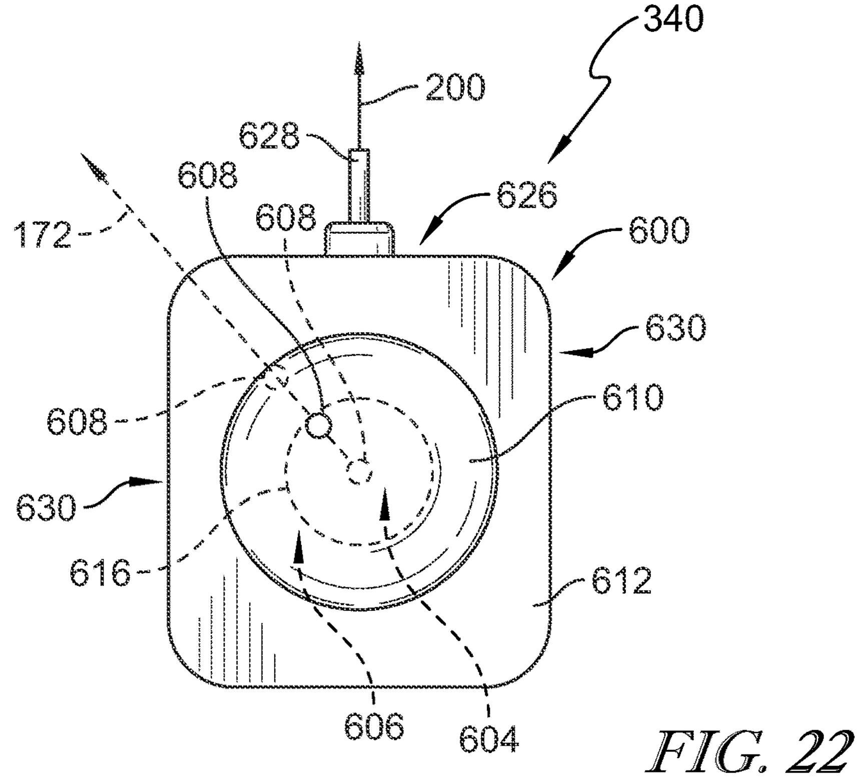
FIG. 22 is a top view of the joystick of FIG. 21 showing that the handle of the joystick has been moved in an arbitrary angular direction indicated by a dashed arrow so a joystick shaft is right at the edge of the dead band zone.

In the illustrative embodiment, shaft 608 is cylindrical in shape and together with handle 602 defines a joystick axis 614 that is oriented vertically when handle 602 is in a neutral position as shown in FIG. 21. Dead band zone 604 of joystick 600 corresponds to axis 614 being located anywhere within a first truncated cone 616 and drive zone 606 corresponds to axis 614 being located anywhere between the first truncated cone 616 and a larger, second truncated cone 618. When handle 602 is in the neutral position, truncated cones 616, 618 are concentric about axis 614. One or more suitable biasing members, such as springs, are provided in base 612 to bias handle 602 into the neutral position. Handle 602 and shaft 608 are movable within dead band zone 604 and drive zone 606 by 360 degrees but joystick 600 is configured such that handle 602 and shaft 608 are not rotatable about axis 614. In FIG. 22, handle 602 and shaft 608 have been moved in direction 172 to a position having shaft 608 right at the boundary between zones 604, 606 as defined by truncated cone 616. The term "frustoconical" is sometimes used to refer to the geometric shape of a truncated cone.

Joystick 600 includes a first user input 620 and a second user 622 that are each coupled to handle 602. In the illustrative example, first user input 620 comprises a trigger (sometimes referred to herein as "trigger 620") and second user input 622 comprises a push button (sometimes referred to herein as "button 622"). Trigger 620 is situated beneath an upper portion 624 of handle 602 and button 622 extends upwardly from upper portion 624 as shown in FIG. 21. Upper portion 624 is configured to overhang trigger 620 to protect trigger 620 from inadvertently being contacted by objects that may fall downwardly relative to joystick 600 or that otherwise may fall onto joystick 600 inadvertently.

Input 620 is a so-called "dead man" input that must be engaged by a user and squeezed from the illustrative outward position to an inward position relative to handle 602 in order for circuitry 330 to signal operation of motors 102*a*, 102*b* to swivel casters 30, 30', 130 in response to movement of handle 602 into dead band zone 604 and then, to rotationally drive wheels 31*a*, 31*b* to propel patient support apparatus 20 along the floor in response to handle 602 being moved into drive zone 606. That is, if trigger 620 is not moved to the inward position, then movement of handle 602 from the neutral position into either of zones 604, 606 is ignored by circuitry 330 and the respective dual-wheel motorized casters 30, 30', 130 remain stationary.

As noted above, handle 602 and shaft 608 are constrained from rotating about axis 614. In the illustrative embodiment, joystick 600 is configured so that trigger 620 extends away from handle 602 toward a front 626 of base 612 of joystick 600. Also in the illustrative embodiment, a cable 628 extends from the front 626 of base 612 and meets base 612 about midway between opposite sides 630 of base 612. Thus, when handle 602 is in the neutral position, trigger 620 extends towards the region at which cable 628 meets base 612. Wires or other suitable electrical conductors (not shown) extend from each of inputs 620, 622 through respective interior regions of handle 602, shaft 608, ball portion 610, and base 612 and are gathered into cable 628 to provide electrical signals that from part of input command 200 to circuitry 330.

The manner in which patient support apparatus 20 is propelled is dependent upon whether button 622 is in a first, extended position, as shown in FIG. 21, or in a second, depressed position (not shown) pushed downwardly relative to the top portion 624 of handle 602. Trigger 620 and button 622 are each spring biased, such as by a respective torsion spring, coil spring, or the like, into their respective extended positions shown in FIG. 21. Thus, a user must overcome the spring bias to move trigger 620 to the inward position and to move button 622 to the depressed position. For example, a user grasping handle 602 is able to move trigger 620 to the inward position with their forefinger and also to move button 622, if desired, to the depressed position with their thumb. In other embodiments, a rocker switch or slider is provided on top portion 624 of handle 602 in lieu of button 622.

Figure 23:
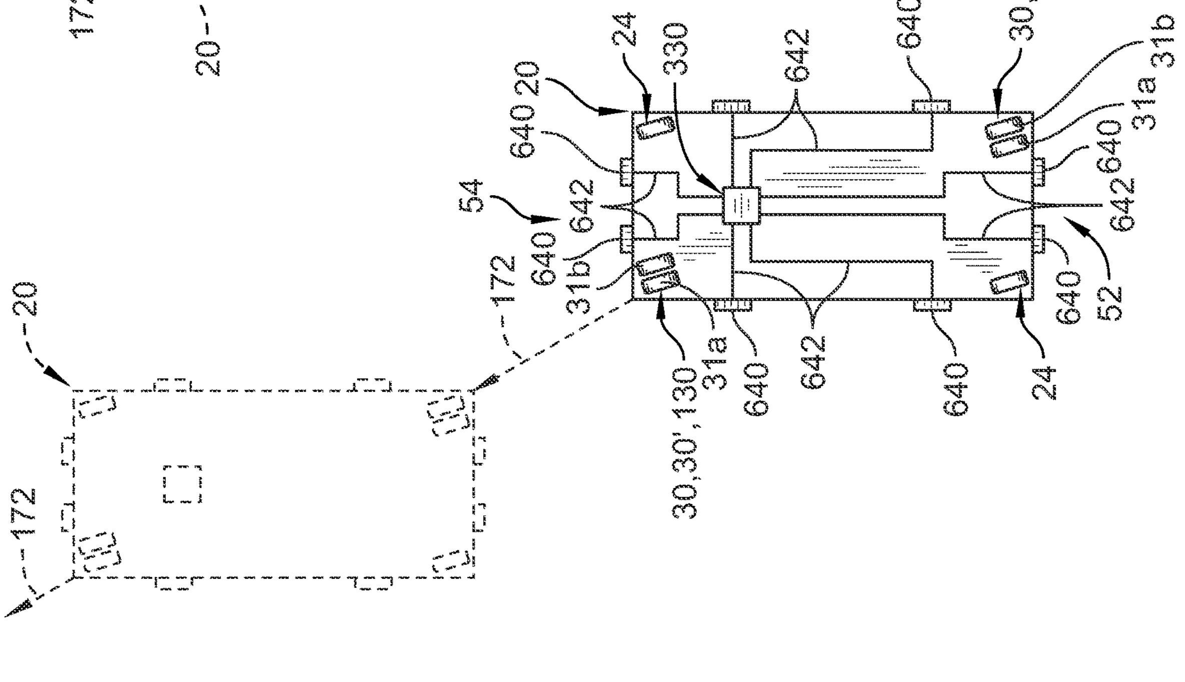
FIG. 23 is a diagrammatic view of the patient support apparatus having the joystick of FIGS. 21 and 22 showing the dual-wheel motorized casters oriented in a common direction so that the patient support apparatus is driven along a direction indicated by a dashed arrow from a first position (in solid) to a second position (in phantom) without turning.

In the illustrative example, when trigger 620 is moved to the inward position and the second user input 622 is depressed into the second position while handle 602 is moved in drive direction 172 so as to be angled with respect to a longitudinal dimension (i.e., the dimension of patient support apparatus 20 parallel with longitudinal axis 166) of the patient support apparatus 20 as shown in FIG. 22, the patient support apparatus 20 is propelled in a manner that maintains the initial orientation of the patient support apparatus 20 while the patient support apparatus 20 is being propelled in the drive direction 172 as shown in FIG. 23. In particular, the orientation of patient support apparatus 20 is maintained such that the longitudinal orientation of patient support apparatus 20 in a starting position, shown in FIG. 23 (in solid), is parallel with the longitudinal orientation of patient support apparatus at an arbitrary second position, shown in FIG. 23 (in phantom) as patient support apparatus 20 is propelled in drive direction 172. It will be appreciated that patient support apparatus 20 is propelled sideways, without turning, if trigger 620 is squeezed and button 622 is depressed while handle 602 is moved laterally toward one or the other of sides 630 of base 612 of joystick 600 at an angle of 90 degrees to longitudinal axis 166 of patient support apparatus 20.

Figure 24:
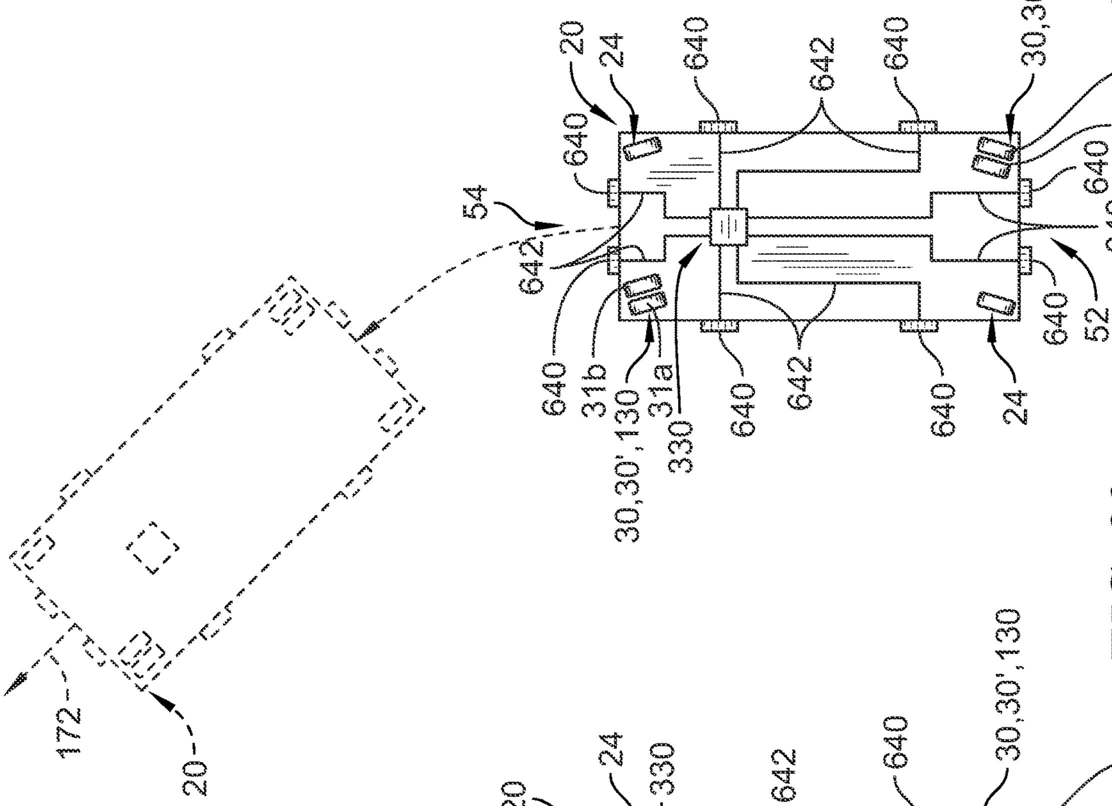
FIG. 24 is a diagrammatic view of the patient support apparatus having the joystick of FIGS. 21 and 22 showing the dual-wheel motorized casters initially oriented in different directions so that the patient support apparatus is driven along a direction indicated by a curved dashed arrow from a first position (in solid) to a second position (in phantom) while turning.

On the other hand, when trigger 620 is squeezed and button 622 is in the first, extended position as shown in FIG. 21 while handle 602 is moved in the drive direction 172 so as to be angled with respect to a longitudinal dimension of the patient support apparatus 20 as shown in FIG. 22, the patient support apparatus 20 is propelled in a manner that turns the patient support apparatus 20 from an initial orientation shown in FIG. 24 (in solid) into an orientation having the longitudinal dimension of the patient support apparatus parallel with the drive direction 172 as shown in FIG. 24 (in phantom). It should be appreciated, therefore, that when button 622 is pressed, patient support apparatus 20 is propelled in the drive direction 172 without the occurrence of any yaw, and when button 622 is not pressed, patient support apparatus 20 yaws into the orientation having its long dimension and longitudinal axis 166 parallel with the drive direction 172. It should be appreciated that as patient support apparatus 20 turns in the manner depicted in FIG. 24, the user will actively bring handle 602 of joystick into a position aligned with the longitudinal dimension of patient support apparatus 20 as patient support apparatus 20 turns into the desired drive direction 172.

Depending upon whether button 622 is depressed when handle 602 is moved within dead band zone 604 also has a bearing on the initial orientation of the pair of dual-wheel motorized casters 30, 30' 130 prior to the driving of the respective casters 30, 30', 130. For example, in FIG. 23 which corresponds to button 622 being depressed, the pair of dual-wheel motorized casters 30, 30', 130 at the diagonal corner regions of base frame 22 of patient support apparatus 20 are swiveled so as to be oriented in a common direction such that both dual-wheel motorized casters 30, 30', 130 drive the respective wheels 31*a*, 31*b* to propel the patient support apparatus 20 in the drive direction 172 without yawing.

On the other hand, in FIG. 24 which corresponds to button 622 being in the first, extended position (i.e., not depressed), the dual-wheel motorized caster 30, 30', 130 at the foot end 54 of base frame 22 of patient support apparatus 20 is swiveled into an orientation such that respective wheels 31*a*, 31*b*, are driven in the drive direction 172 and the dual-wheel motorized caster 30, 30', 130 at the head end 52 of base frame 22 of patient support apparatus 20 is swiveled into an orientation such that respective wheels 31*a*, 31*b*, are driven in another direction, such as a direction that is a mirror image of drive direction 172 about the longitudinal axis 166 of patient support apparatus 20, for example. That is, the dual-wheel motorized wheels 30, 30', 130 are swiveled into different drive directions when button 622 is not depressed and handle 602 is moved within dead band zone 604 so that, after handle 602 is moved into drive zone 606, patient support apparatus 20 yaws while being driven so as turn towards the drive direction 172. Another example of such an arrangement of dual-wheel motorized casters 30, 30', 130 being oriented in different drive directions to produce yaw of patient support apparatus 20 when propelled is shown in FIG. 12 with regard to $\theta_1$ and $\theta_2$ as discussed above in connection with casters 30.

In some embodiments, a speed at which patient support apparatus 20 is driven is dependent upon how far into drive zone 606 handle 602 of joystick 600 is moved. The further into drive zone 606 that handle 602 is moved away from the neutral position, the faster the speed at which patient support apparatus 20 is driven. Thus, joystick 600 may be considered to be a 3-dimensional (3D) joystick having an X-component, a Y-component, and a magnitude component. The X-component of joystick 600 corresponds to movement of handle 602 in the fore-to-aft direction, the Y-component of joystick 600 corresponds to movement of handle 602 in the side-to-side direction, and the magnitude component corresponds to how far handle 602 is moved away from the neutral position or, alternatively, how far handle 602 is moved in the drive direction into drive zone 606.

Referring again to FIG. 21, illustrative joystick 600 further includes an accelerometer 632, such as a two-axis accelerometer or three-axis accelerometer, that produces an acceleration signal on one or more conductors 634 that are included in cable 628 and that form part of input signal 200 to power drive circuitry 330. The acceleration signal from accelerometer 632 is used to determine an acceleration profile that, in turn, determines the manner in which wheels 31*a*, 31*b* of dual-wheel motorized casters 30, 30', 130 are rotationally accelerated thereby determining the manner in which patient support apparatus 20 is accelerated at the beginning of being propelled and is decelerated at the end of being propelled, as well as determining the manner in which a speed of patient support apparatus 20 may be changed while being propelled.

The accelerometer signal from accelerometer 632 is also used by the power drive circuitry 330 to determine how quickly handle 602 of joystick 600 is moved within the dead band zone 604 to determine how quickly to swivel the dual-wheel motorized casters 30, 30' 130 of patient support apparatus 20. Power drive circuitry 330 then determines which acceleration profile to implement based on how quickly handle 602 of joystick 600 is moved within drive zone 606 after handle 602 exits the dead band zone. Furthermore, a speed at which patient support apparatus 20 is propelled is determined by power drive circuitry 330 based on how far into drive zone 606 handle 602 is moved.

In some embodiments, power drive circuitry 330 implements an exponential acceleration profile for propelling the patient support apparatus 20 upon initial propulsion of the patient support apparatus 20 in response to handle 602 of joystick 600 being moved into drive zone 606. Different exponential curves may be implemented by circuitry 330 to accelerate patient support apparatus 20 more gradually or more suddenly depending upon the acceleration signal received from accelerometer 632. Alternatively or additionally, a linear acceleration profile or asymptotic acceleration profile may be implemented by circuitry 330 as dictated by the acceleration signal from accelerometer 632. Circuitry 330 may implement a hybrid acceleration profile (e.g., first exponential, then linear, then asymptotic) in some embodiments depending upon the acceleration signal from accelerometer 632. These and other acceleration profiles are at the discretion of the system designer.

When patient support apparatus 20 is to be brought to a stop after being propelled, power drive circuitry 330 implements a linear deceleration profile in some embodiments in response to handle 602 of joystick 600 being moved into the neutral position within the dead band zone 604. The slope of the linear deceleration profile is dictated by the acceleration signal, or perhaps in this circumstance more accurately referred to as a deceleration signal, from accelerometer 632. Alternatively or additionally, the deceleration profile may include an exponential decay profile and/or an asymptotic decay profile, again at the discretion of the system designer.

In some embodiments, after being propelled and coming to a stop, the dual-wheel motorized casters 30, 30', 130 of the patient support apparatus 20 are left in the drive orientation that existed while patient support apparatus 20 was being propelled. In other embodiments, after being propelled and coming to a stop, the dual-wheel motorized casters 30, 30', 130 of patient support apparatus 20 are controlled by power drive circuitry 330 to swivel into a rest orientation having the drive direction 172 oriented parallel with the longitudinal dimension of patient support apparatus 20 so as to be parallel with longitudinal axis 166.

Based on the foregoing, therefore, one possible user input device 340 for an electronically steerable patient support apparatus 20 is a 3D joystick 600. The present disclosure details a unique way to utilize this input device 340 to allow the setting of the initial direction 172 of patient support apparatus 20 without causing any linear motion before the driven casters 30, 30' 130, as the case may be, are properly aligned. The joystick 600 can be used to input an X component for the direction, a Y component for the direction, and a magnitude for the speed, hence a complete 3D input vector for the patient support apparatus direction 172 and speed. The present disclosure contemplates the setting of the direction of the patient support apparatus 20 without causing any motion thereof (except for possibly a slight amount of shifting due to caster swiveling as mentioned above) until the driven casters 30, 30', 130 are aligned in the proper direction to drive the patient support apparatus 20 in the commanded direction 172. In the illustrative joystick 600, a dead band zone 604 is implemented whereby if the joystick handle 602 is moved from the neutral position, but kept below a predefined threshold of displacement, the control system 330 will only align the driven casters 30, 30', 130 based on the direction 172 input by the user (and depending upon whether or not button 622 is pressed as discussed above).

Once a non-neutral input is provided by a user with joystick 600, this input can be processed in several ways. The direction of travel 172 for the patient support apparatus 20 can be set by properly aligning the casters 30, 30', 130 using differential movement of the casters 30, 30', 130, as described above, and then motion can commence when the handle 602 of joystick 600 is moved into zone 606 beyond dead band zone 604. Thus, the input command 200 from joystick 600 is used first to set the caster direction, and then seamlessly accelerate in the direction 172 commanded by the user to the velocity commanded. Likewise, if the user de-asserts the input command 200, and the joystick 600 returns to the neutral position, the patient support apparatus 20 can be brought to a stop in the commanded direction in a controlled manner such as a linear deceleration as indicated by one or more MEMS accelerometers 202 in the control system 330. Then, casters 30, 30' 130 can either be left in the direction they were last pointed or the casters 30, 30', 130 can be swiveled to point toward head end 52, if they are not pointed in that direction already, in preparation for the next move command.

As also discussed above, the way the patient support apparatus 20 is accelerated or decelerated can be controlled by software stored in memory 334 of power drive circuitry 330. A linear profile can be utilized for deceleration, while theoretically at least an exponential profile can be employed on acceleration, allowing for a slower start with quicker acceleration once the patient support apparatus 20 starts moving. Additionally, the rate of change of the joystick input can be used to indicate how the patient support apparatus 20 should accelerate. A quick, large input indicates a quicker, more energetic acceleration, while a slower, lower amplitude input causes a much more gentle acceleration. Likewise, a panic, maximum effort braking scenario can be implemented if the user lets go of the handle 602 of joystick 600 and lets it return to zero (e.g., the neutral position) under spring tension, which is recognized as an emergency stop command or dead man safety command as a result of trigger 620 being released when the user lets go of handle 602.

Referring once again to FIGS. 23 and 24, illustrative patient support apparatus 20 includes a plurality of collision avoidance sensors 640 that are coupled to upper frame 28 and/or base frame 22 and that are operable to provide respective obstacle detect sensor signals to power drive circuitry 330 on one or more corresponding conductors 642 such as wires or cables. Power drive circuitry 330 uses the obstacle detect sensor signals to cease propulsion of patient support apparatus 20 or to swivel dual-wheel motorized casters 30, 30', 130 so as to steer patient support apparatus 20 in a manner that avoids or minimizes a collision with a detected obstacle. In the illustrative example, there are two collision avoidance sensors 640 at each of the head end 52, foot end 54, and sides of patient support apparatus 20.

In other embodiments, one or more of the ends 52, 54 and sides of patient support apparatus 20 have only a single collision avoidance sensor 640 mounted thereto. In still other embodiments, one or more of the ends 52, 54 and sides of patient support apparatus 20 have more than two collision avoidance sensors 640 mounted thereto. In further embodiments, collision avoidance sensors may be mounted at corner regions of upper frame 28 and/or base frame 22 and face generally diagonally away from patient support apparatus 20. It is also contemplated that collision avoidance sensors 640 are mounted to both upper frame 28 and base frame 22 in some embodiments. In other words, the number and location of collision avoidance sensors 640 is at the discretion of the designer of patient support apparatus 20.

The present disclosure contemplates that each collision avoidance sensor 640 may operate according to one or more of the following sensor technologies: radio detection and ranging (RADAR), light detection and ranging (LiDAR), video, forward looking infrared RADAR (FLIR), and ultrasound. All of sensors 640 of patient support apparatus 20 operate according to the same technology in some embodiments (e.g., all sensors 640 are RADAR sensors or all sensors 640 are LiDAR sensors, etc.). In other embodiments, different sensors 640 of patient support apparatus operate according to different technologies. In such embodiments therefore, a first one of collision avoidance sensors 640 operates according to one of RADAR, LiDAR, video, forward looking infrared RADAR (FLIR), or ultrasound, and a second one of collision avoidance sensors 640 operates according to another of RADAR, LiDAR, video, forward looking infrared RADAR (FLIR), and ultrasound.

The present disclosure further contemplates that, in some embodiments, power drive circuitry 330 of patient support apparatus 20 is configured to communicate with other patient support apparatuses 20 to implement cooperative behavior between the patient support apparatuses 20 for purposes of collision avoidance. Thus, it is within the scope of the present disclosure for the cooperative behavior to comprise swarm behavior among three or more patient support apparatuses 20. In some embodiments, patient support apparatus 20 includes a beacon emitter (e.g., integrated into one or more of sensors 640) coupled to the upper frame 28 or base frame 22, for example, and operable to emit a beacon during emergency transport resulting in the patient support apparatus 20 emitting the beacon being given higher priority in the cooperative behavior over other patient support apparatuses 20.

In some embodiments, circuitry 330 of patient support apparatus 20 is configured to implement cooperative behavior during propulsion based on messages received from a high accuracy real time locating system (RTLS). For example, a locating tag may be carried by frame 22, 28 of patient support apparatus 20 and may be in communication with the high accuracy RTLS to provide locating signals to the RTLS which are used by the RTLS to determine a location of patient support apparatus 20 relative to other patient support apparatuses 20 and relative to other obstacles in a healthcare facility. Thus, the other patient support apparatuses 20 also have respective locating tags coupled thereto for location tracking purposes. The obstacles, if mobile, further may have such locating tags coupled thereto also for tracking purposes. Stationary obstacles, such as walls, kiosks, columns, counter tops, and the like, are modeled in the RTLS (e.g., in an RTLS computer such as a server) in some embodiments. The locating tags and the RTLS communicate using ultra wideband (UWB) technology in some embodiments. That is, UWB technology is a suitable technology for implementing a high accuracy RTLS to determine locations of tagged assets within two feet or less (e.g., within one foot) of an actual location. Further details of various embodiments of a high accuracy RTLS implementing UWB technology can be found, for example, in U.S. Patent Application Publication No. 2021/0065885 A1 which is hereby incorporated by reference herein for all that it teaches to the extent not inconsistent with the present disclosure which shall control as to any inconsistencies.

While the discussion herein above assumes that a caregiver or other staff member uses input 340 to cause propulsion of patient support apparatus 20 while manually interacting with the user input and possibly holding onto some other portion of the patient support apparatus 20, such as one of push handles 64, the present disclosure also contemplates that the one or more dual-wheel motorized casters 30, 30' 130 of patient support apparatus 20, in cooperation with power drive circuitry 330, is configured to operate in an autonomous mode to propel patient support apparatus 20 in an autonomous manner without any user input from a human operator. Of course, patient support apparatus 20 is also configured to operate in a manual mode in which patient support apparatus 20 is propelled based on user input from a human operator.

The present disclosure further contemplates a semi-autonomous mode in which patient support apparatus 20 is propelled by casters 30, 30', 130 under the control of circuitry 330 only when an authorized human attendant is situated within a threshold distance (e.g., three or four feet just to give a couple of arbitrary examples) of the patient support apparatus 20, but without the attendant manually engaging any portion of the patient support apparatus 20. The high accuracy RTLS discussed above may determine whether an authorized human attendant is within the threshold distance of the patient support apparatus 20, for example, so that operation in the semi-autonomous mode is permitted. Thus, in the semi-autonomous mode, patient support apparatus 20 may be propelled while the authorized human attendant walks alongside the patient support apparatus, including in front of, or behind, apparatus 20 without physically contacting any portion of apparatus 20.

The present disclosure further contemplates embodiments in which power drive circuitry 330 of patient support apparatus 20 and/or other circuitry of patient support apparatus 20 is configured to issue an alert if an emergency condition is detected while patient support apparatus is operating in the autonomous mode. For example, the alert may be wirelessly received by a remote computer and forwarded to a wireless communication device of an authorized caregiver that, when the emergency condition occurs, is closest to the patient support apparatus as determined by a locating system, such as the RTLS discussed above, that is configured to determine caregiver locations.

Still further, the present disclosure contemplates that, when the patient support apparatus 20 is being propelled while operating in the autonomous mode, the propulsion means (e.g., circuitry 330 and one or more of dual-wheel motorized casters 30, 30', 130) is controlled by a remote server that operates as an adaptive rules of the road (RotR) device to monitor traffic conditions and emergency conditions of multiple patient support apparatuses 20, each operating in a respective autonomous mode, semi-autonomous mode, or manual mode, thereby to achieve avoidance of collisions between the multiple patient support apparatuses 20.

Based on the foregoing, therefore, with regard to control of patient support apparatus 20 in the semi-autonomous or autonomous modes of propulsion, sensing of the environment around the patient support apparatus 20 is needed. The present disclosure contemplates various technologies and methods to enable autonomous and/or semi-autonomous patient support apparatus motion. Such technologies and methods optionally include one or more of the following aspects: sensing of exogenous objects/quantities, communications, data fusion, inference extraction from fused data and exogenous sensors (e.g., collision avoidance sensors 640 and/or locating tags), and adaptive Rules of the Road (RotR) to make actions as deterministic as possible.

Automotive RADAR used for collision avoidance is becoming more pervasive and the present disclosure contemplates that sensors 640 of patient support apparatus 20, in combination with circuitry 330, employs such technology in some embodiments. In such embodiments, RADAR technology and infrastructure is leveraged in a care environment to detect and avoid collisions with other objects and people. Alternatively or additionally, the use of LiDAR, similar to RADAR, can be utilized in connection with sensors 640 to detect and avoid obstacles. The present disclosure also contemplates that one or more of sensors 640 may use one or more low cost video cameras, including IR sensitive cameras, to detect, categorize, and avoid people and objects in the path of semi-autonomous and autonomous driven patient support apparatuses 20. Still further, the present disclosure contemplates that one or more of sensors 640 may use a cooled detection element Forward Looking Infrared RADAR (FLIR) to allow more detailed detection and categorization of obstacles, e.g. is the object a person, or a fixed or mobile inanimate object? A FLIR detector may also be used to detect people hidden by other objects but still visible in the IR spectrum, for example.

A connected patient support apparatus 20 can utilize its physical position to access a database including coordinates of known obstacles such as nurse's stations, elevators, walls, etc. This location can be provided in real time to allow basic navigation (moving down hallways, etc) to aid self-driving fused with data from onboard exogenous sensors 640 in some embodiments. Sensors 640 configured as ultrasonic transducers represent another approach for detecting motion of objects in the field of motion of patient support apparatus 20.

The present disclosure also contemplates, Bed-to-Bed (B2B) and swarm behavior based on short haul fast communication links. For example, automotive RADAR anti-collision systems support the fast detection of other similarly equipped vehicles to enable cooperative behavior to avoid collision situations by telegraphing one vehicle's intentions to another vehicle to better facilitate anti-collision activities. Such technology may be implemented in patient support apparatuses 20 according to the present disclosure. The logical extension of this concept is to establish a dynamic cooperative swarm of connected devices, including patient support apparatuses 20, which work collaboratively to achieve individual goals (moving the patient support apparatus 20 to a commanded or preprogrammed location) while avoiding collisions and deadlock conditions, such as an autonomous traffic jam, where the devices get into a condition where it becomes impossible to move in the indicated direction due to physical configurations. Early sensing and knowledge of what each apparatus 20 in the swarm is trying to achieve enables dynamic route modification to ensure that such deadlock conditions do not occur, as well as preventing or avoiding physical collisions.

Short haul communication links such as UWB links assist in this process in some embodiments. Programming autonomous patient support apparatuses 20 with the ability to self-associate and share data on the fly regarding the apparatuses' intentions within the care environment, along with a system assigned priority (e.g. emergency requests are prioritized and executed first cooperatively by all apparatuses 20 in a space, for instance) to speed traffic along and minimize transit time and ensure that the highest priority traffic gets through first. This approach can also be used in connection with patient support apparatuses 20 being driven by a human operator. For example, a beacon emitted during an emergency transport run being executed by humans can be given priority over all autonomous operations and cause the autonomous or semi-autonomous apparatuses 20 to yield to the emergency transport or other system defined high priority transport.

In connection with inference extraction and by using an artificial intelligence (AI) like program, inferences can be determined by circuitry 330 or by a remote computer in communication with circuitry 330 regarding what is likely to happen within varying timespans in the future to guide or prevent actions by an autonomous or semi-autonomously driven patient support apparatus 20 to prevent poor outcomes or increase the probability that the time of service or transit will be more deterministic than otherwise would be possible. Alternatively or additionally, self-consistent and adaptive Rules of the Road (RotR) implemented by circuitry 330 or by a remote computer in communication with circuitry 330 can be updated as needed depending on traffic conditions and emergency conditions to enable predictable, optimal interactions between autonomous and manually driven patient support apparatuses 20 based on many exogenous factors, all monitored or administered by a central control system whose responsibility it is to oversee the high level interaction of all of the driven patient support apparatuses 20 in a care ecosystem. With location tracking for physicians, nurses, and patient support apparatuses 20, if there is an emergency that occurs while patient support apparatus 20 is in transit, the closest physician(s) and/or nurse(s) can be alerted, thereby to minimize emergency response time.

Figure 25A:
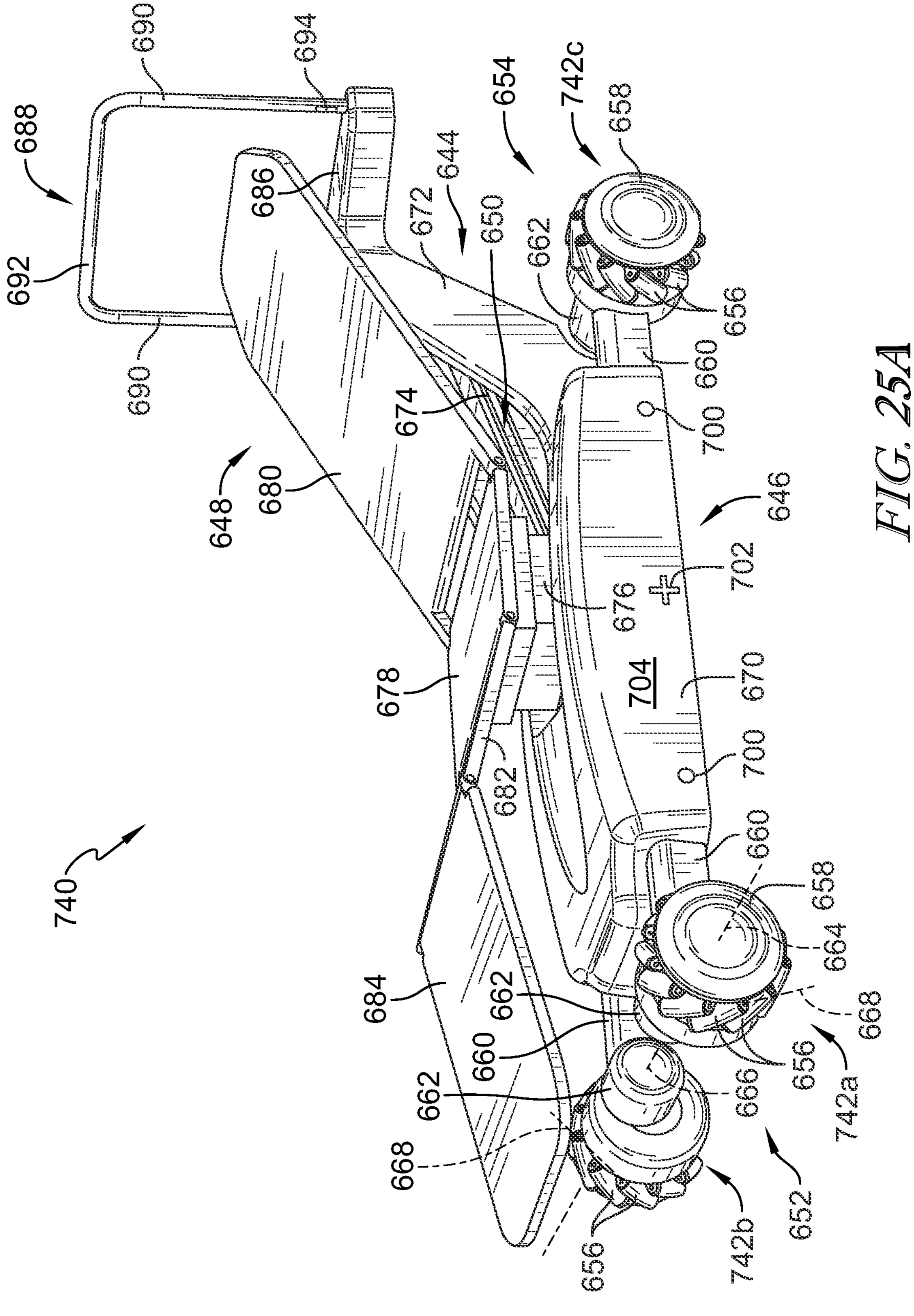
FIG. 25A is an isometric view of a portion of a patient support apparatus having motor-driven mecanum wheels at head end and foot end regions of a base of the patient support apparatus, each motor-driven mecanum wheel having a set of diagonal rollers arranged circumferentially around a hub of the respective mecanum wheel.

Referring now to FIG. 25A, a portion of a patient support apparatus 740 is shown having four motor-driven mecanum wheels 742*a*, 742*b*, 742*c*, 742*d* (see FIGS. 28A-F for mecanum wheel 742*d*). For discussion purposes, mecanum wheel 742*a* is sometimes referred to as first mecanum wheel 742*a*, mecanum wheel 742*b* is referred to as second mecanum wheel 742*b*, mecanum wheel 742*c* is referred to as third mecanum wheel 742*c*, and mecanum wheel 742*d* is referred to as fourth mecanum wheel 742*d*. Mecanum wheels 742*a*, 742*b*, 742*c*, 742*d* are sometimes referred to as "omni-directional wheels" because, even though they do not swivel like casters, the devices to which they are mounted are able to be propelled by the motor-driven wheels in any desired direction in an X-Y plane, such as a plane defined by an underlying floor for example. This is not to imply that devices, such as patient support apparatus 740, with such omni-directional wheels (e.g., mecanum wheels 742*a*, 742*b*, 742*c*, 742*d*) cannot be propelled up and down ramps such as those encountered in a building or over irregular floor surfaces having depressions or protrusions like door jambs.

Illustrative patient support apparatus 740 is embodied as a stretcher that includes a frame 644 which, in turn, includes a base frame 646, an upper frame 648, and a lift 650 supporting upper frame 648 above base frame 648. First and second mecanum wheels 742*a*, 742*b* are located at a foot end region 652 of base frame 646 and third and fourth mecanum wheels 742*c*, 742*d* are located at a head end region 654 of base frame 646. Each motor-driven mecanum wheel 742*a*, 742*b*, 742*c*, 742*d* has a set of diagonal rollers 656 arranged circumferentially around a hub 658 of the respective mecanum wheel 742*a*, 742*b*, 742*c*, 742*d*. In the illustrative embodiment, each roller 656 of the plurality of rollers 656 of each of the first, second, third, and fourth mecanum wheels 742*a*, 742*b*, 742*c*, 742*d* is crowned. That is, each roller 656 has a diameter at its center that is larger than diameters at the opposite ends of the particular roller 656 (e.g., 32 mm diameter at the center and 20 mm diameter at the ends) such that each roller 656 curve smoothly along its length. The slight curvature of the outer surface of each roller 656 when viewed in cross section through its length may be defined by a segment of an ellipse, for example.

Figure 25B:
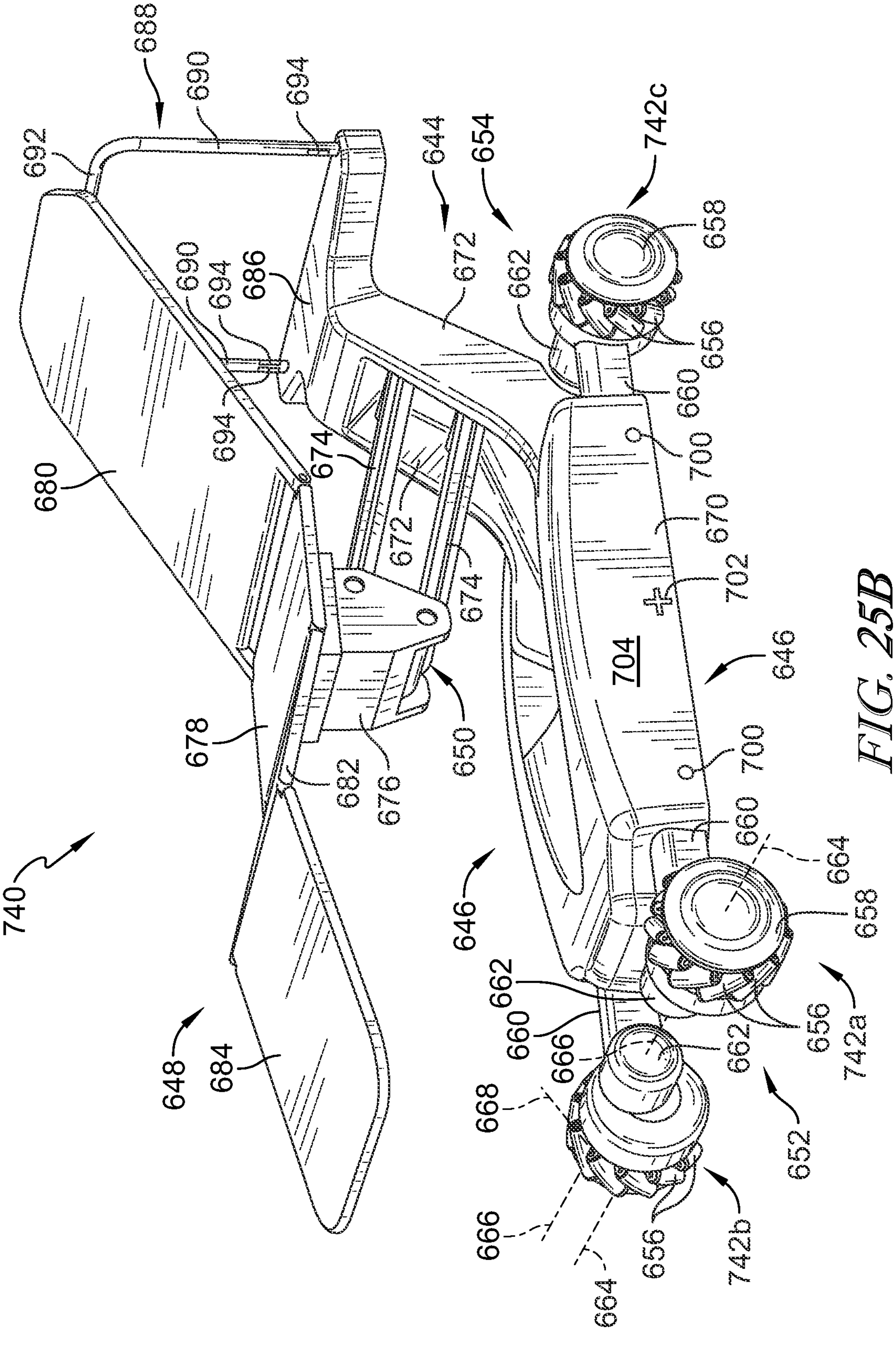
FIG. 25B is an isometric view, similar to FIG. 25A, showing an upper frame of the patient support apparatus raised upwardly to a raised position from a lowered position, shown FIG. 25A, by a lift having a parallelogram linkage arrangement.

Base frame 646 includes a pair of spaced apart, longitudinally extending frame members 660 to which mecanum wheels 742*a*, 742*b*, 742*c*, 742*d* mount. In particular, mecanum wheels 742*a*, 742*b* mount to foot end regions of frame members 660 and mecanum wheels 742*c*, 742*d* mount to head end regions of frame members 660 as shown in FIGS. 25A and 25B. Each of mecanum wheels 742*a*, 742*b*, 742*c*, 742*d* includes a motor 662 that is operable to rotate hubs 658 about a respective hub axis 664, only one of which is shown in FIG. 25A. Motors 662 are cylindrical motors in the illustrative example and their rotors rotate about a respective motor axis 666 which is offset from the corresponding hub axis 664. Thus, a transmission (e.g., a set of gears) is provided within mecanum wheels 742*a*, 742*b*, 742*c*, 742*d* to transfer motion from the rotor of motors 662 to hubs 658.

Each diagonal roller 656 is freely rotatable relative to the respective hub 658 about a respective roller axis 668 that is neither perpendicular to, nor parallel with, either of axes 664, 666. For example, if a hypothetical vertical plane were to be defined through hub axis 658 for any given mecanum wheel 742*a*, 742*b*, 742*c*, 742*d*, then, in the illustrative embodiment, the axis 668 of each diagonal roller 656 would intersect that hypothetical vertical plane at a 45° angle. However, in other embodiments such intersection angles may be some other number that is greater than or less than 45°. The orientations of some of diagonal rollers 656 are shown diagrammatically in FIGS. 28A-F and it should be understood that the hypothetical vertical planes in FIGS.

28A-F will be perpendicular to the plane of the paper, but still through the respective hub axis 658.

Referring again to FIG. 25A, a shroud 670 is mounted to base frame 646 and covers frame members 660 over a majority of their longitudinal length. However, the foot end regions and head end regions of frame members 660 extend beyond shroud 670 so that mecanum wheels 742*a*, 742*b*, 742*c*, 742*d* are able to mount to frame members 660 without interference from shroud 670. The portion of base frame 646 beneath shroud 670 is considered to be a main portion of the base frame 646. The shroud 670 and base frame 646 together may be referred to as a base of patient support apparatus 740.

In some embodiments, base frame 646 includes additional frame members (not shown) that are located beneath shroud 670 and that extend in a lateral dimension of patient support apparatus 740 between frame members 660. As shown best in FIG. 25B, base frame 646 further includes a pair of angled uprights 672 extending upwardly relative to frame members 660 and shroud 670. Angled uprights 672 have one end of parallelogram arms 674 of lift 650 coupled thereto for pivoting movement. The other end of each parallelogram arm 674 is pivotably coupled to a bracket 676 that extends downwardly from a seat section 678 of upper frame 648. In the illustrative example, upper frame 648 also includes a back section 680 pivotably coupled to a head end of seat section 678, a thigh section 682 pivotably coupled to a foot end of seat section 678, and a foot section 684 pivotably coupled to a foot end of thigh section 682.

Arms 674 are coupled to angled uprights 672 and bracket 676 so as to form a parallelogram linkage arrangement of lift 650. Patient support apparatus 740 includes an actuator (not shown, but substantially similar to actuator 28 discussed above in connection with FIG. 2) to pivotably raise and lower arms 674 relative to angled uprights 672 thereby to lift bracket 676 and upper frame 648 relative to base frame 646. As is known in the art, one or more actuators (not shown) such as electric linear actuators, hydraulic cylinders, locking gas springs, or the like are included in patient support apparatus 740 for pivotably articulating one or more of sections 678, 680, 682, 684 relative to one another.

Still referring to FIGS. 25A and 25B, base frame 646 includes a handle platform 686 coupled to upper ends of angled uprights 672. Platform 686 extends generally in the lateral dimension (e.g., side-to-side) of the patient support apparatus 740 with end regions of platform 686 extending laterally beyond the pair of angled uprights 672. A U-shaped push handle 688 is coupled to platform 686 and is grasped by a user, such as a caregiver or transporter, who is maneuvering patient support apparatus 740 along an underlying floor. Handle 688 includes a pair of generally vertical portions 690 each extending upwardly from a respective end region of platform 686 and a generally horizontal portion 692 that interconnects upper ends of vertical portions 690.

Handle 688 includes electronic sensors 694 that sense the manner in which force is applied to handle 688 by the user. For example, in the illustrative embodiment, sensors 694 include a pair of strain gages mounted to lower ends of portions 690 of handle 688 and spaced by about 90° around the circumference or cross-sectional perimeter of portions 690. Thus, the pairs of strain gages 694 are able to sense forces applied to handle 688 in a fore-to-aft direction and in a side-to-side direction. Based on signals from the sensors 694, a controller of patient support apparatus 740 which is similar to controller 332 described above in connection with FIG. 15 or microcontroller 374 described above in connection with FIGS. 16A and 16B, determine the manner in which motors 662 of mecanum wheels 742*a*, 742*b*, 742*c*, 742*d* are to be operated to propel the patient support apparatus 740 along the floor as will be described in further detail below in connection with FIGS. 28A-F. Thus, patient support apparatus includes circuitry similar to circuitry 330 described above for powering motors 662.

In alternative embodiments, patient support apparatus 740 may include one or more joysticks, similar to joystick 600 described above in connection with FIGS. 21 and 22, for providing signals that are used by the circuitry and controller of patient support apparatus 740 to control the propulsion of patient support apparatus along the floor. Such one or more joysticks may be used in addition to, or in lieu of push handle 688 with electronic sensors 694, such as strain gages. In still other embodiments, buttons such as membrane switches may be used as electronic sensors that receive manual selection from the user to indicate the manner in which patient support apparatus 740 is to be propelled by mecanum wheels 742*a*, 742*b*, 742*c*, 742*d*. See the six double arrows in FIGS. 28A-F in the center area of the diagrammatic base frames 646 for examples of the types of indicia that such buttons may have thereon or adjacent thereto. Buttons having arrows in opposite directions (e.g., rearward instead of forward, left instead of right, etc.) are also contemplated.

Figure 26A:
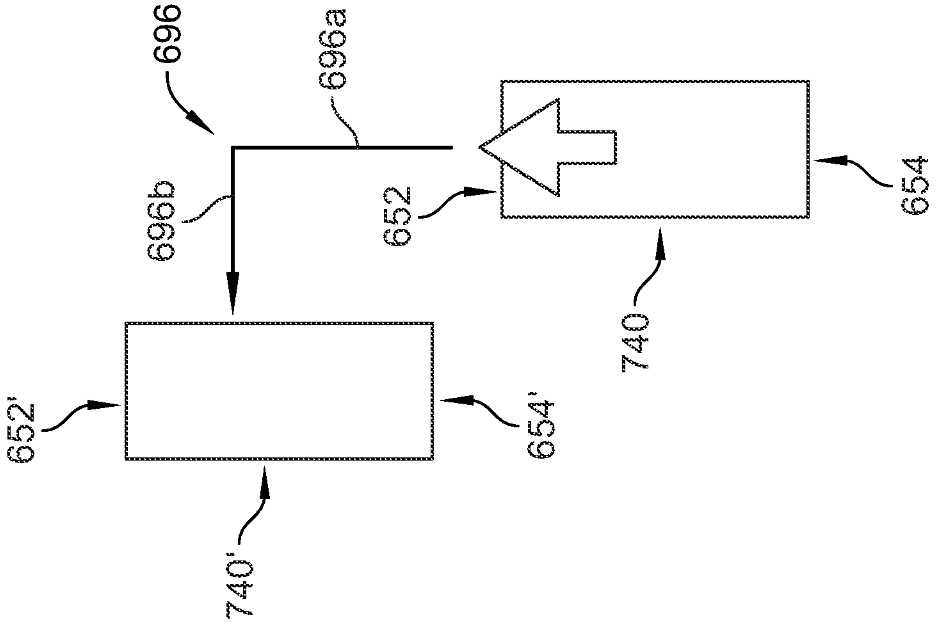
FIG. 26A is a diagrammatic view showing the patient support apparatus of FIG. 25 following a right angle path to move into side-by-side relation with a second patient support apparatus.
Figure 26B:
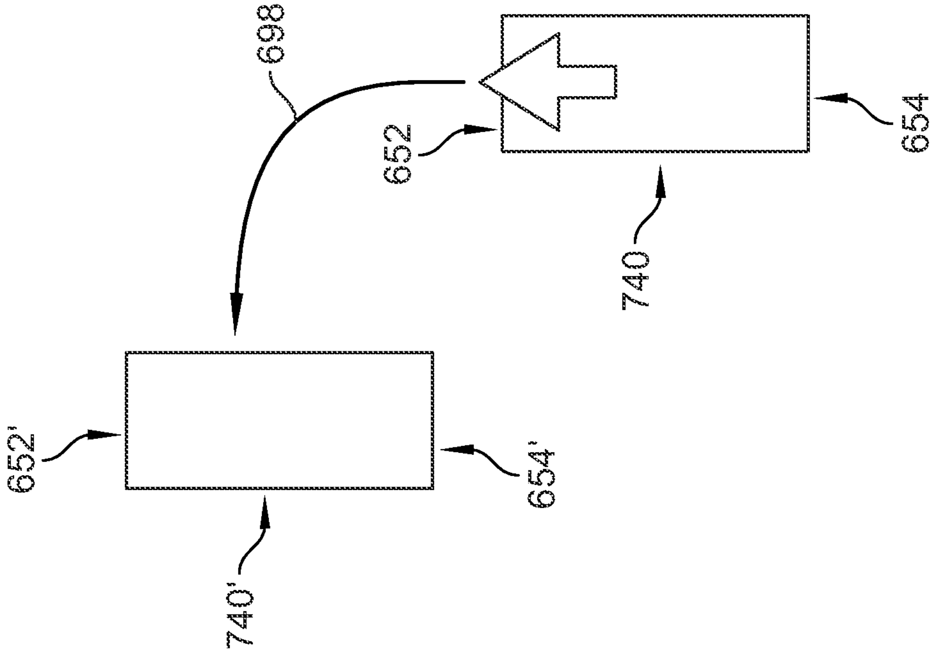
FIG. 26B is a diagrammatic view, similar to FIG. 26A, showing the patient support apparatus of FIG. 25 following a curved path into side-by-side relation with the second patient support apparatus.

Referring now to FIGS. 26A and 26B, two different paths for moving patient support apparatus 740 alongside a second patient support apparatus 740' for patient transfer are depicted diagrammatically. In FIG. 26A, patient support apparatus 740 is propelled by the user to follow a right angle path 696 to move into side-by-side relation with second patient support apparatus 740'. Thus, the user first propels apparatus 740 in a first straight line direction 696*a* until apparatuses 740, 740' have their foot ends 652, 652' and head ends 654, 654' generally aligned, but with sides of apparatus 740, 640' having a gap therebetween. The user then propels patient support apparatus 740 sideways in a second straight line direction 696*b* to close or entirely eliminate the gap between apparatuses 740, 740'. In FIG. 26B, patient support apparatus 740 is propelled by the user to follow a curved path 698 to move into side-by-side relation with the second patient support apparatus 740'. The decision as to whether to follow path 696 or path 698 is at the discretion of the user and may depend, at least in part, on the skill level of the user in propelling and maneuvering patient support apparatus 740.

Referring once again to FIGS. 25A and 25B, patient support apparatus 740 includes a pair of optical sensors 700 and an alignment target 702 coupled to base frame 646 via shroud 670. More particularly, sensors 700 and target 702 are coupled to a sidewall 704 of shroud 670. Similar sensors 700 and target 702 are coupled to an opposite sidewall (not shown) of shroud 670. The four optical sensors 700, therefore, are aimed laterally outwardly relative to shroud 670 of patient support apparatus 740. Each of optical sensors 700 is coupled to circuitry 330 of patient support apparatus 740, much in the same manner as depicted in FIGS. 23 and 24 with regard to collision avoidance sensors 640 being coupled to circuitry 300 via respective conductors 642. Examples of suitable optical sensors 700 include cameras, including infrared (IR) cameras as wells as cameras having a complementary metal oxide semiconductor (CMOS) image sensor; RADAR sensors, FLIR sensors, and LiDAR sensors, just to name a few.

In the illustrative example of FIGS. 25A and 25B, alignment target 702 is embodied as a cross or plus sign indicia. Other indicia such as a bullseye pattern, a quick response (QR) code, a 4-quadrant checkered pattern, a bar code, a simple geometric shape (e.g., square, triangle, circle, hexagon, octagon, etc.), or the like, may be used in other embodiments of patient support apparatus 740 as the alignment target 702 in lieu of the plus sign indicia, the general idea being that alignment target 702 is able to be detected by image sensors 700 and discerned by circuitry 330 of apparatus 740 to implement an auto-alignment function with second patient support apparatus 740'. It should be appreciated, therefore, that second patient support apparatus 740' also has alignment targets 702 on each of its shroud sidewalls for detection by sensors 700 of apparatus 700.

Referring now to FIGS. 27A-D, an alignment sequence is shown diagrammatically in which apparatus 740 moves automatically into position for transfer of a patient 710 from apparatus 740 to apparatus 740'. Such a sequence is initiated, in some embodiments for example, in response to selection by a user of a user input (e.g., button, switch, key, etc.) that is coupled to circuitry 330 and that is provided on apparatus 740, such as on handle 688 or on handle platform 686, while apparatus 740' is within detection range of at least one of the optical sensors 700 of apparatus 740. After the alignment sequence is initiated with the user input, circuitry 330 of apparatus 740 signals motors 662 of mecanum wheels 742*a*, 742*b*, 742*c*, 742*d* of apparatus 740 to operate automatically, as well as signaling the actuator of lift 650 of apparatus 740 to operate automatically, to align the upper frame 648 of apparatus 740 at the same height and in side-by-side relation with upper frame 648' of apparatus 740' with no clearance gap therebetween, or with only a small clearance gap such as on the order of ½ inch to 2 inches therebetween.

Figure 27A:
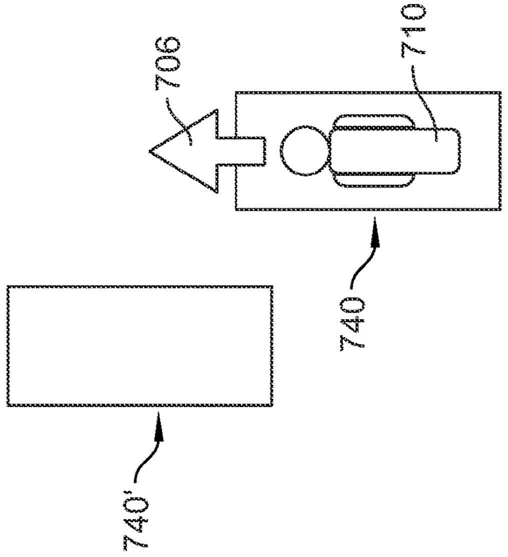
FIG. 27A is a diagrammatic view showing a first step of a patient transfer process in which the patient support apparatus of FIG. 25 carries a patient and is moved to a position alongside, but spaced from, the second patient support apparatus.

In FIG. 27A, a first step of the auto-alignment and patient transfer process is depicted diagrammatically. In this first step, patient support apparatus 740 having patient 710 thereon is moved by mecanum wheels 742*a*, 742*b*, 742*c*, 742*d* in a longitudinal direction, as indicated by arrow 706, from a first position shown in FIG. 27A to a second position shown in FIG. 27B. In the second position, patient support apparatus 740 is situated alongside, but spaced from, the second patient support apparatus 740' with the foot and head ends 652, 654 of apparatus 740 being generally aligned with the foot and head ends 652', 654' of apparatus 740'.

Figure 27B:
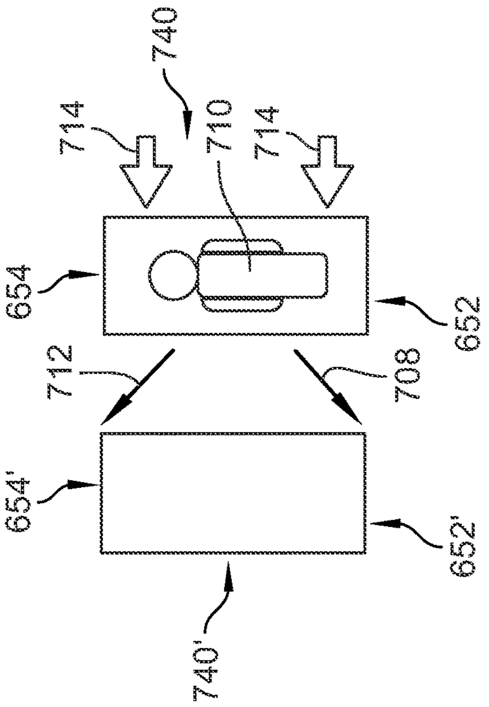
FIG. 27B is a diagrammatic view, similar to FIG. 27A, showing an alignment sequence in which alignment targets and sensors on respective bases of the patient support apparatuses are used to control movement of the patient support apparatus carrying the patient into alignment with the second patient support apparatus.

As indicated diagrammatically in FIG. 27B, sensors 700 of apparatus 740 scan apparatus 740' to determine a location of one of the alignment targets 702 of apparatus 740'. More particularly, arrows 708, 712 in FIG. 27B diagrammatically represent the ability of sensors 700 of apparatus 740, in combination, to optically scan the full distance along the side of apparatus 740' between foot end 652' and head end 654' to locate alignment target 702 of apparatus 740'. After sensors 700 of first apparatus 740 detect alignment target 702 of second apparatus 740' in cooperation with circuitry 330, mecanum wheels 742*a*, 742*b*, 742*c*, 742*d* are operated in a manner to move apparatus 740 in a lateral direction toward apparatus 740' as indicated by arrows 714 in FIG. 27B. In order to maintain apparatus 740 in alignment with apparatus 740', it is desirable that alignment target 702 of apparatus 740' is substantially equidistant from sensors 700 of apparatus 740 while apparatus 740 moves laterally in direction 714.

Figure 27C:
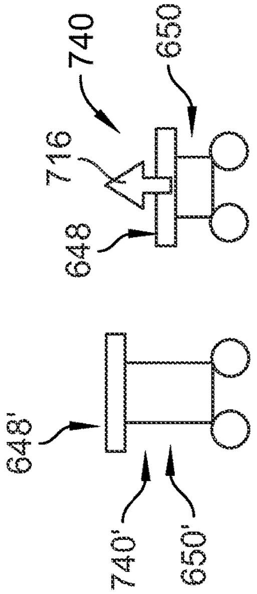
FIG. 27C is a diagrammatic view showing the patient support apparatus carrying the patient moving an upper frame thereof to match a height of an upper frame of the second patient support apparatus based on wireless height information transmitted from the second patient support apparatus and received by the patient support apparatus carrying the patient.

In shown diagrammatically in FIG. 27C, patient support apparatus 740 that carries patient 710 has operates lift 650 automatically so that a height of upper frame 648 matches a height at which lift 650' of apparatus 740' supports upper frame 648' as indicated by arrow 716. This motion by lift 650 to raise upper frame 648 in direction 716 can occur before, during, or after apparatus 740 is moved in direction 714 toward apparatus 740', at the discretion of the system designer. Of course, if upper frame 648 is higher in elevation than upper frame 648', then lift 650 is operated to lower frame 648 in a direction opposite to direction 716. Movement of upper frame 648 by lift 650 to match a height of upper frame 648' of second patient support apparatus 740' is based on wireless height information that is transmitted from second patient support apparatus 740' and that is received by the patient support apparatus 740 carrying the patient 710.

In alternative embodiments, during the alignment sequence of FIGS. 27A-27D, lift 650' of apparatus 740' is operated automatically so that upper frame 648' is moved to an elevation that matches the height of upper frame 648 of apparatus 740'. Movement of upper frame 648' by lift 650' to match a height of upper frame 648 of patient support apparatus 740 is based on wireless height information that is transmitted from patient support apparatus 740 and that is received by second patient support apparatus 740'. Regardless of which lift 650, 650' is the one that is moved automatically, it will be appreciated that apparatuses 740, 740' include wireless transmitters, receivers, and/or transceivers for communication of the wireless height information therebetween. Such wireless communication devices are in communication with the corresponding circuitry 330 of the respective apparatuses 740, 740'. The present disclosure contemplates that the wireless communication between apparatuses 740, 740' may be accomplished using infrared (IR) signals; radio frequency (RF) signals, such as those implemented according to the Bluetooth or Bluetooth Low Energy (BLE) protocols, as well as ultra wideband (UWB) signals; ultrasonic signals; or any other suitable wireless signal technology.

In some embodiments, patient support apparatus 740 includes at least one patient presence sensor that detects a presence of patient 710 supported by upper frame 648 and that detects the patient's absence when patient 710 is no longer supported by upper frame 648. For example, the at least one patient presence sensor includes at least one load cell in some embodiments. Such load cells may be included a scale system of apparatus 740 and therefore, the discussion above of scale system of patient support apparatus 20 is equally applicable to patient support apparatus 740 and is not repeated. The present disclosure contemplates that, if either or both of optical sensors 700 of patient support apparatus 740 detects one of the targets 702 of apparatus 740' and if the patient presence sensor changes from detecting the presence of patient 710 to detecting the patient's absence, then transmission of patient data from patient support apparatus 740 to second patient support apparatus 740' is triggered. Such patient data may include, for example, patient weight data; patient height data; vital signs data (e.g., heart rate, respiration rate, and temperature); risk scores data (e.g., sepsis risk score, skin injury risk score, and falls risk score); patient demographic data; patient allergies; patient medications; caregiver and/or physician notes about patient; and the like. Optionally, the patient data may include the most current patient data taken in most recent readings (e.g., most recent weight reading, most recent temperature reading, etc.), for example, as well as historical data taken in prior readings.

Figure 27D:
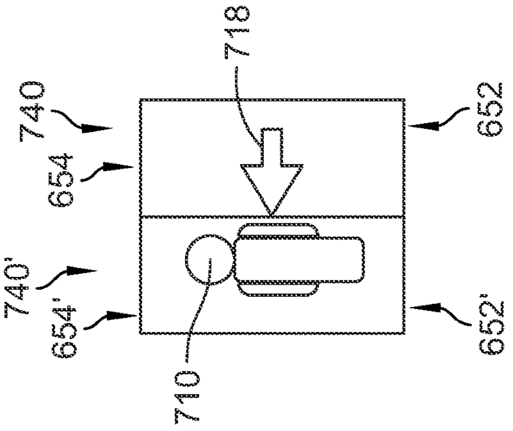
FIG. 27D is a diagrammatic view, similar to FIGS. 27A and 27B, showing the patient support apparatus moved against the second patient support apparatus to close the gap therebetween and showing the patient moved onto the second patient support apparatus to complete the patient transfer process.

Referring now to FIG. 27D, apparatus 740 is depicted diagrammatically as being brought into full alignment with apparatus 740' such that lateral transfer of patient 710 in the direction of arrow 718 from apparatus 740 to apparatus 740' is accomplished. The transfer of patient 710 between apparatuses 740, 740' is performed by one or more caregivers, such as by pulling on a bed sheet or similar type of transfer sheet that is located beneath the patient 710. It should be appreciated that when apparatuses 740, 740' are in full alignment, patient support apparatus 740 is moved against the second patient support apparatus 740' with no clearance gap therebetween, or with only a small clearance gap such as on the order of ½ inch to 2 inches therebetween, as mentioned previously.

Referring now to FIGS. 28A-28F, diagrammatic views are provided showing the manner in which mecanum wheels 742*a*, 742*b*, 742*c*, 742*d* are operated to achieve six different types of movements. Each FIGS. 28A-28F is a diagrammatic overhead view of apparatus 740 with foot end 652 of apparatus 740 being at the top of each view and head end 654 being at the bottom of each view. Base frame 646 is depicted diagrammatically in FIGS. 28A-28F as a rectangle. Thus, in each of FIGS. 28A-28F, first mecanum wheel 742*a* is located at a left side foot end region of base frame 646, second mecanum wheel 742*b* is located at a right side foot end region of base frame 646, third mecanum wheel 742*c* is located at a left side head end region of base frame 646, and fourth mecanum wheel 742*d* is located at a right side head end region of base frame 646.

Figures 28A, 28B, 28C, 28D, 28E, 28F:
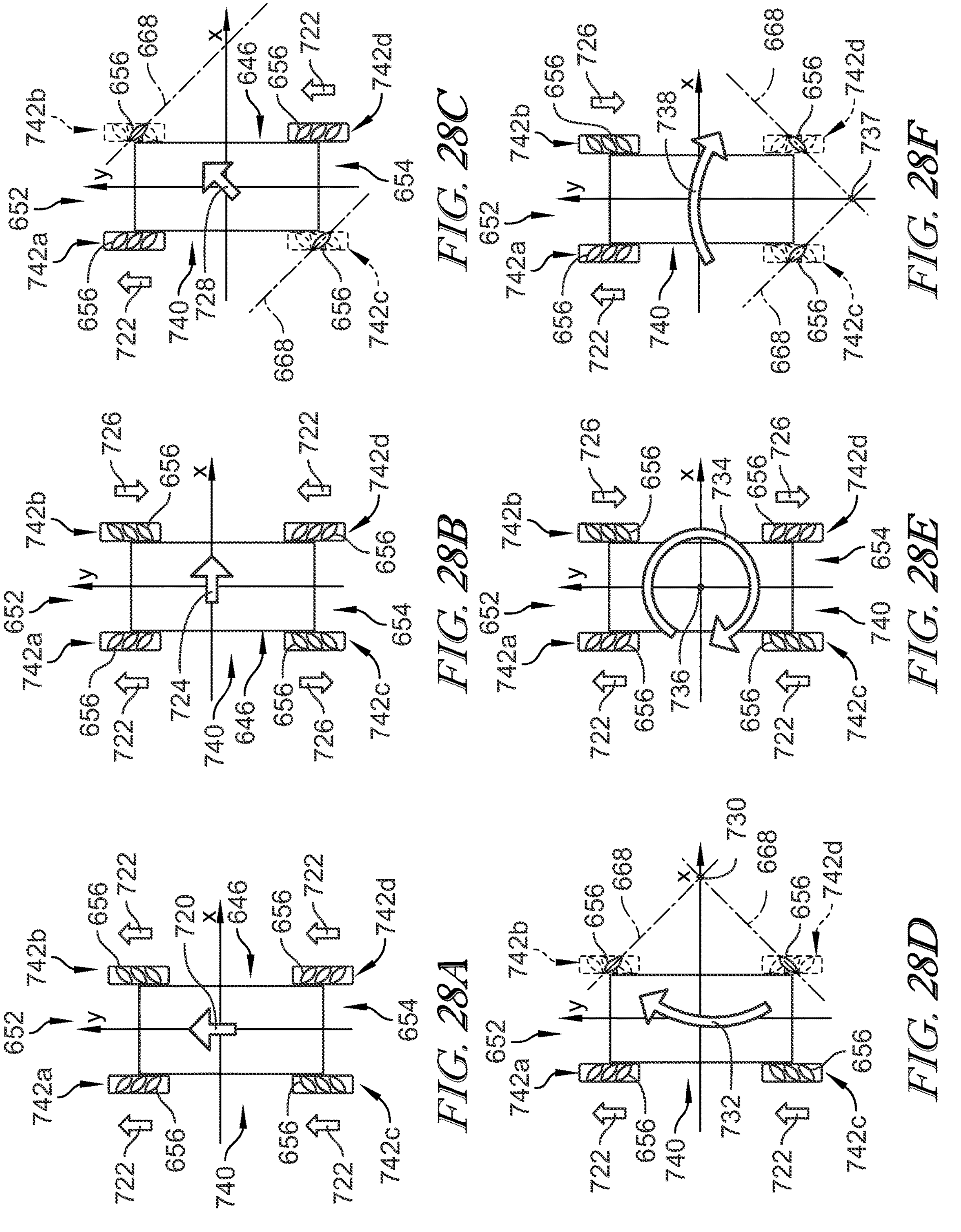
FIG. 28A is a diagrammatic view showing a manner in which the mecanum wheels of patient support apparatus are controlled to propel the patient support apparatus in a longitudinal direction.
FIG. 28B is a diagrammatic view showing a manner in which the mecanum wheels of patient support apparatus are controlled to propel the patient support apparatus in a lateral direction.
FIG. 28C is a diagrammatic view showing a manner in which the mecanum wheels of patient support apparatus are controlled to propel the patient support apparatus in a diagonal direction.
FIG. 28D is a diagrammatic view showing a manner in which the mecanum wheels of patient support apparatus are controlled to propel the patient support apparatus so as to turn about an imaginary turning point that is offset laterally to a side of the patient support apparatus.
FIG. 28E is a diagrammatic view showing a manner in which the mecanum wheels of patient support apparatus are controlled to rotate the patient support apparatus about an imaginary turning point that is generally centered with respect to the patient support apparatus.
FIG. 28F is a diagrammatic view showing a manner in which the mecanum wheels of patient support apparatus are controlled to propel the patient support apparatus so as to turn about an imaginary turning point that is offset longitudinally to a rear of the patient support apparatus.

Referring now to FIG. 28A, a diagrammatic view is provided showing a manner in which mecanum wheels 742*a*, 742*b*, 742*c*, 742*d* of patient support apparatus 740 are controlled. In particular, to propel patient support apparatus 740 in the forward, longitudinal direction 720, without turning, the first, second, third, and fourth mecanum wheels 742*a*, 742*b*, 742*c*, 742*d* all are rotated with an equivalent angular velocity in a same rotational direction as indicated by arrows 722. Now with reference to FIG. 28B, to propel patient support apparatus 740 in a lateral direction indicated by arrow 724, without turning, the first and fourth mecanum wheels 742*a*, 742*d* both are rotated at an equivalent angular velocity in first rotational direction 722 while the second and third mecanum wheels 742*b*, 742*c* both are rotated with the equivalent angular velocity in a second rotational direction, indicated by arrows 726, that is opposite to the first rotational direction 722.

Referring now to FIG. 28C, to propel patient support apparatus 740 in a diagonal direction indicated by arrow 728, without turning, the first and fourth mecanum wheels 742*a*, 742*d* both are rotated at an equivalent angular velocity in the first rotational direction 722 while the respective hubs 658 of second and third mecanum wheels 742*b*, 742*c* both are maintained rotationally stationary. Thus, for wheels 742*b*, 742*c*, only one of rollers 656 (shown in solid) of each wheel 742*b*, 742*c* is in contact with the underlining floor and these two rollers each roll freely while the other rollers 656 (some which are shown in phantom) of wheels 742*b*, 742*c* remain out of contact with the floor. In contrast, the hubs 658 of wheels 742*a*, 742*d* are each rotatably driven by the respective motors 662 in the first rotational direction so that all of rollers 656 of wheels 742*a*, 742*d* are cyclically driven into contact with the floor. This results in diagonal direction 728 being substantially perpendicular to the axes 668 of the rollers 656 of wheels 742*b*, 742*c* that remain in contact with the floor.

Referring now to FIG. 28D, to propel patient support apparatus 740 to turn in a turning direction indicated by arrow 732 about an imaginary turning point 730 that is offset laterally to a side of patient support apparatus 740, first and third mecanum wheels 742*a*, 742*c* both are rotated at an equivalent angular velocity in first rotational direction 722 while the respective hubs 658 of second and fourth mecanum wheels 642*b*, 642*d* both are maintained rotationally stationary. Now with reference to FIG. 28E, to rotate patient support apparatus 740 in place in a direction indicated by arrow 734 about an imaginary turning point 736 that is generally centered with respect to patient support apparatus 740, first and third mecanum wheels 742*a*, 742*c* both are rotated at an equivalent angular velocity in first rotational direction 722 while the second and fourth mecanum wheels 742*b*, 742*d* both are rotated with the equivalent angular velocity in second rotational direction 726 that is opposite to first rotational direction 722. Referring now to FIG. 28F, to propel patient support apparatus 740 to turn in a turning direction indicated by arrow 738 about an imaginary turning point 737 that is offset longitudinally to a rear of patient support apparatus 740, first and second mecanum wheels 742*a*, 742*b* both are rotated at an equivalent angular velocity but in opposite rotational directions 722, 726, respectively, while the respective hubs 658 of the third and fourth mecanum wheels 742*c*, 742*d* both are maintained rotationally stationary.

The examples given in FIGS. 28A-28F are not exhaustive of all of the directions that patient support apparatus 740 may be propelled, but the principles involved with regard to how mecanum wheels 742*a*, 742*b*, 742*c*, 742*d* should be driven to accomplish other propulsion directions can be deduced or inferred from the given examples. For example, with reference to FIG. 28A, to propel patient support apparatus 740 in a reverse direction, opposite to direction 720, mecanum wheels 426*a*, 426*b*, 426*c*, 426*d* are simply driven in rotational direction 726 at equivalent velocities, rather than in rotational direction 722. Thus, reversing the drive directions 722, 726 of wheels 742*a*, 742*b*, 742*c*, 742*d* in FIGS. 28A-28F causes a reversal in the depicted straight line drive directions or turning drive directions. Furthermore, changing the wheels 742*a*, 742*b*, 742*c*, 742*d* having their hubs 658 maintained stationary alters the diagonal drive direction of FIG. 28C and the turning directions (e.g., left turn instead of right turn) of FIGS. 28D-F.

Due to the angled axes 668 of rollers 656 relative to the longitudinal direction (e.g., y-direction) and lateral direction (x-direction) of patient support apparatus 740, it should be appreciated that, in many propulsion scenarios, some or all of the rollers 656 of mecanum wheels 742*a*, 742*b*, 742*c*, 742*d* in contact with the underlying floor will slip, at least to some extent, during propulsion of patient support apparatus 740. In other words, each mecanum wheel 742*a*, 742*b*, 742*c*, 742*d* that is driven under the power of the respective motor 662 produces a force vector that is perpendicular to the axis or axes 668 of the roller or rollers 656 in contact with the floor, but it is the sum of the force vectors of the driven wheels 742*a*, 742*b*, 742*c*, 742*d* that determines the overall direction at which patient support apparatus 740 is propelled.

Figure 29:
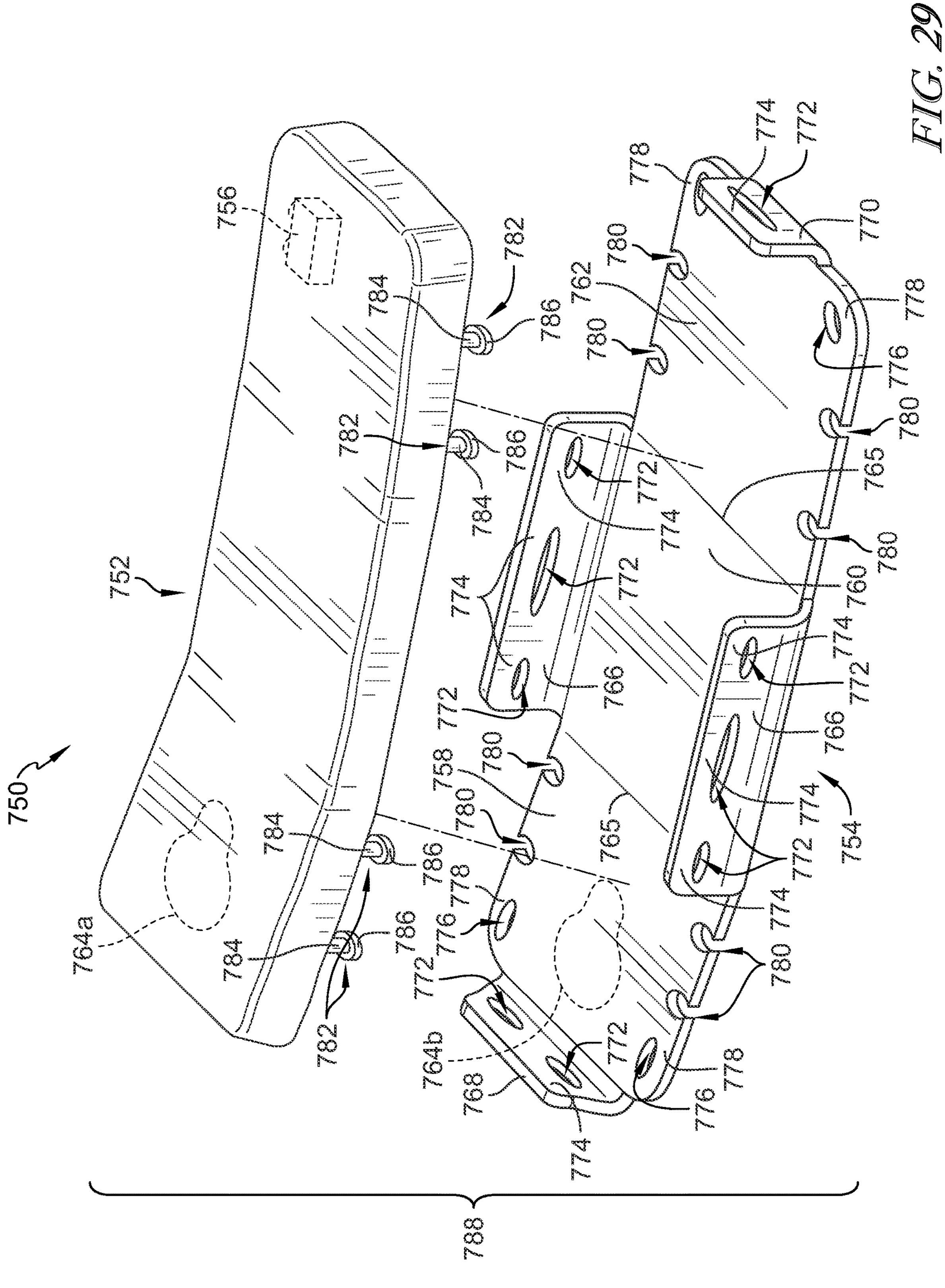
FIG. 29 is an exploded perspective view of a modular surface for use with a patient support apparatus, the modular surface having an upper mattress portion and a lower mattress tray portion that supports the mattress portion.

Referring now to FIG. 29, a portion of a modular, stacked surface system 750 includes an upper mattress portion 752 and a lower mattress tray portion 754 that supports the mattress portion 752. Mattress portion 752 is sometimes referred to herein as simply mattress 752 or support surface 752. Similarly, mattress tray portion 754 is sometimes referred to herein as simply tray 754. Support surface 752 includes at least one deformable patient support element such as one or more blocks of foam and/or one or more layers of foam and/or one or more inflatable air bladders (not shown but well known in the art).

In the illustrative example, mattress 752 includes a control box 756 contained therein as shown in FIG. 29 (in phantom). If support surface 752 includes one or more inflatable air bladders, control box 756 houses a pneumatic system that includes, for example, an air source (e.g., a pump, compressor, and/or blower), a battery to provide power for the air source, one or more valves to control air flow between the air source and the one or more bladders, a manifold to which the one or more valves are coupled and to which pneumatic hoses are coupled, pressure sensors, and electronics including a microcontroller, microprocessor, memory for storing software and operating parameters, one or more voltage controllers, or the like. If mattress 752 does not have any air bladders, such as having only foam patient support elements, then control box 756 contains a battery and other electronics such as electronics for receiving and processing vital signs signals from the patient or controlling electrical actuators (not shown) of the surface system 750.

Tray 754 includes a head panel 758, a seat panel 760, and a foot panel 762. Articulation reliefs 765, such as living hinges for example, are provided in tray 754 between panels 758, 760, 762. In the illustrative example, mattress 752 includes a first head indicia 764*a* (in phantom) and head panel 758 includes a second head indicia 764*b* of similar appearance to indicia 764*a*. Indicia 764*a*, 764*b* indicate the orientation at which mattress 752 is to be coupled to tray 754. A pair of side panels 766 are formed integrally with seat panel 760 such that each panel 766 extends upwardly from a respective side of panel 760. A first end panel 768 is formed integrally with head panel 758 and extends upwardly from a head end of panel 758. Similarly, a second end panel 770 is formed integrally with foot panel 762 and extends upwardly from a foot end of panel 762. Each of the upwardly extending panels 766, 768, 770 is formed to include one or more finger-receiving openings 772 to define grasp loops 774 thereabove. Similar finger-receiving openings 776 are provided at head end corner regions of panel 758 and foot end corner regions to provide additional grasp loops 778 in these panels 758, 762.

In the illustrative embodiment, tray 754 is formed to include notches 780 in spaced apart first and second side edges of panels 758, 762 as shown best in FIG. 29. Support surface 752 includes a plurality of keys 782 that extend downwardly into the notches 780 to couple support surface 752 to tray 754. In the depicted embodiment, each key 782 includes a resilient band 784 and a retainer 786. Resilient bands 784 each have a proximal end attached to support surface 752 (e.g., attached to a coverlet of support surface 752) and a distal end that is spaced downwardly from the proximal end. In turn, retainers 786 are each coupled to the distal end of the respective resilient band 784. It is contemplated that the retainer 786 of each key 782 is larger than a width dimension of each notch 780 of the plurality of notches. 780.

In use, retainers 786 are grasped and moved by a user so that resilient bands 784 are stretched downwardly and slightly outwardly beyond the sides of tray 754. Retainers 786 are then moved to positions beneath the respective notches 780 such that the stretched, resilient bands 784 are fed into the corresponding notches 780 through the notch openings defined in the side edges of panels 758, 762. The user then releases the retainers 786 which results in the resilient bands 784 biasing the retainers 786 upwardly into contact with an undersurface of panel 758 or panel 762 as the case may be. In some embodiments, the undersurfaces of panels 758, 762 are each formed to include recesses that receive at least a portion of retainers 786 therein to prevent the retainers 786 from shifting laterally outwardly away from their desired positions beneath notches 780.

In some embodiments, a high slip material is coated on, or adhered to, the undersurface of tray 754. Examples of such materials include TEFLON® coatings and parachute materials like NYLON® Ripstop fabric. Alternatively, in some embodiments, tray 754 itself is made of a low slip material such as a high durometer plastic material (e.g., one having a Shore D hardness of about 70 to about 100). Thus, when mattress 752 is attached to tray 754 with keys 782, the combination mattress/tray structure forms a first style of a modular sled 788 (aka a modular surface 788) of surface system 750. This first style of modular sled 788 can be transferred easily between traditional patient support apparatuses such as stretchers, patient beds, examination tables, surgical tables, and the like by simply sliding the modular sled 788 between the mattress support decks of these patient support apparatuses.

Figure 30:
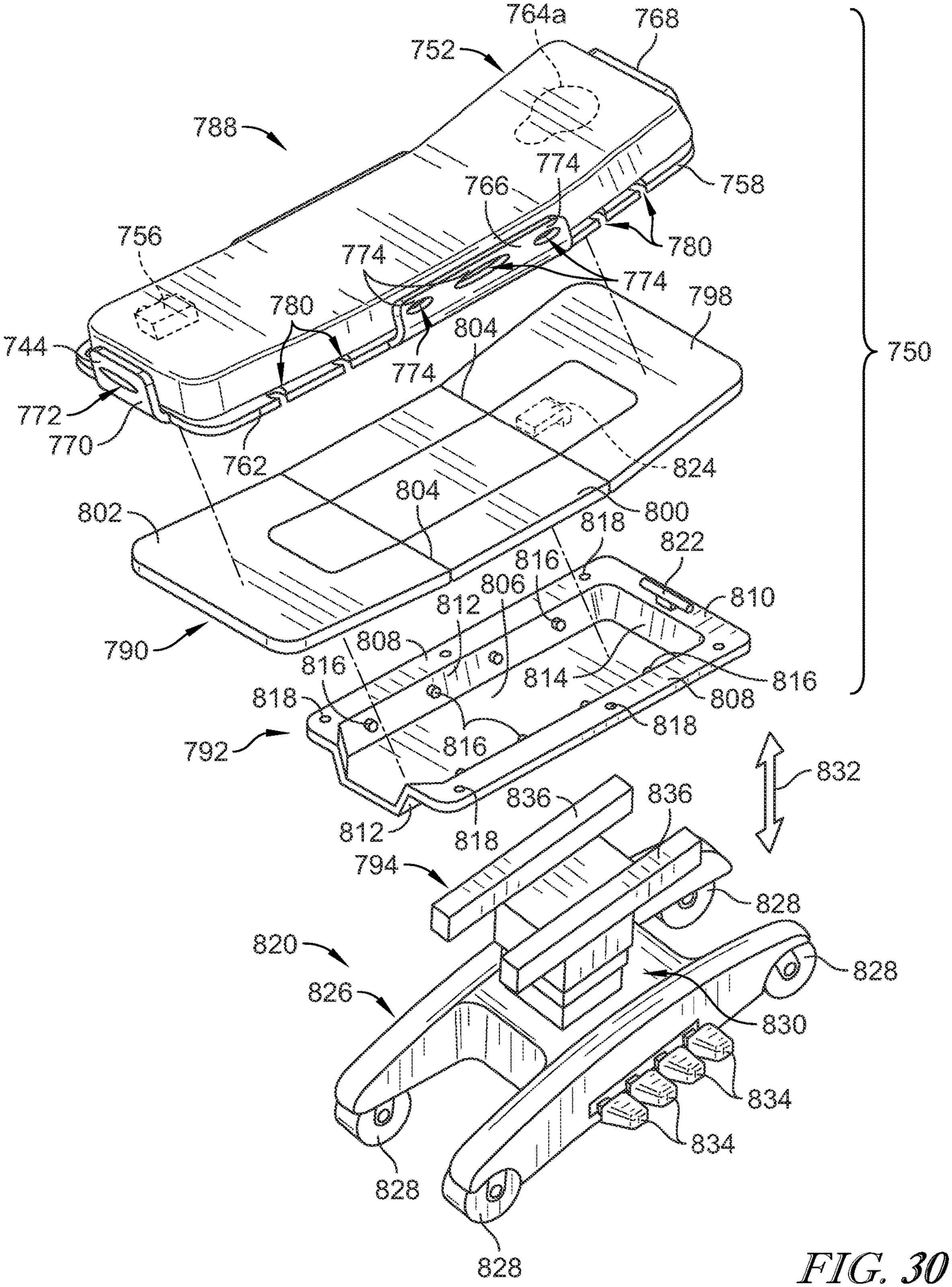
FIG. 30 is an exploded perspective view showing the modular surface of FIG. 29 arranged above a platform tray that, in turn, is arranged above a fore/aft platter that, in turn, is arranged above an upper frame of a base system of the patient support apparatus.

Referring now to FIG. 30, modular surface 788 is arranged above a platform tray 790 that, in turn, is arranged above a fore/aft platter 792 that, in turn, is arranged above an upper frame 794 of a base system 796 of a patient support apparatus 820. Platform tray 790 has a head panel 798, a seat panel 800, and a foot panel 802 that support respective panels 758, 760, 762 of mattress tray portion 754 of modular surface 788. Similar to tray 754, tray 790 includes articulation reliefs 804, such as living hinges for example, between panels 798, 800, 802. When modular surface 788 is coupled to tray 790, head panels 758, 798 articulate together relative to seat panels 760, 800 and foot panels 762, 802 articulate together relative to seat panels 760, 800.

In some embodiments, actuators (not shown) are coupled to, or are provided in, tray 790 to articulate panels 798, 802 relative to panel 800, thereby to articulate modular surface 788. Thus, it will be appreciated that panels 798, 800, 802 of tray 790 have similar width and length dimensions as respective panels 758, 760, 762 of tray 754. Suitable couplers (not shown) such as posts, keys, clamps, snaps, straps, or the like are provided to couple trays 754, 790 together. Once coupled together trays 754, 790 act together as a single tray unit and therefore, may be considered as a single tray. In alternative embodiments, only a single tray is provided in surface system 750 that has the features of both trays 754, 790.

Fore/aft platter 792 has a stepped configuration including a central region 806 in the form of a panel that is recessed downwardly from a pair of side regions 808. Platter 792 also has a head region 810 that is coplanar with side regions 808. Substantially vertical sidewalls 812 interconnect regions 806, 808 and a substantially vertical head wall 814 interconnects regions 806, 810. In the illustrative example, a set of generally cylindrical rollers 816 are coupled to sidewalls 812 and extend therefrom over region 806. Additionally, spherical rollers 818 are coupled to side regions 808 and project upwardly therefrom. In some embodiments, platform tray 790 has a stepped configuration with a central lower portion (not shown) that nests downwardly, at least in part, into the space defined between sidewalls 812. Rollers 816, 818 permit longitudinal movement of platform tray 790 and modular surface 788 carried by tray 790 as surface 788 and tray 790 slide onto and off of fore/aft platter 792, such as during transfer thereof between base system 820 and another base system 820 of another patient support apparatus.

Still referring to FIG. 30, a cleat 822 is coupled to head region 810 of platter 792 and extends upwardly therefrom. A cleat catch 824 is provided on the underside of tray 790 such as by being coupled to a bottom surface of seat panel 800 and extending therefrom beneath head panel 798. Cleat catch 824 locks onto cleat 822 to securely couple tray 798 to platter 792. Cleat catch 824 is spring loaded in some embodiments so as to ride up and over cleat 822 as tray 790 is slid onto platter 792 toward head wall 814 and then move downwardly under spring bias to hook onto cleat 822. A release lever or handle or the like (not shown) is provided on tray 790 to release cleat catch 824 from cleat 822 when tray 790 is to be detached from platter 792.

Still referring to FIG. 30, base system 820 includes a base 826, four casters 828 coupled to base 826, and a lift 830 interconnecting base 826 and upper frame 794. Illustratively, lift 830 is a telescopic lift which raises and lowers upper frame 794, as well as any of platter 792, tray 790, and modular surface 788, that are coupled to upper frame 794 as indicated by double headed arrow 832. Foot pedals 834 extend outwardly from a side of base 826 and are depressed by a user to control various features and functions of base system 820 such as raising and lowering lift 830 and braking and releasing casters 828. In some embodiments of base system 820, casters 828 are standard casters that freely swivel and roll. However, in other embodiments, any of the motorized casters or wheels, such as motorized casters 30, 30', 130, 230 or mecanum wheels 742*a*, 742*b*, 742*c*, 742*d*, may be included in base system 820 in lieu of casters 828.

Upper frame 794 of base system 820 includes a pair of spaced apart rails 836 coupled to the upper end of lift 830. When fore/aft platter 792 is coupled to base system 820, side regions 808 of platter 792 overlie and rest upon respective rails 836 with central region 806 and sidewalls 812 of platter 792 situated in a space defined between rails 836. A locking mechanism (not shown), such as one or more pins, catches, grips, brakes, clamps, or the like are provided on base system 820 to lock platter 792 to rails 836 of upper frame 794 or to the top of lift 830. One or two foot pedals 834 are used to lock and/or release the locking mechanism in some embodiments. Rails 836 extend longitudinally with respect to base system 820 to serve as longitudinally extending guides for fore/aft platter 792 and any of platform 790 and modular surface 788 coupled thereto.

Figures 31, 32:
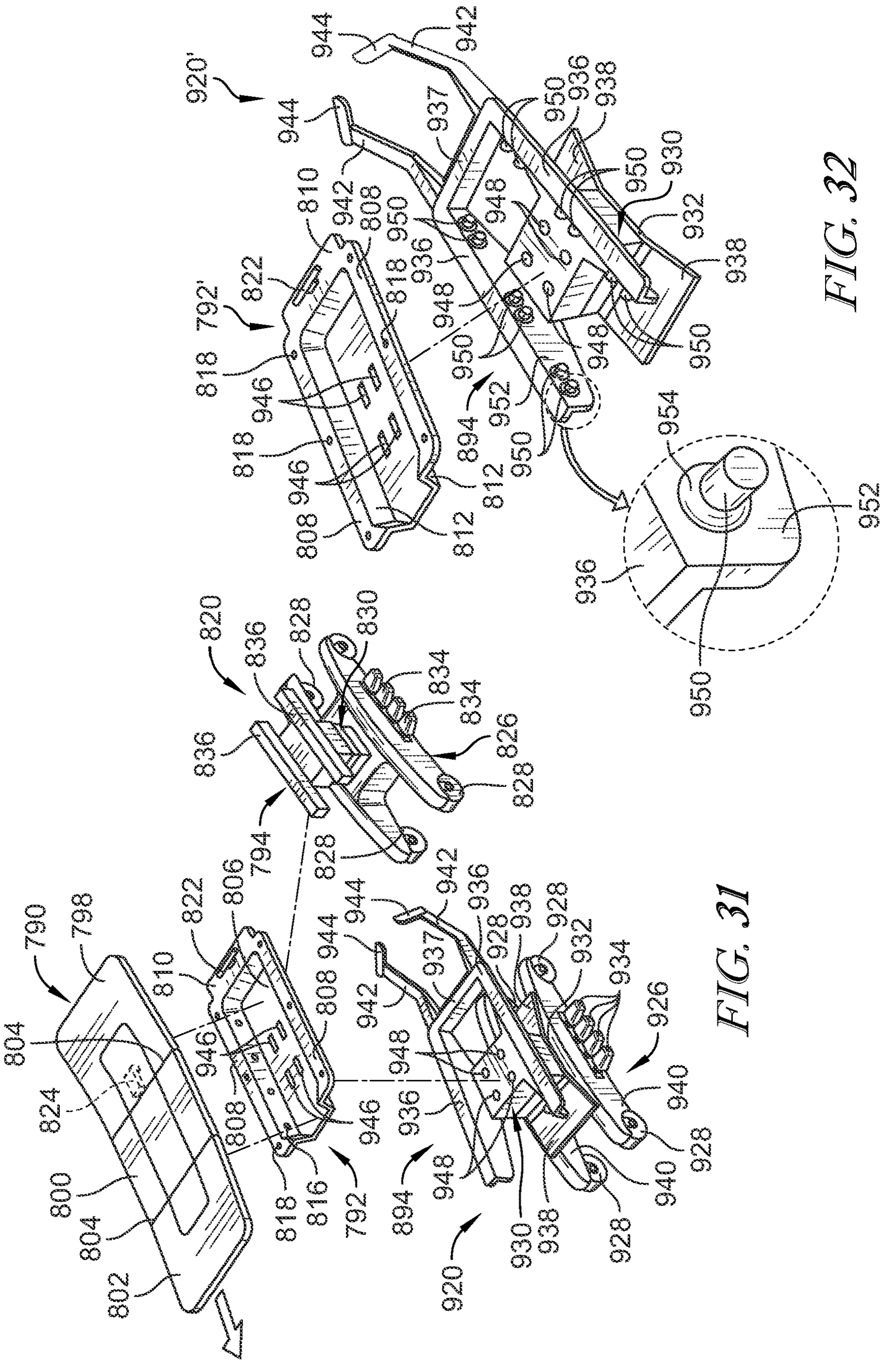
FIG. 31 is an exploded perspective view showing the fore/aft platter being selectively attachable to two different styles of base systems and showing the platform tray arranged above the fore/aft platter.
FIG. 32 is an exploded perspective view of the fore/aft platter and an alternative embodiment of one of the base systems of FIG. 31 showing the depicted base system having longitudinally extending guide rails and powered rollers extending laterally inwardly from the guide rails, the powered rollers being configured to support the fore/aft platter and to move the fore/aft platter longitudinally relative to the base system.

Referring now to FIG. 31, fore/aft platter 792 and tray 790 are depicted as being selectively attachable to base system 820 or to a base system 920. Tray 790, platter 792, and base system 820 were described above and so the description of these does not need to be repeated. Base system 920 includes an upper frame 894, a base 926, four casters 928 coupled to base 926, and a lift 930 interconnecting base 926 and upper frame 894. Illustratively, lift 930 is a telescopic lift which raises and lowers upper frame 894, as well as any of platter 792, tray 790, and modular surface 788, that are coupled to upper frame 894. Foot pedals 934 extend outwardly from a side of base 926 and are depressed by a user to control various features and functions of base system 920 such as raising and lowering lift 930 and braking and releasing casters 928. In some embodiments of base system 920, casters 928 are standard casters that freely swivel and roll. However, in other embodiments, any of the motorized casters or wheels, such as motorized casters 30, 30', 130, 230 or mecanum wheels 742*a*, 742*b*, 742*c*, 742*d*, may be included in base system 920 in lieu of casters 928.

Base 926 of base system 920 is sometimes referred to as base frame 926 herein. Base frame 926 includes an upper platform 932 that supports lift 930, and a set of struts 938 that supports upper platform 932 above a lower platform 940. Upper platform 932 is coupled to the bottom of lift 930. Struts 938 extending longitudinally outwardly from platform 932 and are angled downwardly in the illustrative example. Also in the illustrative example of FIG. 31, struts 938 are embodied as plates that have substantially the same lateral width as platform 932, which itself is embodied as a plate in the illustrative example. Furthermore, the plates of struts 938 are integral with the plate of platform 932 in some embodiments such as the illustrative embodiment.

Upper frame 894 of base system 920 includes a pair of spaced apart rails 936 coupled to the upper end of lift 930. Upper frame 894 also includes a head end rail 937 that interconnect the head end regions of rails 936. Upper frame 894 further includes a pair of push handles 942 that angle upwardly from head end rail 937 in a generally longitudinal dimension of base system 920. Hand grips 944 are provided at distal ends of the push handles 942. When fore/aft platter 792 is coupled to base system 920, side regions 808 of platter 792 overlie and rest upon respective rails 936 with central region 806 and sidewalls 812 of platter 792 situated in a space defined between rails 936. A locking mechanism (not shown), such as one or more pins, catches, grips, brakes, clamps, or the like are provided on base system 920 to lock platter 792 to rails 936 of upper frame 894 or to the top of lift 930. One or two foot pedals 934 are used to lock and/or release the locking mechanism in some embodiments. Rails 936 extend longitudinally with respect to base system 920 to serve as longitudinally extending guides for fore/aft platter 792 and any of platform 790 and modular surface 788 coupled thereto.

As best shown in FIG. 32, an alternative embodiment fore/aft platter 792', which is similar to platter 792 and so like reference numbers are used to denote like components, has four artifacts 946 that are adapted for detection by a corresponding number of sensors 948 of an alternative embodiment base system 920', which is similar to base system 920 and so like reference numbers are used to denote like components. In other embodiments, more or less than four artifacts 946 may be provided on platter 792' and more or less than four sensors 948 may be provided on base system 920'. In the illustrative example, sensors 948 are coupled to a top surface of lift system 930. In some embodiments, artifacts 946 include magnets and sensors 948 include proximity sensors such as Hall Effect sensors that detect the magnets. Alternatively, artifacts 946 may include indicia, such as one or more geometric shapes, bar codes, QR codes, four-quadrant checkered pattern, or the like, and sensors 948 may include optical sensors (e.g., QR code readers, bar code readers, cameras, CMOS camera chips, or the like) that detect the indicia. In the illustrative embodiment of FIG. 32, the four artifacts 946 are arranged to define a first quadrilateral and the sensors 948 are arranged to define a second quadrilateral of substantially similar size as the first quadrilateral.

Referring once again to FIG. 31, platter 792 is depicted as also including artifacts 946 and base system 920 is depicted as including sensors 948. The main difference between platter 792 of FIG. 31 and platter 792' of FIG. 32 is that platter 792' omits rollers 816. Furthermore, the main difference between base system 920 of FIG. 31 and upper frame 894 of FIG. 32 is that upper frame 894 of base system 920' includes a plurality of motor-driven rollers 950 that extend from sidewalls 952 of rails 936. An enlarged view of one of rollers 950 is broken out in FIG. 32 and a motor 954 for rotating the roller 950 can be seen. In the illustrative example of base system 920', the pair of side regions 808 of platter 792' are configured to ride upon the underlying motor-driven rollers 950 during transfer of platter 792', along with other components of the associated surface system 750 between, for example, base system 920' and base system 920 of respective first and second patient support apparatuses. It will be appreciated, that rollers 950 are power-driven may respective motors 950 to effect the transfer of the surface system 750 between the first and second patient support apparatuses. Furthermore, it will be appreciated that rails 936 of base system 920' are spaced apart by a greater distance than rails 839 of base system 820, for example, so that all of fore/aft platter 792' is receivable in the space between rails 936. In FIG. 32, it should be noted that lower platform 940 along with its associated casters 928 and foot pedals 934 have been omitted.

Figure 33:
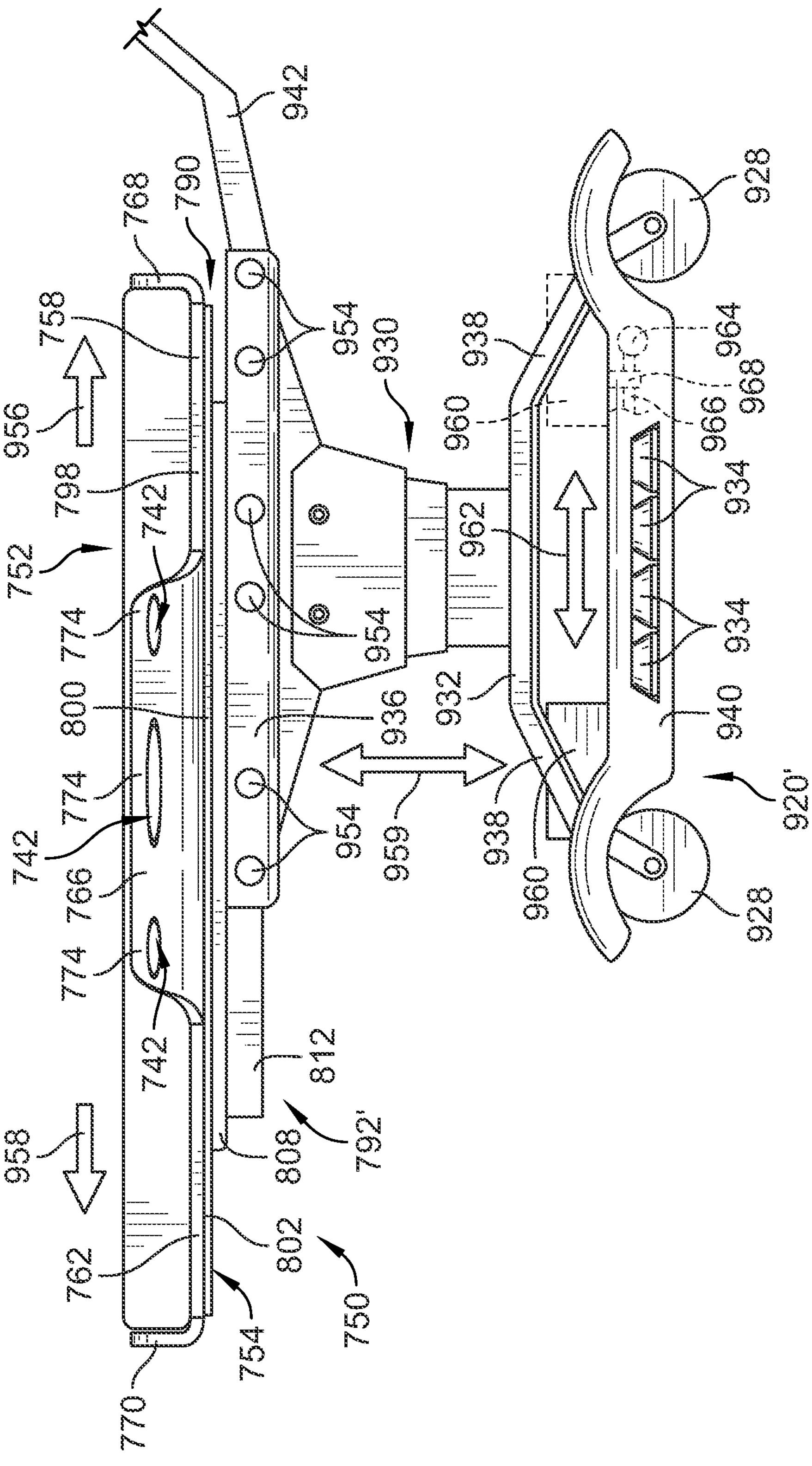
FIG. 33 is side elevation view of the base system of FIG. 32 with the modular surface, platform tray, and fore/aft platter forming a stacked surface system that is attached to the base system and showing the base system having a movable counterbalance ballast weight that is moved toward a head end of the base system to prevent the patient support apparatus from tipping when the stacked surface system is moved rearwardly relative to the base system.

Referring now to FIG. 33, modular surface system 750 having mattress 752, tray 754, tray 790, and platter 792' stacked together on base system 920'. Surface system 750 is shown in an intermediate position relative to base system 920' such that surface system 750 can be selectively moved in a first direction 956 further onto base system 920' or in a second direction 958 further off of base system 920'. A double headed arrow 959 is also depicted in FIG. 33 to indicate that lift system 930 is operable to extend and retract thereby to lift and lower, respectively, upper frame 936 and surface system 750.

Still referring to FIG. 33, base system 920' has a movable counterbalance ballast weight 960 that is movable longitudinally along lower platform 940 toward the head end of base system 920' and toward the foot end of base system 920' as indicated by double headed arrow 962. Ballast weight 960 is moved toward the head end of base system 920' to prevent the associated patient support apparatus from tipping when the stacked surface system 750 is moved rearwardly in direction 958 relative to base system 920'. In particular, ballast weight 960 is moved from a first position, shown in FIG. 33 (in solid), to a second position, shown in FIG. 33 (in phantom), as surface system 750 is moved in direction 958. Similarly, ballast weight 960 is moved from the second position back to the first position as surface system is moved in direction 956.

Detection of artifacts 946 by sensors 948 provides feedback signals to indicate which direction 956, 958 surface system 750 is moving so that ballast weight 960 is moved in the appropriate manner. The direction of motors 954 and respective rollers 950 also can be used to determine which direction 956, 958 surface system 750 is moving. Movement of ballast weight 960 along lower platform 940 is accomplished in the illustrative example by a motor 964 which rotates a lead screw 966 (only a portion of which is shown in FIG. 33 (in phantom)) to which a nut 968 mounted to ballast 960 is coupled. Thus, rotation of lead screw 966 by motor 964 causes nut 968 to advance along the lead screw 966, in one direction or the other depending upon the direction of rotation of the lead screw 966, thereby to move ballast weight 960 with nut 968. In some embodiments, ballast weight 960 comprises one or more batteries that are used to power components, such as an actuator of lift 930, motors 954, motor 964, powered casters 30, 30', 130, 230 or mecanum wheels 742*a*, 742*b*, 742*c*, 742*d*, if present in place of casters 928, circuitry 330, etc. In such embodiments, provision is made for management of battery cables during movement of ballast weight 960.

When terms of degree such as "generally," "substantially," and "about" are used herein in connection with a numerical value or a qualitative term susceptible to a numerical measurement (e.g., vertical, horizontal, aligned), it is contemplated that an amount that is plus or minus 10 percent, and possibly up to plus or minus 20 percent, of the numerical value is covered by such language, unless specifically noted otherwise. For example, "vertical" may be defined as 90 degrees from horizontal and so "substantially vertical" according to the present disclosure means 90 degrees plus or minus 9 degrees, and possibly up to plus or minus 18 degrees. The same tolerance range for "substantially horizontal" is also contemplated. Otherwise, a suitable definition for "generally," "substantially," and "about" is largely, but not necessarily wholly, the term specified.

When the terms "a" or "an" or the phrases "one or more" or "at least one" are used herein, including in the claims, they are all intended to be synonymous and mean that one or more than one of the thing recited may be present. Similarly, when the phrases "a plurality" or "two or more" or "at least two" or "a pair" are used, they are all intended to be synonymous and mean that two or more than two of the thing recited may be present.

Although certain illustrative embodiments have been described in detail above, variations and modifications exist within the scope and spirit of this disclosure as described and as defined in the following claims.

The invention claimed is:

1. A patient support apparatus for propelling a patient along a floor, the patient support apparatus comprising a frame configured to support the patient, at least one dual-wheel motorized caster coupled to the frame and engaging the floor, the at least one dual-wheel motorized caster having first and second motors and first and second wheels coupled to the first and second motors, respectively, power drive circuitry coupled to the first and second motors of the at least one dual-wheel motorized caster to selectively drive the first and second motors to propel the patient support apparatus along the floor via rotation of the first and second wheels and to selectively swivel the at least one dual-wheel motorized caster about a caster swivel axis, and a joystick movable to provide an input command to the power drive circuitry regarding propulsion of the patient support apparatus, the joystick having a handle that is movable into a dead band zone to command the power drive circuitry to swivel the at least one dual-wheel motorized caster into a drive orientation corresponding to a drive direction of the patient support apparatus without propelling the patient support apparatus in the drive direction, the handle also being movable from the dead band zone into a drive zone to command the power drive circuitry to propel the patient support apparatus in the drive direction via rotation of the first and second wheels by the first and second motors, respectively.

2. The patient support apparatus of claim 1, wherein the joystick includes a first user input coupled to the handle and engageable by a user, wherein movement of the joystick into the dead band zone does not swivel the dual-wheel motorized caster unless the first user input is engaged by the user, and wherein movement of the joystick into the drive zone does not result rotation of the first and second wheels by the first and second motors, respectively, unless the first user input is engaged by the user.

3. The patient support apparatus of claim 2, wherein the first user input comprises a movable trigger.

4. The patient support apparatus of claim 3, wherein an upper portion of the handle overhangs the movable trigger.

5. The patient support apparatus of claim 2, wherein the joystick further includes a second user input coupled to the handle and engageable by a user to move from a first position to a second position; wherein when the second user input is in the first position and the drive direction is initially angled with respect to a longitudinal dimension of the patient support apparatus, the patient support apparatus is propelled in a manner that turns the patient support apparatus from an initial orientation into an orientation having the longitudinal dimension of the patient support apparatus parallel with the drive direction; and wherein when the second user input is in the second position and the drive direction is angled with respect to a longitudinal dimension of the patient support apparatus, the patient support apparatus is propelled in a manner that maintains the initial orientation of the patient support apparatus while the patient support apparatus is being propelled in the drive direction.

6. The patient support apparatus of claim 1, further comprising an accelerometer that provides an accelerometer signal to the power drive circuitry which senses how quickly the handle of the joystick is moved within the dead band zone to determine how quickly to swivel the dual-wheel motorized caster.

7. The patient support apparatus of claim 6, wherein the accelerometer signal is also used by the power drive circuitry to determine an acceleration profile to implement based on how quickly the handle of the joystick is moved within the drive zone.

8. The patient support apparatus of claim 1, wherein a speed at which the patient support apparatus is propelled is determined by the power circuitry based on how far into the drive zone the handle is moved.

9. The patient support apparatus of claim 1, wherein the power drive circuitry implements an exponential acceleration profile for propelling the patient support apparatus upon initial propulsion of the patient support apparatus in response to the handle of the joystick being moved into the drive zone.

10. The patient support apparatus of claim 9, wherein the power drive circuitry implements a linear deceleration profile in response to the joystick being moved into a neutral position within the dead band zone.

11. The patient support apparatus of claim 1, wherein after being propelled and coming to a stop, the dual-wheel motorized caster is left in the drive orientation that existed while the patient support apparatus was being propelled.

12. The patient support apparatus of claim 1, wherein after being propelled and coming to a stop, the dual-wheel motorized caster is controlled by the power drive circuitry to swivel into a rest orientation having the drive direction oriented parallel with a longitudinal dimension of the patient support apparatus.

13. The patient support apparatus of claim 1, further comprising at least one collision avoidance sensor coupled to the frame and operable to provide an obstacle detect sensor signal to the power drive circuitry, wherein the power drive circuitry uses the obstacle detect sensor signal to cease propulsion of the patient support apparatus or to swivel the dual-wheel motorized caster so as to steer the patient support apparatus in a manner that avoids or minimizes a collision with a detected obstacle.

14. The patient support apparatus of claim 13, wherein the at least one collision avoidance sensor comprises a first collision avoidance sensor associated with a front of the frame, a second collision avoidance sensor associated with a rear of the frame, a third collision avoidance sensor associated with a right side of the frame, and a fourth collision avoidance sensor associated with a left side of the frame.

15. The patient support apparatus of claim 13, wherein the at least one collision avoidance sensor comprises a first pair of collision avoidance sensors associated with a front of the frame, a second pair of collision avoidance sensors associated with a rear of the frame, a third pair of collision avoidance sensors associated with a right side of the frame, and a fourth pair of collision avoidance sensors associated with a left side of the frame.

16. The patient support apparatus of claim 13, wherein the at least one collision avoidance sensor comprises at least one of the following sensor technologies: RADAR, LiDAR, video, forward looking infrared RADAR (FLIR), and ultrasound.

17. The patient support apparatus of claim 13, wherein the at least one collision avoidance sensor comprises a first collision avoidance sensor that operates according to a first technology of the following sensor technologies: RADAR, LiDAR, video, forward looking infrared RADAR (FLIR), and ultrasound, and wherein the at least one collision avoidance sensor comprises a second collision avoidance sensor that operates according to a second technology of the following sensor technologies: RADAR, LiDAR, video, forward looking infrared RADAR (FLIR), and ultrasound, the second technology being different than the first technology.

18. The patient support apparatus of claim 1, wherein the power drive circuitry is configured for communication with one or more other patient support apparatuses to implement cooperative behavior between the patient support apparatuses for purposes of collision avoidance.

19. The patient support apparatus of claim 18, wherein the cooperative behavior comprises swarm behavior among three or more patient support apparatuses.

20. The patient support apparatus of claim 18, further comprising a beacon emitter coupled to the frame and operable to emit a beacon during emergency transport resulting in the patient support apparatus being given higher priority in the cooperative behavior over other patient support apparatuses.

21. The patient support apparatus of claim 1, further comprising first and second single-wheel casters coupled to the frame and engaging the floor, wherein the at least one dual-wheel motorized caster comprises first and second dual-wheel motorized casters coupled to the frame and engaging the floor, wherein regions of the frame to which the first and second single-wheel casters and the first and second dual-wheel motorized casters are coupled form an imaginary rectangle when the frame is viewed from above, the first and second single-wheel casters being coupled to the frame at first and second coupling regions that are disposed along a first diagonal of the imaginary rectangle, and the first and second dual-wheel motorized casters being coupled to the frame at third and fourth coupling regions that are disposed along a second diagonal of the imaginary rectangle.

22. The patient support apparatus of claim 1, wherein the frame includes a base frame and an upper frame, and further comprising a surface system supported by the upper frame and transferrable from the upper frame to a second patient support apparatus along a longitudinal dimension of the frame and away from a head end of the upper frame, and further comprising a ballast weight that moves from a foot end region of the base frame toward a head end region of the base frame as the surface system moves away from the head end of the upper frame to counter balance a portion of the surface system that extends beyond a foot end of the upper frame.

* * * * *